(12) United States Patent
Nakamura et al.

(10) Patent No.: US 6,917,400 B2
(45) Date of Patent: Jul. 12, 2005

(54) ANTI-REFLECTION FILM, POLARIZING PLATE COMPRISING THE SAME, AND IMAGE DISPLAY DEVICE USING THE ANTI-REFLECTION FILM OR THE POLARIZING PLATE

(75) Inventors: Kenichi Nakamura, Minami-ashigara (JP); Ichiro Amimori, Minami-ashigara (JP); Akihiro Ikeyama, Minami-ashigara (JP); Jun Watanabe, Minabi-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/437,002

(22) Filed: May 14, 2003

(65) Prior Publication Data

US 2003/0202137 A1 Oct. 30, 2003

Related U.S. Application Data

(62) Division of application No. 09/671,634, filed on Sep. 28, 2000.

(30) Foreign Application Priority Data

Sep. 28, 1999 (JP) .......................... 11-275337
Sep. 29, 1999 (JP) .......................... 11-277486
Sep. 30, 1999 (JP) .......................... 11-280880

(51) Int. Cl.$^7$ ............................... G02F 1/13
(52) U.S. Cl. ................... 349/96; 359/494; 349/117
(58) Field of Search .................... 349/117, 96; 359/494

(56) References Cited

U.S. PATENT DOCUMENTS 5,919,555 A    7/1999    Yasuda et al.

FOREIGN PATENT DOCUMENTS

| | | |
|---|---|---|
| EP | 0 119 331 | 9/1984 |
| EP | 0 445 686 | 9/1991 |
| EP | 0 656 258 | 6/1995 |
| EP | 0 778 476 | 6/1997 |
| EP | 0 911 656 | 4/1999 |
| EP | 0 974 560 | 1/2000 |
| EP | 1 022 587 | 7/2000 |
| JP | 59-50401 | 3/1984 |
| JP | 60-59250 | 12/1985 |
| JP | 63-004201 | 1/1988 |
| JP | 2-245702 | 10/1990 |
| JP | 05-013021 | 1/1993 |
| JP | 07-048527 | 2/1995 |
| JP | 7-149520 | 6/1995 |
| JP | 8-50206 | 2/1996 |
| JP | 08-179123 | 7/1996 |
| JP | 11-038201 | 2/1999 |
| JP | 11-038210 | 2/1999 |
| JP | 08-110401 | 4/1999 |
| JP | 11-153703 | 6/1999 |
| WO | 98/45734 | 10/1998 |
| WO | WO99/29635 | 6/1999 |

Primary Examiner—James A. Dudek
(74) Attorney, Agent, or Firm—Burns, Doane, Swecker & Mathis, L.L.P.

(57) ABSTRACT

There is disclosed an anti-reflection film comprising 5–65% by volume of inorganic fine particles having an average particle size of 1–200 nm and having a core/shell structure, and 35–95% by volume of a polymer, wherein a high-refractive-index layer having a refractive index of 1.65–2.40 and a low-refractive-index layer having a refractive index of 1.30–1.55 are laminated. There is also disclosed a polarizing plate and image display device utilizing the anti-reflection film. The anti-reflection film is suitable for mass production.

16 Claims, 15 Drawing Sheets

ANTI-REFLECTION FILM, POLARIZING PLATE COMPRISING THE SAME, AND IMAGE DISPLAY DEVICE USING THE ANTI-REFLECTION FILM OR THE POLARIZING PLATE

This application is a divisional application of application Ser. No. 09/671,634 filed on Sep. 28, 2000.

FIELD OF THE INVENTION

The present invention relates to an anti-reflection film, a polarizing plate having the same, and an image display device utilizing the anti-reflection film or the polarizing plate.

Particularly, the present invention relates to an anti-reflection film that comprises a low-refractive-index layer, and a high-refractive-index layer, which comprises inorganic fine particles having a core composed mainly of titanium dioxide and a shell composed mainly of an inorganic compound other than titanium dioxide, or an anti-reflection film having a low-refractive-index layer in which fine voids exist between inorganic fine particles in a short fiber form.

Further, the present invention relates to a polarizing plate that has optical compensation capacity and anti-reflection ability. The present also relates to a liquid crystal display type, or a color liquid crystal display type, image display device utilizing this polarizing plate.

BACKGROUND OF THE INVENTION

Anti-reflection films are used for various image display devices, such as liquid crystal displays (LCD), plasma display panels (PDP), electro luminecence displays (ELD), and cathode-ray tube displays (CRT). Further, anti-reflection films are also used for lenses of glasses or cameras.

As an anti-reflection film, a multi-layered film, in which transparent metal oxide thin films are laminated, has been ordinarily used. Multiple transparent thin films are used to prevent reflection of lights of various wavelengths. The transparent metal oxide thin film is formed by a chemical vapor deposition (CVD) process or a physical vapor deposition (PVD) process, and particularly by a vacuum vapor deposition process, which is a physical vapor deposition process. The transparent metal oxide thin film has excellent optical characteristics as an anti-reflection film. However, the method of forming a transparent matal oxide thin film by such vapor deposition has insufficient productivity for mass production.

In place of the vapor deposition process, methods have been proposed, in which a coating solution containing inorganic fine particles is applied, to form an anti-reflection film.

JP-B-60-59250 ("JP-B" means an examined Japanese patent publication) discloses an anti-reflection layer comprising micro voids (cavities) and inorganic fine particles. The anti-reflection layer is formed by a coating method. Then, the thus-formed layer is subjected to active gas treatment, whereby the gas escapes from the layer, to form micro voids.

JP-A-59-50401 ("JP-A" means an unexamind published Japanese patent application) discloses an anti-reflection film comprising a support, a high-refractive-index layer, and a low-refractive-index layer, superposed in this order. This publication also discloses an anti-reflection film further comprising a middle-refractive-index layer, superposed between the support and the high-refractive-index layer. The low-refractive-index layer is formed by coating a polymer or inorganic fine particles.

JP-A-2-245702 discloses an anti-reflection film comprising a mixture of two or more kinds of ultra fine particles (e.g. $MgF_2$, $SiO_2$), whose mixing ratio is designed to be different in the direction of film thickness. By changing the refractive index due to the different mixing ratio, the film of this publication attained similar optical characteristics to those of the anti-reflection film disclosed in JP-A-59-50401, which film comprises both high- and low-refractive-index layers. The ultra-fine particles are adhered with $SiO_2$ which is formed by thermal decomposition of ethyl silicate. In the thermal decomposition of ethyl silicate, the ethyl part thereof is burned, to evolve carbon dioxide and water vapor. As illustrated in FIG. 1 of the publication, the above-mentioned carbon dioxide and water vapor escape from the layer, to form voids among the ultra-fine particles.

JP-A-5-13021 discloses changing the voids among ultra-fine particles existing in the anti-reflection film described in the above JP-A-2-245702, with a binder. JP-A-7-48527 discloses an anti-reflection film containing inorganic fine particles of porous silica, and a binder.

JP-A-8-110401 and JP-A-8-179123 disclose a technique that a high-refractive-index layer, having a refractive index of 1.80 or more, is made by incorporating inorganic fine particles having a high refractive index into a plastic, and then the high-refractive-index layer is applied to an anti-reflection film.

High-refractive-index Layer Formation:

A method for making a high-refractive-index layer by application of inorganic fine particles has high productivity and is suitable for mass production.

A transparent high-refractive-index layer is formed by finely dispersing inorganic fine particles, and then forming a high-refractive-index layer while the finely dispersed state is kept. By incorporating a larger amount of inorganic fine particles having a high refractive index into a high-refractive-index layer, the formed high-refractive-index layer comes to have a higher refractive index.

It is very effective to incorporate fine particles of titanium dioxide, which are colorless and have an especially high refractive index, into a high-refractive-index layer.

Meanwhile, a high-refractive-index layer is arranged on a display face of an image display device or an outside surface of a lens. Therefore, for the high-refractive-index layer, high physical strengths (abrasion resistance and the like), and weathering resistance (light resistance, moisture/heat resistance, and the like) are required. Fine particles of titanium dioxide have a photocatalyst function to decompose organic compounds that contact the particles and deteriorate the physical strengths, transparency, and the like, remarkably. Furthermore, the fine particles cause a drop in the refractive index of any high-refractive-index layer. Such a phenomenon arises remarkably, in particular, in high-refractive-index layers containing fine particles of titanium dioxide that keep finely dispersed state.

Low-refractive-index Layer Formation:

A low-refractive-index layer having a very low refractive index can be obtained by forming micro voids among fine particles contained in the layer. Since the low-refractive-index layer is placed on the display face of an image display device or on the outer surface of a lens, the layer needs to have sufficient mechanical strength. Further, since the low-refractive-index layer is placed as mentioned above, the layer must have very few defects on the surface (e.g. pointing defect on the surface), to prevent the deterioration of visibility.

The low-refractive-index layer described in JP-A-2-245702 had voids among piled fine particles, so that the refractive index of the layer was very low. However, there was a problem that the low-refractive-index layer described in the publication substantially consisted of only an inorganic compound, and therefore it was very fragile.

JP-A-11-006902 describes a low-refractive-index-layer in which at least two inorganic fine particles were piled, to form voids among these fine particles, thereby obtaining a low-refractive-index layer having both a very low refractive index and high mechanical strength.

JP-A-9-288201 discloses an anti-reflection layer having a low-refractive-index layer in which, by piling up two or more layers of fine particles comprising a fluorine-containing polymer, voids were made between the fine particles.

On the other hand, when an anti-reflection film is formed by applying, onto a substrate, a low-refractive-index layer as described, for example, in JP-A-2-245702, a problem arises that surface defects (pointing defects) are apt to occur, and consequently the thus-produced anti-reflection film is unsatisfactory.

The construction of a conventional liquid crystal display type image display device is shown in FIG. 12. An ordinary liquid crystal display type image display device is composed of a backlight 211 of an edge light type on the furthest back surface and, in the order from the furthest back surface, a light introductive plate 212 for injecting light from the back light toward the surface, a scattering sheet 213 for uniformly dispersing brightness of the light, and one or plural light-tuning sheet (light tuning film) 214 having a function for condensing the uniformly dispersed light by the scattering sheet to a given direction or alternatively a function for selectively transmitting or reflecting a specific polarized light. Light passing through these films is injected to a liquid crystal cell 217 interposed between a pair of polarizing plates 215 (backside polarizing plate) and 216 (surface polarizing plate). In the figure, 218 denotes a cooled cathode fluorescent tube as light source, and 219 denotes a reflective sheet.

An anti-reflection film is generally arranged on a topmost surface of a display device, wherein the principle of optical interference is used to reduce its reflectivity, in an image display device, such as a CRT, a PDP, or an LCD, in order to prevent a drop in contrast or projection of an image by reflection of outside light. That is, in FIG. 12, an anti-reflection film is deposited on a displaying side of 216.

In the meantime, the display type of LCD can roughly be classified into a birefringence mode and an optical rotation mode. A super twisted nematic liquid crystal display device utilizing the birefringence mode (referred to hereinafter as STN-LCD) employs super twisted nematic liquid crystal possessing a twisted angle exceeding 90° and steep electrooptical characteristics. Therefore, STN-LCD enables display of a large capacity due to multiplex drive. However, STN-LCD has problems such as a slow response (several hundred milliseconds) and difficulty in gradation display, and is inferior in display characteristics to those of a liquid crystal display device using active element (such as TFT-LCD and MIM-LCD).

In TFT-LCD and MIM-LCD, a twisted nematic liquid crystal possessing a twisted angle of 90° and a positive birefringence is used for displaying images. These are a display mode of TN-LCD, which is an optical rotation mode. As this mode obtains a high responsiveness (several ten milliseconds) and a high contrast, this mode is advantageous in many aspects as compared with the birefringence mode.

Since TN-LCD changes display colors and display contrast according to a viewing angle of looking at the liquid crystal display device (viewing angle characteristics), it involves a problem that the device is not easy to watch as compared with CRT.

JP-A-4-229828 and JP-A-4-258923 respectively disclose a proposal of providing a phase differential plate (optical compensative sheet) between a liquid crystal cell and a pair of polarizing plate for improving viewing angle characteristics. As the phase differential plate proposed in the aforesaid publications has a phase difference of almost 0 in the vertical direction to the liquid crystal cell, it gives no optical effect on direct front but a phase difference is realized when it is tilted. A phase difference generated in an inclined direction is thereby compensated. A sheet having a negative birefringence so as to compensate a positive birefringence of a nematic liquid crystal and having an inclined optic axis is effective for such optical compensative sheet.

JP-A-6-75115 and EP 0576304A1 respectively disclose an optical compensative sheet having a negative birefringence and an inclined optic axis. This sheet is manufactured by stretching a polymer such as polycarbonate or polyester, and has a main-refractive-index direction inclined to the normal line thereof. As such sheet requires an extremely complicate stretching treatment, therefore, it is extremely difficult to manufacture a uniform optical compensative sheet of a large area stably according to this method.

On the other hand, JP-A-3-9326 and JP-A-3-291601 respectively disclose a method using a liquid crystal polymer. An optical compensative sheet is thereby obtained by applying a liquid crystal polymer onto the surface of an alignment (oriented) layer on a support. However, as the liquid crystal polymer fails to show a satisfactory alignment on the alignment layer, it is impossible to enlarge the viewing angle in all directions. Further, JP-A-5-215921 discloses an optical compensative sheet (birefringent plate) that comprises a support and a liquid crystal polymeric bar-type compound having a positive birefringence. This optical compensative sheet is obtained by applying a solution of the polymeric bar-type compound onto the support and curing the compound under heating. However, the liquid crystal polymer is devoid of birefringence so that it is unable to enlarge the viewing angle in all directions.

In JP-A-8-50206, there is disclosed an optical compensative sheet characterized by a layer of a negative birefringence comprising a compound having a discotic structure unit, wherein an angle between the discotic compound and a support is changed in the direction of the depth of the layer. According to the method described therein, a viewing angle viewed from contrast is extensively enlarged in all directions, and deterioration of images such as yellowing viewed from an incline direction is scarcely observed. With the optical compensative sheet alone, however, a deterioration in display quality based on reflection of outside light as mentioned above, cannot be improved. Thus, further improvement is required.

SUMMARY OF THE INVENTION

An object of the present invention is to provide an anti-reflection film that is suitable for mass production.

Another object of the present invention is to provide an image display device, which has been prevented from reflection, by a suitable means.

In detail, the objects of the present invention are described below.

An object of the present invention is to provide an anti-reflection film having a high-refractive-index layer that has a very high refractive index and that is transparent.

Another object of the present invention is to provide an anti-reflection film having a high-refractive-index layer excellent in physical strengths (abrasion resistance and the like) and weathering resistance (light resistance, moisture/heat resistance, and the like).

A further object of the present invention is to provide an anti-reflection film, having a low-refractive-index layer, that excels in mechanical strength and exhibits a very low refractive index.

A further object of the present invention is to provide an anti-reflection film, having a low-refractive-index layer, that causes no surface defects (pointing defects).

A further object of the present invention is to provide a liquid-crystal-display-type image display device, having excellent display quality in all directions, by preventing a deterioration in display quality based on reflection of outside light, and by enlarging a viewing angle of a liquid crystal display device and color liquid crystal display device of TN mode. A still further object of the present invention is to provide such an image display device at a low price, by producing it stably in a simple manner.

Other and further objects, features, and advantages of the invention will appear more fully from the following description, taken in connection with the accompanying drawings.

DETAILED DESCRIPTION OF THE INVENTION

Figure 1:
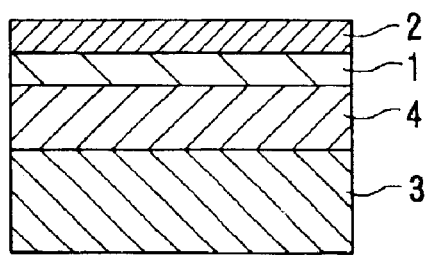
FIGS. 1(a)–(c) are sectional schematic views showing various types of layer constitution of anti-reflection films.
Figure 1:
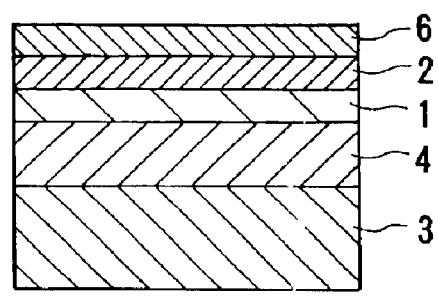
Figure 1:
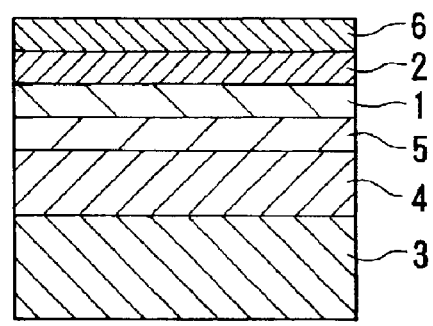

The objects of the present invention are attained, as described below, by anti-reflection films of the following (1)–(23), an image display device of the following (24), polarizing plates of the following (25)–(38), a liquid-crystal-display-type image display device of the following (39), and a color-liquid-crystal-display-type image display device of the following (40).

(1) An anti-reflection film, which is formed by laminating a high-refractive-index layer that has a refractive index of 1.65–2.40, and a low-refractive index layer that has a refractive index of 1.30–1.55, wherein the high-refractive-index layer comprises 5–65 vol % of inorganic fine particles having an average particle size of 1–200 nm and having a core/shell structure, and 35–95 vol % of a polymer composed of an organic compound.

(2) The anti-reflection film according to the aforesaid (1), wherein in the inorganic fine particles having the core/shell structure, the main component of the core is titanium dioxide, and the main component of the shell is an inorganic compound other than titanium dioxide, and the amount of the shell is 2–50 wt % to the core.

(3) The anti-reflection film according to the aforesaid (1), wherein the main component of the inorganic compound, which constitutes the shell is at least one selected from the group of alumina, silica, and zirconia.

(4) The anti-reflection film according to the aforesaid (1), wherein the main component of the inorganic compound, which constitutes the shell, is alumina.

(5) The anti-reflection film according to the aforesaid (1), in which the polymer composed of an organic compound in the high-refractive-index layer is a crosslinked polymer having an anionic group.

(6) The anti-reflection film according to the aforesaid (5), wherein the polymer having an anionic group in said high-refractive-index layer is a polymer having a phosphoric acid group or a sulfonic acid group, as the anionic group.

(7) The anti-reflection film according to the aforesaid (5), wherein the polymer having the anionic group in said high-refractive-index layer further contains an amino group or an ammonium group.

(8) The anti-reflection film according to the aforesaid (5), wherein the said high-refractive-index layer is a layer formed by coating, and said polymer having an anionic group is a polymer formed by crosslinking reaction or polymerization reaction, simultaneously with or after coating the high-refractive-index layer.

(9) The anti-reflection film according to the aforesaid (1), wherein the low-refractive-index layer comprises 50–95 wt % of inorganic fine particles having an average particle size of 0.5–200 nm, and 5–50 wt % of a polymer, with voids among the inorganic fine particles.

(10) The anti-reflection film according to the aforesaid (1), wherein the low-refractive-index layer having a refractive index of 1.30 to 1.55, comprises 50 to 95 wt % of short fibrous inorganic fine particles, and 5 to 50 wt % of a polymer, with voids among said short fibrous inorganic fine particles.

(11) An anti-reflection film, comprising a low-refractive-index layer having a refractive index of 1.30 to 1.55, which layer comprises 50 to 95 wt % of short fibrous inorganic fine particles and from 5 to 50 wt % of a polymer, wherein maicro voids are formed among said short fibrous inorganic fine particles.

(12) The anti-reflection film according to the aforesaid (11), wherein said short fibrous inorganic fine particles contains silica, and said low-refractive-index layer has a void ratio of 1 to 50 vol %.

(13) The anti-reflection film according to the aforesaid (11), wherein said short fibrous inorganic fine particles are substantially crosslinked.

(14) The anti-reflection film, comprising a low-refractive-index layer according to the aforesaid (11), and a high-refractive-index layer comprising 5 to 65 vol % of inorganic fine particles having an average particle size of 1 to 200 nm, and from 35 to 95 vol % of a crosslinked polymer having an anionic group.

(15) The anti-reflection film according to the aforesaid (14), wherein the polymer having an anionic group in said high-refractive-index layer is a polymer having a phosphoric acid group or a sulfonic acid group, as the anionic group.

(16) The anti-reflection film according to the aforesaid (14), wherein the polymer having an anionic group in said high-refractive-index layer further contains an amino group or an ammonium group.

(17) The anti-reflection film according to the aforesaid (14), wherein the inorganic fine particles in said high-refractive-index layer have a refractive index of 1.80 to 2.80.

(18) The anti-reflection film according to the aforesaid (14), wherein said polymer having an anionic group is a polymer formed by crosslinking reaction or polymerization reaction, simultaneously with or after coating the high-refractive-index layer.

(19) The anti-reflection film according to the aforesaid (14), wherein the high-refractive-index layer comprises inorganic fine particles having an average particle size of 1–200 nm and having a core/shell structure.

(20) The anti-reflection film according to the aforesaid (1) or (11), wherein an over coat layer having a fluorine-containing compound, is further laminated on said low-refractive-index layer.

(21) The anti-reflection film according to the aforesaid paragraph (20), wherein the occupation ratio of materials of said over coat layer is less than 70 vol % of the voids of the said low-refractive-index layer.

(22) The anti-reflection film according to the aforesaid (20), wherein the weight-average molecular weight of the fluorine-containing compound forming the over coat layer is 20,000 to 2,000,000, and low-molecular-weight components, having a molecular weight less than 20,000, which are other than the fluorine-containing compound, make up 50 wt % or less in the solid content of the over coat layer.

(23) The anti-reflection film according to the aforesaid (20), wherein said fluorine-containing compound is a fluoropolymer, and which fluoropolymer is formed by crosslinking reaction or polymerization reaction, simultaneously with or after coating the over coat layer.

(24) An image display device equipped with the anti-reflection film according to the aforesaid (1) or (11) on an image display surface.

(25) A polarizing plate, comprising a polarizing layer interposed between two transparent supports, which plate comprises an optical compensative film containing an optical anisotropic layer, on the surface of one of the transparent supports opposite to the polarizing layer, and comprises an anti-reflection film on the surface of the other transparent support opposite to the polarizing layer, wherein the optical anisotropic layer comprises a compound with a discotic structure unit and having a negative birefringence, disk surfaces of the discotic structure unit being inclined to the surface of the transparent support at angles changed to each other for the surface of the transparent support with respect to the direction of depth of the optical anisotropic layer.

(26) The polarizing plate according to the aforesaid (25), wherein the angle is increased with the increase of distance between the discotic structure unit and the surface of the transparent support.

(27) The polarizing plate according to the aforesaid (25), wherein the optical anisotropic layer further contains a cellulose ester.

(28) The polarizing plate according to the aforesaid (25), wherein the transparent support of the optical anisotropic layer side has an optically negative uniaxial property, and has an optic axis in the direction of normal line of the surface of the transparent support, and satisfies the following condition:

$$20 \leq \{(nx+ny)/2-nz\} \times d \leq 400$$

wherein d represents a thickness of the optical compensative film (unit: nm), nx, ny, and nz represent main refractive indices of three orthogonal axes of the optical compensative film, nz represents a main refractive index in the direction of thickness of the transparent support, and the axes satisfy a relation of $nx \leq nz \leq ny$, when it is viewed from the front.

(29) The polarizing plate according to the aforesaid (25), wherein an alignment layer is formed between the optical anisotropic layer and the transparent support.

(30) The polarizing plate according to the aforesaid (29), wherein the alignment layer comprises a cured polymer.

(31) The polarizing plate according to the aforesaid (25), wherein the optical anisotropic layer is composed of monodomain or a number of domains having a size of 0.1 $\mu$m or less.

(32) The polarizing plate according to the aforesaid (25), wherein the anti-reflection film comprises a low-refractive-index layer, which has a lower refractive index than that of the transparent support to which the layer is laminated, and has a void percentage (cavity) of 1–50 vol %.

(33) The polarizing plate according to the aforesaid (32), in which the low-refractive-index layer contains fine particles having a particle size of 0.1 $\mu$m or less, and voids exist among or inside the fine particles.

(34) The polarizing plate according to the aforesaid (25), wherein a high-refractive-index layer, having a higher refractive index than that of the transparent support, is provided between the transparent support, and the low-refractive-index layer.

(35) The polarizing plate according to the aforesaid (25), wherein an over coat layer containing a fluorine-containing compound, is further laminated on said low-refractive-index layer.

(36) The polarizing plate according to the aforesaid (35), wherein the occupation ratio of a material of the over coat layer in the voids of the low-refractive-index layer is less than 70 vol %.

(37) The polarizing plate according to the aforesaid (35), wherein a weight-average molecular weight of the fluorine-containing compound forming the over coat layer is 20,000 to 2,000,000, and low-molecular-weight components, having a molecular weight less than 20,000, other than the fluorine-containing compound, make up 50 wt % or less of solid components of the over coat layer.

(38) The polarizing plate according to the aforesaid (25), in which the anti-reflection film is the anti-reflection film according to the aforesaid (1) or (11).

(39) A liquid-crystal-display-type image display device, wherein the polarizing plate according to the aforesaid (25) is used as a polarizing plate on the side of display out of the two polarizing plates disposed on both sides of the liquid crystal cell, with the polarizing plate being arranged in such manner that the optical anisotropic layer is faced to the liquid crystal cell side.

(40) A color liquid-crystal-display-type image display device, comprising a pair of substrates having transparent electrodes, pixel electrodes, and a color filter, a liquid crystal cell sealed between the substrates and comprising a twisted nematic liquid crystal, a pair of optical compensative sheets provided on both sides of the liquid crystal cell, and a pair of polarizing plates provided respectively on the outside of the optical compensative sheets;
wherein use is made of, the polarizing plate according to any one of the aforesaid (25) to (38), as the optical compensative sheet on the displaying side of the liquid crystal cell and the polarizing plate, in which an optical anisotropic layer is disposed facing to the liquid crystal cell side, and an optical compensative sheet, which comprises an optical anisotropic layer having a negative birefringence and comprising a compound that has discotic structure units, at the backlight side of the liquid crystal cell; in which disk surfaces of the discotic structure units are inclined to the surface of a transparent support at angles changed to each other for the transparent support surface with respect to the direction of depth of the optical anisotropic layer.

(41) An anti-reflection film, in which any one of the anti-reflection film according to (11) to (23) is formed on a transparent support composed of triacetyl cellulose.

(42) The anti-reflection film according to any one of (11) to (23), and (41), or the polarizing plate according to any one of (25) to (38), wherein the surface of the film at the side of the low-refractive-index layer has a kinematic friction coefficient of 0.25 or less.

(43) The anti-reflection film according to any one of (11) to (23), and (41) to (42), or the polarizing plate according to any one of (25) to (38), wherein the surface of the film at the side of said low-refractive-index layer, has a contact angle of 90 degrees or more with water.

(44) A polarizing plate, which comprises the anti-reflection film according to any one of (11) to (23) and (41) to (43), or the polarizing plate according to any one of (25) to (38), on or as at least one of the protective films of the polarizing film.

(45) An image display device, in which the anti-reflection film according to any one of (11) to (23) and (41) to (43), or the polarizing plate according to any one of (25) to (38), and (44) is disposed.

Further, the optical anisotropic layer preferably satisfies the following conditions:

(1) The optical anisotropic layer, in which angles of disk surfaces of the discotic structure units with the surface of the transparent support are increased with the increase in distance from the surface of the support, and the angles vary in the range of 0° to 90°.

(2) The optical anisotropic layer having angles of disk surfaces of the discotic structure units with the surface of the transparent support, wherein the minimum value of the angle is within the range from 0 to 85° (more preferably, 5~40°), while the maximum value of the angle is within the range from 5° to 90° (more preferably, 30~85°).

(3) The optical anisotropic layer contains cellulose ester (more preferably cellulose acetate butylate).

(4) The optical anisotropic layer having the minimum value in the absolute value of retardation other than zero in the direction incline from the normal line of the polarizing plate.

(5) The optical anisotropic layer, in which the substrate of the liquid crystal cell has an alignment layer subjected to a rubbing treatment in one direction as well as the optical anisotropic layer is arranged in such manner that an angle of the direction in case of positively projecting the direction of the minimum value of retardation of the layer on the liquid crystal cell with the rubbing direction of the substrate of the liquid crystal cell adjacent to the layer is 90~270°.

Next, preferable embodiments of the present invention are described in detail. The scope of the present invention involves an invention furnished with any one of the following first to third embodiments, an invention furnished with two of the following first to third embodiments, and an invention furnished with all of the following first to third embodiments.

First Embodiment of the Invention (Embodiment 1)

The following will describe a basic constitution of an anti-reflection film of the present invention, which has a low-refractive-index layer, and a high-refractive-index layer that comprises inorganic fine particles having a core composed mainly of titanium dioxide, and a shell composed mainly of an inorganic compound other than titanium dioxide, with reference to the attached drawings.

FIG. 1 is a schematic sectional view showing a main layer constitution of an anti-reflection film.

The embodiment shown in FIG. 1(a) has a layer constitution of a transparent support (3), a hard coat layer (4), a high-refractive-index layer (1), and a low-refractive-index layer (2), in this order. The transparent support (3), a high-refractive-index layer (1), and the low-refractive-index layer (2) have the refractive indices satisfying the following relationship.

Refractive index of high-refractive-index layer>Refractive index of transparent support>Refractive index of low-refractive-index layer Further, in the case that an anti-reflection film is placed on the surface of a hard material such as a glass (a screen surface of CRT, and a lens surface of glasses and cameras), a high-refractive-index layer (1) and a low-refractive-index layer (2), without providing a transparent support (3) and a hard coat layer (4), may be formed directly on the screen surface or the lens surface.

The embodiment shown in FIG. 1(b) has a layer constitution of a transparent support (3), a hard coat layer (4), a high-refractive-index layer (1), a low-refractive-index layer (2), and an over coat layer (6), in this order. The transparent support (3), the high-refractive-index layer (1), and the low-refractive-index layer (2) have the refractive indices satisfying the following relationship.

> Refractive index of high-refractive-index layer>Refractive index of transparent support>Refractive index of low-refractive-index layer With respect to the anti-reflection film having the layer structure as shown in FIG. 1(b), as described in JP-A-59-50401, each of the high-refractive-index layer and the low-refractive-index layer satisfies the following formulae (I) and (II), respectively.

$$\frac{m}{4}\lambda \times 0.7 < n_1 d_1 < \frac{m}{4}\lambda \times 1.3 \quad \text{(I)}$$

In formula (I), m represents a positive integer (generally 1, 2, or 3), $n_1$ represents a refractive index of the high-refractive-index layer, $d_1$ represents a layer thickness (nm) of the high-refractive-index layer; and λ represents the wavelength of the visible light, and is a value within the range of 380 to 680 nm.

$$\frac{n}{4}\lambda \times 0.7 < n_2 d_2 < \frac{n}{4}\lambda \times 1.3 \quad \text{(II)}$$

In formula (II), n represents a positive odd number (generally 1), $n_2$ represents a refractive index of the low-refractive-index layer, $d_2$ represents a layer thickness (nm) of the low-refractive-index layer; and λ represents the wavelength of the visible light, and is a value within the range of 380 to 680 nm.

The embodiment shown in FIG. 1(d) has a layer constitution of a transparent support (3), a hard coat layer (4), a middle-refractive-index layer (5), a high-refractive-index layer (1), a low-refractive-index layer (2), and an over coat layer (6), in this order. The transparent support (3), the middle-refractive-index layer (5), the high-refractive-index layer (1), and the low-refractive-index layer (2) have the refractive indices satisfying the following relationship.

> Refractive index of the high-refractive-index layer>Refractive index of the middle-refractive-index layer>Refractive index of the transparent support>Refractive index of the low-refractive-index layer With respect to the anti-reflection film having the layer construction as shown in FIG. 1(c), as described in JP-A-59-50401, each of the middle-refractive-index layer, the high-refractive-index layer and the low-refractive-index layer preferably satisfies the following formulae (III), (IV), and (V), respectively.

$$\frac{h}{4}\lambda \times 0.7 < n_3 d_3 < \frac{h}{4}\lambda \times 1.3 \quad \text{(III)}$$

In formula (III), h represents a positive integer (generally 1, 2, or 3), $n_3$ represents a refractive index of the middle-refractive-index layer, $d_3$ represents a layer thickness (nm) of the middle-refractive-index layer; and λ represents the wavelength of the visible light, and is a value within the range of 380 to 680 nm.

$$\frac{j}{4}\lambda \times 0.7 < n_4 d_4 < \frac{j}{4}\lambda \times 1.3 \quad \text{(IV)}$$

In formula (IV), j represents a positive integer (generally 1, 2, or 3), $n_4$ represents a refractive index of the high-refractive-index layer, $d_4$ represents a layer thickness (nm) of the high-refractive-index layer; and λ represents the wavelength of the visible light, and is a value within the range of 380 to 680 nm.

$$\frac{k}{4}\lambda \times 0.7 < n_5 d_5 < \frac{k}{4}\lambda \times 1.3 \quad \text{(V)}$$

In formula (V), k represents a positive odd number (generally 1), $n_5$ represents a refractive index of the low-refractive-index layer, $d_5$ represents a layer thickness (nm) of the low-refractive-index layer; and λ represents the wavelength of the visible light, and is a value within the range of 380 to 680 nm. Herein, the terms "high refractive index", "middle refractive index", and "low refractive index", show the relative levels (differences) of refractive indexes among the layers.

[Inorganic Fine Particles in High-refractive-index Layer and Middle-refractive-index Layer]

The high-refractive-index layer and the middle-refractive-index layer are preferably prepared by causing the two layers to comprise inorganic fine particles having the core/shell structure for use in the present invention.

Figure 2:
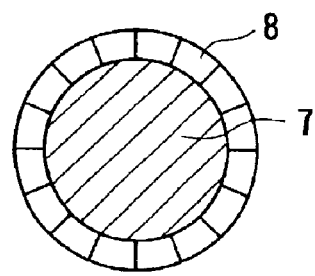
FIGS. 2(a) and (b) are sectional schematic views showing inorganic fine particles having a core/shell structure in preferred embodiments, used in a high-refractive-index layer in the present invention.
Figure 2:
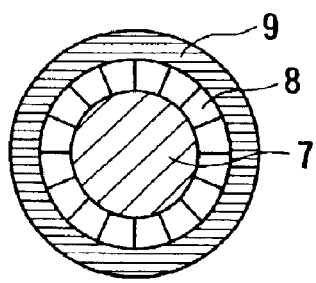

FIGS. 2(a) and 2(b) are sectional views of preferable forms of inorganic fine particles used in the high-refractive-index layer and the middle-refractive-index layer. In FIG. 2(a), a shell (8) is formed around a core (7). In FIG. 2(b), a shell (8) is formed around a core (7), and a shell (9) is further formed around the shell (8).

As shown in FIG. 2(a), a single layer of the shell may be formed around the core (7). Plural layers (two layers in FIG. 2(b)) of the shell may be formed in order to improve weathering resistance (light resistance and moisture/heat resistance) still more. Preferably, the core (7) is perfectly coated with the shell.

The core (7) has titanium dioxide (for example, rutile, mixed crystal of rutile and anatase, anatase, and amorphous structure) as its main component. The core preferably has rutile structure. The main component of the shell (8) and the shell (9) is an inorganic compound other than titanium dioxide. The word "main component" or the wording "be composed mainly of a certain component" means that this component is largest in content (% by weight) among all constituent components.

The shell (8) and the shell (9) are made of an inorganic compound other than titanium dioxide, and they are preferably made of an oxide or sulfide of a metal. For example, there are used inorganic compounds whose main component is silicon dioxide (silica), aluminum oxide (alumina), zinc oxide, zirconium oxide, tin oxide, antimony oxide, indium oxide, iron oxide, zinc sulfide or the like. Preferable are silicon dioxide (silica), aluminum oxide (alumina), zirconium oxide, and zinc oxide. Especially preferable are aluminum oxide (alumina) and silicon dioxide (silica). A mixture thereof may be used.

Examples of other elements include Ti, Zr, Sn, Sb, Cu, Fe, Mn, Pb, Cd, As, Cr, Hg, Zn, Al, Mg, Si, P and S.

The coating amount of the shell (8) and the shell (9) to the weight of the core (7) is 2–50% by weight, preferably 3–40% by weight, and particulaly preferably 4–25% by weight on average.

The most preferable manner for forming the shell (8) around the core (7) is a manner of forming titanium dioxide particles, which become the core (7), and subsequently forming the shell (8) around the core (7).

Titanium dioxide, which become the core (7), is generally produced by the chlorine method or the sulfuric acid method, which is described in, for example, "Sanka Titan—Busshei to Oyo (Titanium oxide—physical properties and application)" (Chapter 2, written by Manabu Kiyono).

Further, the manner for forming the shell (8) around the core (7) is exemplified in patent publications and literatures. For example, GB Patent No. 1,134,249 describes a manner of forming aluminum oxide (alumina) as a shell. U.S. Pat. No. 3,410,708 and FATIPEC Congr. XIV (p. 697 (1978); H. Weber) describe a manner of forming, as a shell, porous silicon dioxide (silica) in low density, respectively. JP-B-58-47061 and U.S. Pat. Nos. 2,885,366, and 3,437,502 describe a manner for forming dense silicon dioxide (silica) in high density, respectively. Besides, U.S. Pat. No. 3,383,231 and GB Patent No. 2,629,953 describe a manner of forming zirconium oxide as a shell. GB Patent No. 1,365,999 describes a manner of forming tin oxide, and NL Patent No. 148,354 describes a manner of forming antimony oxide, respectively.

As the inorganic fine particles used in the high-refractive-index layer and the middle-refractive-index layer, commercially available ones can be preferably used.

The refractive index of the inorganic fine particles is preferably 1.80–2.60, and more preferably 1.90–2.50.

The weight-average particle size of primary particles of the inorganic fine particles is preferably 1–150 nm, more preferably 1–100 nm, and most preferably 1–80 nm.

In the case that the inorganic fine particles are contained in the high-refractive-index layer or the middle-refractive-index layer, the weight-average particle size of the dispersed inorganic fine particles is generally 1–200 nm, preferably 5–150 nm, more preferably 10–100 nm, and most preferably 10–80 nm.

The average particle size of the inorganic fine particles can be measured by the light scattering method or through an electron microscopic photograph.

The specific surface area of the inorganic fine particles is preferably 10–400 $m^2/g$, more preferably 20–200 $m^2/g$, and most preferably 30–150 $m^2/g$.

The shape of the inorganic fine particles is preferably a rice grain shape, a spherical shape, a cubic shape, a spindle shape, or an indeterminate shape.

The inorganic fine particles may be surface-treated with an organic compound. Examples of the organic compound used in the surface-treatment include polyol, alkanolamine, stearic acid, silane coupling agent, and titanate coupling agent. A silane coupling agent is most preferable. A combination of two or more surface-treatments may be performed.

Two or more kinds of inorganic fine particles may be used in the high-refractive-index layer and the middle-refractive-index layer in combination.

The ratio of the inorganic fine particles in the high-refractive-index layer, or in the middle-refractive-index layer, is generally 5–65 vol %, preferably 10–60 vol % and more preferably 20–55 vol %.

The inorganic fine particles are used in the state that they are dispersed, to form the high-refractive-index layer and the middle-refractive-index layer. A dispersing medium for the inorganic fine particles in the high-refractive-index layer is preferably a liquid having a boiling point of 60–170° C. Examples of the dispersing medium include water, alcohols (for example, methanol, ethanol, isopropanol, butanol and benzyl alcohol), ketones (for example, acetone, methylethylketone, methylisobutylketone and cyclohexanone), esters (for example, methyl acetate, ethyl acetate, propyl acetate, butyl acetate, methyl formate, ethyl formate, propyl formate, and butyl formate), aliphatic hydrocarbons (for example, hexane, and cyclohexane), halogenated hydrocarbons (for example, methylene chloride, chloroform, and tetrachlorocarbon), aromatic hydrocarbons (for example, benzene, toluene, and xylene), amides (for example, dimethylformamide, dimethylacetoamide, and n-methylpyrrolidone), ethers (for example, diethyl ether, dioxane, and tetrahydrofuran), and ether alcohol (for example, 1-methoxy-2-propanol). Especially preferable are toluene, xylene, methylethylketone, methylisobutylketone, cyclohexanone, and butanol.

The inorganic fine particles can be dispersed in the medium with a dispersing machine. Examples of the dispersing machine include a sand grinder mill (for example, beads mill with pins), a high-speed impeller mill, a pebble mill, a roller mill, an attritor, and a colloid mill. The sand grinder mill and the high-speed impeller mill are especially preferable. Further, preliminary dispersion treatment may be performed. Examples of the dispersing machine used in preliminary dispersion treatment include a ball mill, a three-roll mill, a kneader, and an extruder.

[Polymer Composed of Organic Compound in High-refractive-index Layer and Middle-refractive-index Layer]

In the polymer composed of an organic compound used in the high-refractive-index layer and the middle-refractive-index layer, a crosslinked polymer having an anionic group is preferably used as a binder.

The crosslinked polymer having an anionic group has a structure wherein its main chain is crosslinked. The anionic group has a function to maintain the dispersion state of the inorganic fine particles. The crosslinked structure has a function to impart film-forming ability to the polymer, to strengthen the resultant film.

Examples of the main chain of the polymer include polyolefin (saturated hydrocarbon), polyether, polyurea, polyurethane, polyester, polyamine, polyamide, and melamine resin. Polyolefin, polyether and polyurea main chains are preferable. Polyolefin and polyether main chains are more preferable. A polyolefin main chain is most preferable.

Any polyolefin main chain is composed of a saturated hydrocarbon. The polyolefin main chain can be obtained, for example, by addition polymerization reaction of an unsaturated polymerizable group. In polyether main chain, repeating units are connected to each other through ether bonds (—O—). The polyether main chain can be obtained, for example, by ring-opening polymerization of epoxy groups. In polyurea main chain, repeating units are connected to each other through urea bonds (—NH—CO—NH—). The polyurea main chain can be obtained, for example, by condensation polymerization of an isocyanate group and an amino group. In polyurethane main chain, repeating units are connected to each other through urethane bonds (—NH—CO—O—). The polyurethane main chain can be obtained, for example, by condensation polymerization of an isocyanate group and a hydroxyl group (an example of which includes an N-methylol group). In polyester main chain, repeating units are connected to each other through ester bonds (—CO—O—). The polyester main chain can be obtained, for example, by condensation polymerization of a carboxyl group (an example of which includes an acid halide group) and a hydroxyl group (an example of which includes an N-methylol group). In polyamine main chain, repeating units are connected to each other through imino bonds (—NH—). The polyamine main chain can be obtained, for example, by ring-opening polymerization of ethyleneimine groups. In polyamide main chain, repeating units are connected to each other through amide bonds (—NH—CO—). The polyamide main chain can be obtained, for example, by reaction of an isocyanate group and a carboxyl group (an example of which includes an acid halide group). The melamine resin main chain can be obtained, for example, by condensation polymerization of a triazine group (for example, melamine) and an aldehyde (for example, formaldehyde). In the melamine resin, its main chain itself has a crosslinking structure.

The anionic group is connected directly to the main chain of the polymer, or connected to the main chain through a linking group. The anionic group is preferably connected as a side chain to the main chain through a linking group.

Examples of the anionic group include a carboxylic acid group (carboxyl), a sulfonic acid group (sulfo), and a phosphoric acid group (phosphono). A sulfonic acid group, and a phosphoric acid group, are preferable. The anionic group may be in the state of a salt. The cation, which forms the salt with the anionic group, is preferably an alkali metal ion. Further, the proton of the anionic group may be dissociated. The linking group that connect the anionic group and the main chain of the polymer is preferably a divalent group selected from a group consisting of —CO—, —O—, an alkylene group, an arylene group, and a combination thereof.

The crosslinking structure chemically bonds (preferably connects by a covalent-bond) two or more main chains. The crosslinking structure preferably connects three or more main chains by a covalent-bond. The crosslinking structure is preferably composed of a group having two or more valences, selected from —CO—, —O—, —S—, a nitrogen atom, a phosphorus atom, an aliphatic residue, an aromatic residue, and any combination thereof.

The polymer is preferably a copolymer that has a repeating unit having an anionic group and a repeating unit having a crosslinking structure. The percentage of the repeating unit having an anionic group in the copolymer is preferably 2–96 wt %, more preferably 4–94 wt %, and most preferably 6–92 wt %. The repeating unit may have two or more anionic groups.

The percentage of the repeating unit having an crosslinking structure in the copolymer is preferably 4–98 wt %, more preferably 6–96 wt %, and most preferably 8–94 wt %.

The repeating unit of the polymer may have both of the anionic group and the crosslinking structure.

The polymer may contain one or more of other repeating units (units having neither anionic group nor crosslinking structure). Preferred examples of such other repeating units are a repeating unit having an amino group or a quaternary ammonium group, and a repeating unit having a benzene ring. Similarly to the anionic group, the amino group or the quaternary ammonium group also has a function to maintain the dispersion state of the inorganic fine particles.

The benzene ring has a function to increase the refractive index of the high-refractive-index layer. Even if the amino group, the quaternary ammonium group, or the benzene ring is contained in the repeating unit having the anionic group or the repeating unit having the crosslinking structure, the same effect can be obtained.

In the repeating unit having an amino group or a quaternary ammonium group, the amino group or the quaternary ammonium group may be connected directly to the main chain of the polymer or connected to the main chain through a linking group. The amino group or the quaternary ammonium group is preferably connected as a side chain to the main chain through a linking group. The amino group or the quaternary ammonium group is preferably a secondary amino group, a tertiary amino group, or a quaternary ammonium group, and more preferably a tertiary amino group or a quaternary ammonium group. The group, which bonds to the nitrogen atom of the secondary amino group, the tertiary amino group, or the quaternary ammonium group, is preferably an alkyl group, more preferably an alkyl group having 1–12 carbon atoms, and most preferably an alkyl group having 1–6 carbon atoms. The counter ion of the quaternary ammonium group is preferably a halide ion. The linking group for bonding the amino group or the quaternary ammonium group to the main chain of the polymer is preferably a divalent group selected from —CO—, —NH—, —O—, an alkylene group, an arylene group, and any combination thereof.

If the polymer contains the repeating unit having an amino group or a quaternary ammonium group, the percentage thereof is preferably 0.06–32% by weight, more preferably 0.08–30% by weight, and most preferably 0.1–28% by weight.

In the repeating unit having a benzene ring, the benzene ring is connected directly to the main chain of the polymer, or connected to the main chain through a linking group. The benzene ring is preferably connected as a side chain to the main chain through a linking group. The benzene ring may have a substituent (for example, an alkyl group, a hydroxyl group, or a halogen atom). The linking group that connects the benzene ring to the main chain of the polymer is preferably a bivalent group selected from —CO—, —O—, an alkylene group, an arylene group, and a combination thereof.

If the polymer contains the repeating unit having a benzene ring, the percentage thereof is preferably 2–98% by weight, more preferably 4–96% by weight, and most preferably 6–94% by weight.

The crosslinked polymer having an anionic group is preferably formed by adding a monomer thereof to a coating solution (the above-mentioned dispersion solution of the inorganic fine particles) of the high-refractive-index layer, or the middle-refractive-index layer, and then conducting crosslinking reaction or polymerization of the monomer at the same time or after coating the solution. The monomer having an anionic group functions as a dispersing agent for the inorganic fine particles in the coating solution. The amount of the monomer having an anionic group is preferably 1–50% by weight, more preferably 5–40% by weight, and most preferably 10–30% by weight based on the inorganic fine particles. Further, the monomer having an amino group or a quaternary ammonium group functions as a dispersing aid in the coating solution. The amount of the monomer having an amino group or a quaternary ammonium group, to that of the monomer having an anionic group, is preferably 3–33% by weight. If the polymer is formed by polymerization reaction simultaneously or after the coating of the layer, the functions of these monomers can be effectively exhibited before coating the layers.

As the monomer having an anionic group, and the monomer having an amino group or a quaternary ammonium group, commercially available monomers may be used.

Preferred examples of the commercially available monomer having an anionic group include KAYAMAR PM-21, PM-2 (trade names, manufactured by Nippon Kayaku Co., Ltd.), Antox MS-60, MS-2N, MS-NH4 (trade names, manufactured by Nippon Nyukazai Co., Ltd.), ARONIX M-5000, M-6000, M-8000 series (trade names, manufactured by Toagosei Co., Ltd.), Biscoat #2000 series (trade names, manufactured by Osaka Organic Chemical Ind.), NEW FRONTIER GX-8289 (trade name, manufactured by Dai-ichi Kogyo Seiyaku Co., Ltd.), NK ESTER CB-1, A-SA (trade names, manufactured by Shin-Nakamura Chemical Co., Ltd.), AR-100, MR-100, AND MR-200 (trade names, manufactured by Daihachi Chemical Industry Co., Ltd.).

Further, preferred examples of the commercially available monomer having an amino group or a quaternary ammonium group include DMAA (trade name, manufactured by Osaka Organic Chemical Ind. Ltd.), DMAEA, DMAPAA (trade name, manufactured by Kohjin Co., Ltd.), BLEN-MER QA (trade name, manufactured by NOF Co., Ltd.), and NEW FRONTIER C-1615 (trade name, manufactured by Dai-ichi Kogyo Seiyaku Co., Ltd.).

The polymerization reaction of the polymer may be a photopolymerization reaction or a thermal polymerization reaction. Photopolymerization reaction is preferable.

Examples of a thermal polymerization initiator used in the polymerization reaction or the crosslinking reaction include inorganic peroxides such as potassium persulfate, and ammonium persulfate; azonitrile compounds such as sodium azobiscyanovalerate; azoamidine compounds such as 2,2'-azobis(2-methylpropioneamide)hydrochlorate; cyclic azoamidine compounds such as 2,2'-azobis[2-(5-methyl-2-imidazoline-2-yl)propane hydrochlorate; azoamide compounds such as 2,2'-azobis {2-methyl-N-[1,1'-bis(hydroxymethyl)-2-hydroxyethyl]propioneamide}; azo compounds such as 2,2'-azobisisobutyronitrile, 2,2'-azobis(2,4-dimethylvaleronitrile), dimethyl-2,2'-azobis(2-methylpropionate), dimethyl-2,2'-azobisisobutyrate; and organic peroxides such as lauryl peroxide, benzoyl peroxide, and tert-butyl peroctoate.

Examples of a photopolymerization initiator used in the polymerization reaction or the crosslinking reaction include acetophenones, benzoins, benzophenones, phosphine oxides, ketals, anthraquinones, thioxanthones, azo compounds, peroxides, 2,3-dialkyldione compounds, disulfide compounds, fluoroamine compounds, and aromatic sulphoniums. Examples of acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophenone, and 2-benzyl-2-dimethylamino-1-(4-morpholinophenyl)-butanone. Examples of benzoins include benzoin methyl ether, benzoin ethyl ether, and benzoin isopropyl ether. Examples of benzophenones include benzophenone, 2,4-dichlorobenzophenone, 4,4-dichlorobenzophenone, and p-chlorobenzophenone. Examples of phosphine oxides include 2,4,6-trimethylbenzoyl diphenylphosphine oxide.

Commercially available polymerization initiators may be used. A polymerization accelerator may be used together with any polymerization initiator. The addtion amount of the polymerization initiator and the polymerization accelerator is preferably 0.2–10% by weight of the total monomers.

When the polymer is formed by photopolymerization reaction, examples of a light source, which can be used, include a low-pressure mercury lamp, a high-pressure mercury lamp, a superhigh-pressure mercury lamp, a chemical lamp, and a metal halide lamp. It is most preferable to use a high-pressure mercury lamp, which has a good radiation efficiency.

The coating solution (the inorganic fine particle-dispersed solution containing the monomer) may be heated to enhance the polymerization of the monomers (or oligomers). Further, thermosetting reaction of the formed polymer may be conducted as an additional treatment, by heating the polymer after the application and the subsequent photopolymerization reaction.

Since the polymer having an anionic group is crosslinked, it is difficult to determine its molecular weight.

The percentage of the crosslinked polymer having an anionic group in the high-refractive-index layer is generally 35–95% by volume, preferably 40–90% by volume, and more preferably 45–80% by volume.

[High-refractive-index Layer and Middle-refractive-index Layer]

Figure 3:
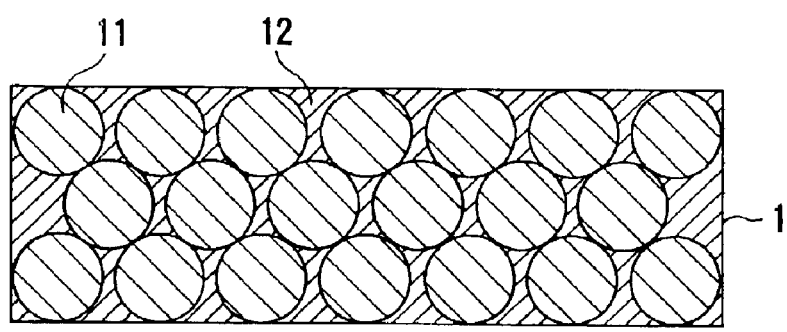
FIG. 3 is a sectional schematic view of a high-refractive-index layer in a preferred embodiment of the present invention.

FIG. 3 is a sectional schematic view of a high-refractive-index layer (1) (or a middle-refractive-index layer). A low-refractive-index layer is arranged on the high-refractive-index layer (1) shown in FIG. 3, and an image display device or a lens is located below the high-refractive-index layer (1).

As shown in FIG. 3, the high-refractive-index layer (1) has no voids, and it is a layer wherein spaces between inorganic fine particles (11) are filled with a polymer (12). In the high-refractive-index layer (1), the inorganic fine particles (11) having an average particle size of 1–200 nm are piled up (three particles in FIG. 3). The spaces between the inorganic fine particles (11) are filled with the polymer (12) composed of an organic compound. The polymer (12) composed of an organic compound is preferably a crosslinked polymer having an anionic group.

The refractive index of the high-refractive-index layer is preferably 1.65–2.40, and more preferably 1.70–2.20.

The refractive index of the middle-refractive-index layer is preferably 1.65–1.85, and more preferably 1.65–1.75.

The refractive index can be obtained by measurement with an Abbe's refractometer, or can be obtained from the shape of a spectral reflectance curve obtained from measurement of the spectral reflectance of a light from a layer surface.

The thickness of the high-refractive-index layer or the middle-refractive-index layer is preferably 5–200 nm, more preferably 10–150 nm, and most preferably 30–100 nm.

The haze of the high-refractive-index layer or the middle-refractive-index layer is preferably 5% or less, more preferably 3% or less, and most preferably 1% or less.

The strength of the high-refractive-index layer or the middle-refractive-index layer is preferably H or more, more preferably 2H or more, and most preferably 3H or more according to pencil hardness grades with 1 kg load.

[Inorganic Fine Particles in Low-refractive-index Layer]

The average particle size of the inorganic fine particles is generally 0.5–200 nm. As the particle size increases, forward scattering increases. If the particle size is over 200 nm, scattered light is colored. The average particle size is preferably 1–100 nm, more preferably 3–70 nm, and most preferably 5–40 nm. The particle size distribution of the inorganic fine particles is preferably as narrow as possible (mono dispersion).

The inorganic fine particles are preferably amorphous.

Preferably the inorganic fine particles are made of a metal oxide. The metal atom is preferably Na, K, Mg, Ca, Ba, Al, Zn, Zr, Fe, Cu, Ti, Sn, In, W, Y, Sb, Mn, Ga, V, Nb, Ta, Ag, Si, B, Bi, Mo, Ce, Cd, Be, Pd, and Ni, more preferably Al, Sn, Fe, In, Ti, Zn, Zr, and Si, and especially preferably Si. Inorganic materials comprising two kinds of metals may be used.

Examples of the metal oxide include silicon dioxides (silica), aluminum oxides (alumina), tin oxides, zinc oxides, zirconium oxides, titanium dioxides (e.g rutile, mixed crystals of rutile/anatase, anatase, amorphous structure), indium oxides, and iron oxides.

The inorganic fine particles are made of these metal oxides as a main component, and they may further contain other element(s). The term "main component" means a component having the largest content (% by weight) among these components. Examples of the other elements include Ti, Zr, Sn, Sb, Cu, Fe, Mn, Pb, Cd, As, Cr, Hg, Zn, Al, Mg, Si, P, and S. The inorganic fine particles are preferably amorphous. The inorganic fine particles are especially preferably silica.

A dispersion of inorganic fine particles can be directly prepared by the sol-gel method (described in each publication of JP-A-53-112732 and JP-B-57-9051), or a precipitation method (described in "APPLIED OPTICS", 27, page 3356 (1988)). Further, powder produced by a drying and sedimentation method can be mechanically crushed to obtain a dispersion. In addition, inorganic fine particles, which are commercially available (e.g., silicon dioxaide sol), may be used.

For a formation of the low-refractive-index layer, the inorganic fine particles are preferably used in the state of dispersion in a suitable solvent. As a dispersion medium, preferred are water, alcohol (e.g., methanol, ethanol, isopropyl alcohol, and 1- or 2-butanol), and ketone (e.g., methyl ethyl ketone, and methyl isobutyl ketone).

The amount of the inorganic fine particles is generally from 50 to 95% by weight, preferably from 50 to 90% by weight, more preferably from 60 to 90% by weight, and especially preferably from 70 to 90% by weight, based on the weight of the low-refractive-index layer.

[Micro Voids Among Inorganic Fine Particles in Low-refractive-index Layer]

Figure 4:
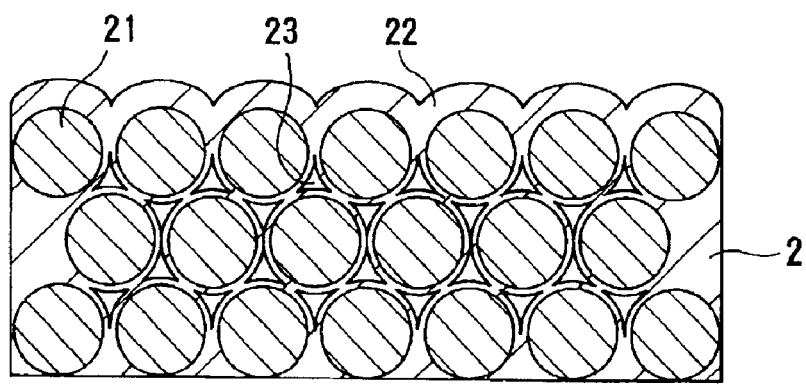
FIG. 4 is a sectional schematic view of a low-refractive-index layer in a preferred embodiment of the present invention.

FIG. 4 is a sectional view schematically illustrating a preferable low-refractive-index layer. The upside of the anti-reflection film of FIG. 4 is a surface, while an image display device or a lens is placed at the downside.

As shown in FIG. 4, micro voids (23) are formed among inorganic fine particles (21), in the low-refractive-index layer (2). The low-refractive-index layer (2) further contains a polymer (22) in an amount of 5 to 50% by weight. The polymer (22) combines the inorganic fine particles (21), but the voids (23) among particles are not filled with the polymer. As shown in FIG. 4, the voids (23) among particles are preferably closed (i.e. voids do not have openings) with both the polymers (22) and the inorganic fine particles (21).

The void ratio of the low-refractive-index layer is generally 1 to 50% by volume, preferably 3 to 45% by volume, and more preferably 5 to 35% by volume. Herein, the term "void ratio of the low-refractive-index layer" means the volume ratio (%) of the voids to the total volume of the low-refractive-index layer.

If the void ratio increases, the refractive index of the low-refractive-index layer decreases. In the present invention, the size of micro voids among particles also can be easily adjusted to a suitable value (so as to cause neither a light-scattering nor a problem in a mechanical strength of the low-refractive-index layer), by properly adjusting the grain size of the inorganic fine particles. By this method, a low-refractive-index layer can be rendered to a porous film having microscopically fine voids, but an optically or macroscopically uniform film.

By a formation of micro voids, the macroscopic refractive index of the low-refractive-index layer becomes lower than the total of refractive indices of fine particles and a polymer each constituting the low-refractive-index layer. The refractive index of a layer is a total of refractive indices per volume of layer-constituting elements. The refractive index of the fine particles and the polymer is a value of more than 1, while the refractive index of air is 1.00. Therefore, a low-refractive-index layer having a remarkably low refractive index can be obtained by a formation of micro voids.

The micro voids among particles are preferably closed by inorganic fine particles and a polymer in a low-refractive-index layer. The thus-closed voids has an advantage in that stain materials on the low-refractive-index layer surface are scarcely adhered to others, as compared to opening pores (apertures) in which an opening is toward the surface of a low-refractive-index layer.

[Polymer in Low-refractive-index Layer]

In the preferable low-refractive-index layer as shown in FIG. 4, the low-refractive-index layer contains a polymer in an amount of 5 to 50% by weight. The polymer has functions not only to combine (glue) inorganic fine particles, but also to maintain the structure of the low-refractive-index layer that contains micro voids among the particles. The amount of a polymer to be used is adjusted so as to keep the mechanical strength of the low-refractive-index layer without filling the voids with the polymer. The amount of a polymer is preferably 10 to 50% by weight, more preferably 10 to 40% by weight, and especially preferably 10 to 30% by weight, based on a total amount of the low-refractive-index layer.

In order to combine inorganic fine particles with the polymer, it is preferable to (1) bond the polymer to a surface-treating agent for the inorganic fine particles, or to (2) use the polymer as a binder for the inorganic fine particles.

The polymer to be bonded to a surface-treating agent according to (1) is preferably a binder polymer according to (2). The polymer for use in (2) is preferably formed by adding monomers to a coating solution for the low-refractive-index layer, and then polymerizing them simultaneously with or after coating the low-refractive-index layer. Preferably (1) and (2) are carried out in combination.

(1) A surface treatment and (2) a binder are explained in this order.

(1) Surface Treatment

The inorganic fine particles are preferably subjected to a surface treatment to improve an affinity with the polymer. The surface treatment is classified into a physical surface treatment (e.g., plasma discharge treatment, and corona discharge treatment), and a chemical surface treatment using a coupling agent. The particles are preferably subjected to a chemical surface treatment only, or to a combination of chemical and physical surface treatments.

As a coupling agent, an organoalkoxy metal compound (e.g., titanium coupling agents, and silane coupling agents) is preferably used. In the case that inorganic fine particles are made of silicon dioxide, a surface treatment using a silane coupling agent is particularly effective.

A preferred silane coupling agent is represented by the following formula (Ia) or (Ib).

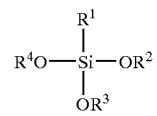

-continued

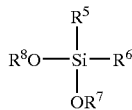
(Ib)

wherein each of $R^1$, $R^5$, and $R^6$ independently represents an alkyl group having 1 to 10 carbon atoms, an aryl group having 6 to 10 carbon atoms, an alkenyl group having 2 to 10 carbon atoms, an alkynyl group having 2 to 10 carbon atoms, or an aralkyl group having 7 to 10 carbon atoms, and each of $R^2$, $R^3$, $R^4$, $R^7$ and $R^8$ independently represents an alkyl group having 1 to 6 carbon atoms or an acyl group having 2 to 6 carbon atoms.

In the formula (Ia) or (Ib), each of $R^1$, $R^5$ and $R^6$ preferably is an alkyl group, an aryl group, an alkenyl group, or an aralkyl group, more preferably is an alkyl group, an aryl group, or alkeneyl group, and most preferably is an alkyl group or an alkenyl group. The alkyl group, the aryl group, the alkenyl group, the alkynyl group, and the aralkyl group may have a substituent. Examples of the substituent include a glycidyl group, a glycidyloxy group, an alkoxy group, a halogen atom, an acyloxy group (e.g., acryloyloxy, methacryloyloxy), a mercapto group, an amino group, a carboxyl group, a cyano group, an isocyanato group, and an alkenylsulfonyl group (e.g., vinylsulfonyl).

In the formula (Ia) or (Ib), each of $R^2$, $R^3$, $R^4$, $R^7$ and $R^8$ preferably is an alkyl group. The alkyl group may have a substituent. Examples of the substituent include an alkoxy group.

The silane coupling agent preferably has a double bond in its molecule, which can be combined with the polymer by a reaction of the double bond. The double bond is preferably contained in the substituent of $R^1$, $R^5$ or $R^6$ in the formula (Ia) or (Ib).

An especially preferred silane coupling agent is represented by the following formula (IIa) or (IIb).

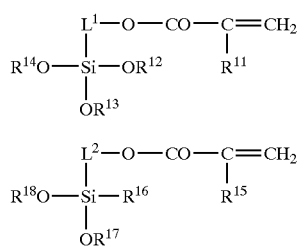

wherein each of $R^{11}$ and $R^{15}$ independently represents a hydrogen atom, or a methyl group, $R^{16}$ represents an alkyl group having 1 to 10 carbon atoms, an aryl group having 6 to 10 carbon atoms, an alkenyl group having 2 to 10 carbon atoms, an alkynyl group having 2 to 10 carbon atoms, or an aralkyl group having 7 to 10 carbon atoms, and each of $R^{12}$, $R^{13}$, $R^{14}$, $R^{17}$, and $R^{18}$ independently represents an alkyl group having 1 to 6 carbon atoms or an acyl group having 2 to 6 carbon atoms. Each of $L^1$ and $L^2$ represents a divalent linking group.

In the formula (IIb), $R^{16}$ has the same meanings as for $R^2$, $R^3$, $R^4$, $R^7$ and $R^8$ in the formula (Ia) and (Ib).

In the formula (IIa) or (IIb), $R^{12}$, $R^{13}$, $R^{14}$, $R^{17}$, and $R^{18}$ have the same meanings as for $R^2$, $R^3$, $R^4$, $R^7$ and $R^8$ in the formula (Ia) or (Ib).

In the formula (IIa) or (IIb), each of $L^1$ and $L^2$ preferably is an alkylene group, more preferably an alkylene group having 1 to 10 carbon atoms, further more preferably an alkylene group having 1 to 6 carbon atoms.

Examples of the silane coupling agents represented by the formula (Ia) include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ-(β-oglycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane, and β-cyanoethyltriethoxysilane.

Silane coupling agents having a double bond in its molecule such as vinyltrimethoxysilane, vinyltriethoxysilane, vinyltriacetoxysilane, vinyltrimethoxyethoxysilane, γ-acryloyloxypropyltrimethoxysilane, and γ-methacryloyloxypropyltrimethoxysilane are preferred. Silane coupling agents represented by the formula (IIa) such as γ-acryloyloxypropyltrimethoxysilane and γ-methacryloyloxypropyltrimethoxysilane are particularly preferred.

Examples of the silane coupling agents represented by the formula (Ib) include dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, and methylvinyldiethoxysilane.

Silane coupling agents having a double bond in its molecule such as γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, methylvinyldimethoxysilane, and methylvinyldiethoxysilane are preferred. Silane coupling agents represented by the formula (IIb) such as γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane are especially preferred.

Two or more silane coupling agents can be used in combination.

Another silane coupling agents can be used in combination with the silane coupling agents represented by the formula (Ia) or (Ib). Examples of other coupling agents include an alkyl orthosilicate (e.g., methyl orthosilicate, ethyl orthosilicate, n-propyl orthosilicate, i-propyl orthosilicate, n-butyl orthosilicate, sec-butyl orthosilicate, and t-butyl orthosilicate) and a hydrolysed product thereof.

The surface treatment using a coupling agent can be conducted by adding the coupling agent to a dispersion of inorganic fine particles, and leaving the mixture at the room temperature to 60° C., for several hours to 10 days. An inorganic acid (e.g., sulfuric acid, hydrochloric acid, nitric acid, chromic acid, hydrochlorous acid, boric acid, ortho silicic acid, phosphoric acid, carbonic acid), an organic acid (e.g., acetic acid, polyacrylic acid, benzensulfonic acid, phenol, polyglutamic acid), or a salt thereof (e.g., metal salt, ammonium salt) can be added to the dispersion to accelerate the reaction of the surface treatment. Further, a heat treatment may be conducted.

(2) Binder

The binder polymer is preferably a polymer having a main chain of saturated hydrocarbon or polyether, more preferably a polymer having a main chain of saturated hydrocarbon. The binder polymer is preferably cross-linked. The polymer having a main chain of saturated hydrocarbon is preferably prepared by polymerization of ethylenically unsaturated monomers. For preparing a cross-linked binder polymer, monomers having two or more ethylenically unsaturated groups are preferably used.

Examples of the monomers having two or more ethylenically unsaturated groups include esters of a polyhydric alcohol and a (meth)acrylic acids (e.g., ethyleneglycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, pentaerythritol hexa (meth)acrylate, 1,3,5-cyclohexanetriol triacrylate, polyurethane polyacrylate, polyester polyacrylate), vinyl benzene and its derivatives (e.g., 1,4-divinylbenzene, 4-vinylbenzoic acid-2-acryloylethyl ester, 1,4-divinylcyclohexanone), vinylsulfones (e.g., divinylsulfone) and acrylamides (e.g., methylene-bis-acrylamide) and methacrylamides.

The polymer having a main chain of polyether is preferably synthesized by ring-opening polymerization of a polyfunctional epoxy compound.

In place of or in addition to the monomer having two or more ethylenically unsaturated groups, crosslinked structure may be introduced into the binder polymer by the reaction of a crosslinking group. Examples of the cross-linking functional group include isocyanate group, epoxy group, aziridine group, oxazoline group, aldehyde group, carbonyl group, hydrazine group, carboxyl group, methylol group, and active methylene group. Vinylsulfonic acid, acid anhydride, cyanoacrylate derivatives, melamine, etherified methylol, esters and urethane are also used to introduce the cross-linked structure. The functional groups, which exhibit cross-linking properties as a result of decomposition reaction, such as blocked isocyanate group, are also usable.

Further, the term "crosslinking group" in this specification is not restricted to the above-mentioned compounds, but can be a group, which exhibits a reactivity as a result of decomposition reaction of the functional group, as mentioned above.

The binder polymer is preferably formed by the steps of adding monomers to a coating solution for the low-refractive-index layer, and conducting polymerization (and if desired, crosslinking reaction) simultaneously or after the low-refractive-index layer is coated. For polymerization reaction, a polymerization initiator is preferably used. Examples of the initiator include the above-mentioned thermal polymerization initiators and photopolymerization initiators.

To a coating solution for the low-refractive-index layer, a small amount of a polymer such as polyvinyl alcohol, polyoxyethylene, polymethylmethacrylate, polymethylacrylate, diacetyl cellulose, triacetyl cellulose, nitro cellulose, polyester, and alkyd resins, may be added.

[Low-refractive-index Layer]

The low-refractive-index layer is preferably a layer that contains the above-described inorganic fine particles and polymers, and also it has micro voids among these particles.

The low-refractive-index layer has a refractive index preferably in the range of 1.30 to 1.55, and more preferably 1.35 to 1.50.

The low-refractive-index layer has a thickness preferably in the range of 30 nm to 200 nm, more preferably in the range of 50 nm to 150 nm, and most preferably in the range of 60 nm to 120 nm.

The haze of the low-refractive-index layer is preferably 5% or less, more preferably 3% or less, and most preferably 1% or less.

The mechanical strength of the low-refractive-index layer is preferably H or more, more preferably 2H or more, and most preferably 3H or more, in terms of the pencil hardness per Kg load.

[Transparent Support]

An anti-reflection film preferably has a transparent support, except for the case where the anti-reflection film is placed directly on the surface of a CRT screen or a lens.

As a transparent support, a plastic film is preferably used. Examples of the plastic film materials include cellulose esters (e.g., triacetyl cellulose, diacetyl cellulose, propionyl cellulose, butyryl cellulose, acetylpropionyl cellulose, and nitro cellulose), polyamides, polycarbonates, polyesters (e.g., polyethylene terephthalate, polyethylene naphthalate, poly-1,4-cyclohexanedimethyleneterephthalate, polyethylene-1,2-diphenoxyethane-4,4'-dicarboxylate, polybutylene terephthalate), polystyrene (e.g., syndiotactic polystyrene), polyolefins (e.g., polypropyrene, polyethylene, and polymethylpentene), polysulfones, polyethersulfones, polyarylates, polyether imides, polymethylmethacrylates, and polyether ketones. Triacetyl cellulose, polycarbonate, polyethylene terephthalate and polyethylene naphthalate are preferred. Triacetyl cellulose is particularly preferable. A triacetyl cellulose film subjected to saponification treatment is also preferably used.

The film thickness of the transparent support is preferably 1 to 300 $\mu$m, more preferably 30 to 150 $\mu$m, and particularly preferably 50 to 120 $\mu$m. The transparent support preferably has a light transmission of 80% or more, more preferably 86% or more. The haze of the support preferably 2.0% or less, more preferably 1.0% or less. The support preferably has a refractive index of 1.4 to 1.7.

[Hard Coat Layer]

In order to give scratch-resistance to a transparent support, a hard coat layer is preferably provided to the surface of the support.

The hard coat layer preferably contains crosslinked polymers. The hard coat layer containing a crosslinked polymer can be prepared by coating a coating solution containing polyfunctional monomers and a polymerization initiator on a transparent support, and thereafter polymerizing the polyfunctional monomers. The polyfunctional monomers are preferably esters of a polyhydric alcohol and an acrylic acid or methacrylic acid. Examples of the polyhydric alcohols include ethylene glycol, 1,4-cyclohexanol, pentaerythritol, trimethylolpropane, trimethylolethane, dipentaerythritol, 1,2,4-cyclohexanol, polyurethane polyol, and polyester polyol of these materials, trimethylolpropane, pentaerythritol, dipentaerythritol, and polyurethane polyol are preferred. Two or more kinds of polyfunctional monomers may be used in combination.

For a polymerization reaction of polyfunctional monomers, a photopolymerization initiator is preferably used. Examples of the photopolymerization initiator include acetophenones, benzophenones, Michler's benzoylbenzoate, α-amyloxime ester, tetramethylthiuram monosulfide, and thioxanthones. In addition to the photopolymerization initiator, a photosensitizer may be used. Examples of the photosensitizer include n-butyl amine, triethyl amine, tri-n-butylphosphine, Michler's ketone, and thioxanthones.

The photopolymerization initiator is preferably used in the range of 0.1 to 15 parts by weight, and more preferably in the range of 1 to 10 parts by weight, based on 100 parts by weight of the polyfunctional monomer.

The photopolymerization reaction is preferably carried out by an ultraviolet ray irradiation, after the hard coat layer is coated and dried.

Filler is preferably added to the hard coat layer. The filler has functions to enhance the hardness of the hard coat layer, and to restrain shrinkage on curing of polyfunctional monomers. As filler, inorganic or organic fine particles are preferably used. Examples of the inorganic fine particles include silicon dioxide particles, titanium dioxide particles, aluminium oxide particles, zirconium oxide particles, tin oxide particles, calcium carbonate particles, barium sulfate particles, talc, kaolin, and calcium sulfate particles. Examples of the organic fine particles include methacrylic acid/methacrylate copolymer, silicone resins, polystyrene, polycarbonate, acrylic acid/stylene copolymer, benzoguanamine resins, melamine resins, polyolefin, polyester, polyamide, polyimide, and polyfluoroethylene.

The fine particles, which are used as a filler, has a mean particle size preferably in the range of 0.01 to 2 $\mu$m, more preferably in the range of 0.02 to 0.5 $\mu$m.

To the hard coat layer or a coating solution thereof, a coloring agent (pigments or dyes), an antiforming agent, a thickener, a leveling agent, a flame retardant, an ultra violet absorber, an antioxidant, or a modifier resin may further been added.

The hard coat layer preferably has a thickness in the range of 1 to 15 $\mu$m.

[Over Coat Layer]

Figure 5:
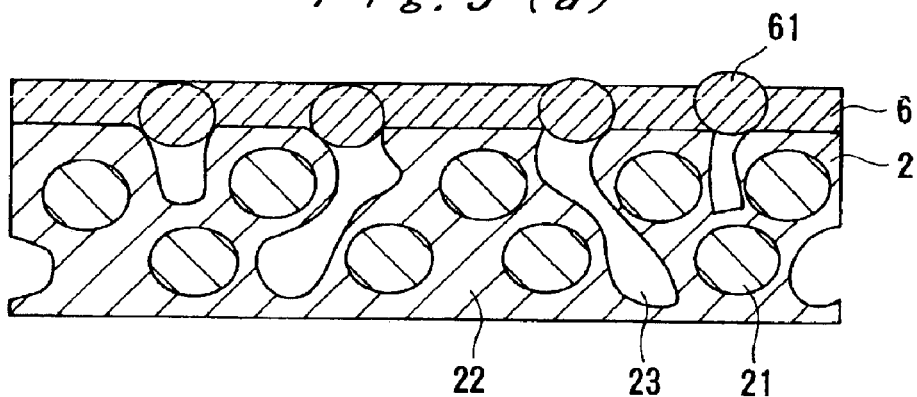
FIGS. 5(a)–(c) are sectional schematic views of a low-refractive-index layer and an over coat layer in the respective preferred embodiments of the present invention.
Figure 5:
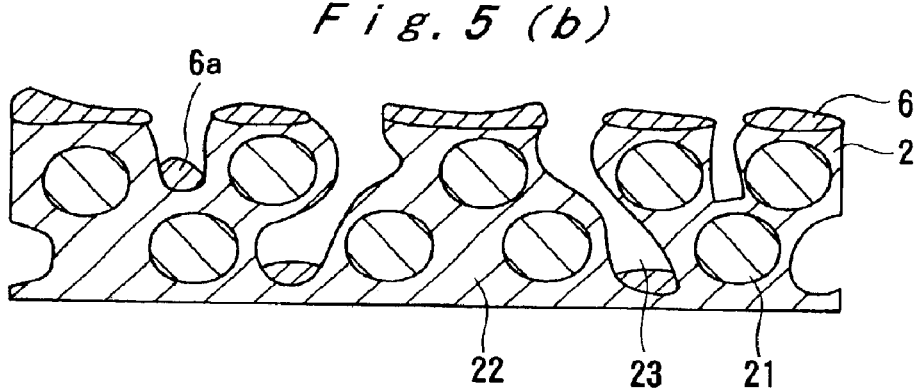
Figure 5:
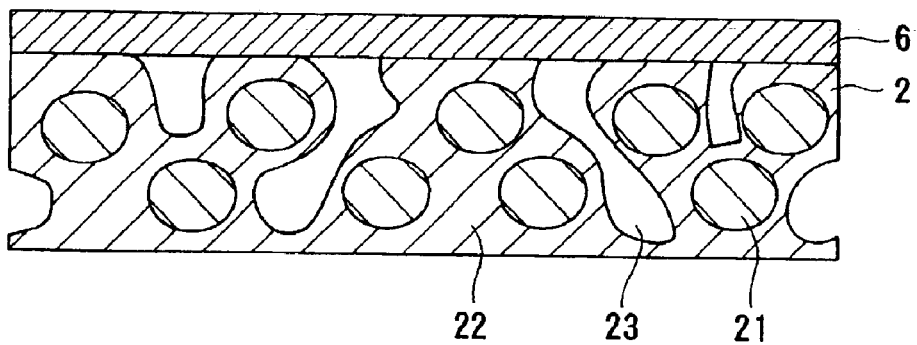

Each of FIGS. 5(a)–(c) is a sectional schematic view of a low-refractive-index layer (2) and an over coat layer (6) in a preferred embodiment of the present invention. The low-refractive-index layer (2) contains inorganic fine particle (21) and a polymer (22). Voids (23) are made between the particles.

The over coat layer (6) shown in FIG. 5(a) contains fine particles of fluorine-containing compound (61). Since the openings of voids (23) in the low-refractive-index layer (2) are closed by the fine particles of fluorine-containing compound (61), the voids (23) remain in the low-refractive-index layer (2) after the formation of the over coat layer (6).

Concerning the over coat layer (6) shown in FIG. 5(b), the coating amount of the material of the over coat layer (6) is adjusted to such a degree that all of the voids in the low-refractive-index layer (2) are not filled up. Therefore, the voids (23) remain in the low-refractive-index layer (2) after the formation of the over coat layer (6). In FIG. 5(b), the material of the over coat layer (6a) occupys a part of the voids (23).

FIG. 5(c) is a sectional schematic view of a low-refractive-index layer and an over coat layer in the most preferable embodiment of the present invention. The over coat layer (6) is made of a fluorine-containing polymer having a weight-average molecular weight of 20,000 or more. The over coat layer (6) covers unevenness of the surface of the low-refractive-index layer, but does not come into the voids (23) inside the low-refractive-index layer. Therefore, the voids (23) remain in the low-refractive-index layer (2) after the formation of the over coat layer (6). In this embodiment, even if the coating amount of the over coat layer (6) is set up to a value more than the volume of the voids (23) in the low-refractive-index layer, the voids remain. Therefore, in the embodiment shown in FIG. 5(c), the over coat layer (6) covers the surface of the low-refractive-index layer (2) as a continuous layer.

The over coat layer is formed by applying a coating solution comprising a fluorine-containing compound on the low-refractive-index layer. In the present invention, the percentage of the material of the over coat layer that occupies (fills) voids in the low-refractive-index layer is generally less than 70% by volume, preferably less than 50% by volume, more preferably less than 40% by volume, still more preferably less than 30% by volume, and most preferably less than 20% by volume.

The refractive index of the fluorine-containing compound for use in the overcoat layer is preferably 1.35 to 1.50, more preferably 1.36 to 1.47, and further preferably 1.38 to 1.45.

The fluorine-containing compound used in the over coat layer preferably contains 35–80% by weight, and more preferably 45–75% by weight of fluorine atoms.

As the fluorine-containing compound, there is preferably used a fluorine-containing surfactant, a fluorine-containing polymer, a fluorine-containing ether or a fluorine-containing silane compound.

The hydrophilic moiety of the fluorine-containing surfactant may be anionic, cationic, nonionic, or amphoteric. In the fluorine-containing surfactant, a part or all of hydrogen atoms of hydrocarbon that constitute the hydrophobic moiety thereof are substituted with fluorine atoms.

The fluorine-containing polymer is preferably synthesized by crosslinking reaction or polymerization reaction of an ethylenic unsaturated monomer containing fluorine atom(s). Examples of the ethylenic unsaturated monomer containing fluorine atom(s) include fluoroolefin (for example, fluoroethylene, vinylidene fluoride, tetrafluoroethylene, hexafluoropropylene, perfluoro-2,2-dimethyl-1,3-dioxol), fluorinated vinyl ether, and an ester of a fluorine-substituted alcohol and acrylic acid or methacrylic acid. A copolymer comprising a repeating unit containing a fluorine atom, and a repeating group containing no fluorine atom, may be used as the fluorine-containing polymer. The repeating unit containing no fluorine atom is preferably obtained by polymerization reaction of the ethylenically unsaturated monomer containing no fluorine atom. Examples of the ethylenically unsaturated monomer that contains no fluorine atom include olefins (for example, ethylene, propylene, isoprene, vinyl chloride, and vinylidene chloride), acrylic esters (for example, methyl acrylate, ethyl acrylate, acrylic acid-2-ethylhexyl), methacrylic esters (for example, methyl methacrylate, ethyl methacrylate, butyl methacrylate, and ethyleneglycol dimethacrylate), styrenes and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-tert-butylacrylamide, N-cyclohexylacrylamide), methacrylamides and acrylonitrile.

The fluorine-containing ether is a compound, which is generally used as a lubricant. An example of the fluorine-containing ether is perfluoropolyether.

Examples of the fluorine-containing silane compound include silane compounds containing a perfluoroalkyl group (for example, (heptadecafluoro-1,2,2,2-tetradecyl)triethoxysilane).

It is especially preferable that the fluorine-containing polymer is used in the over coat layer. The fluorine-containing polymer preferably has a crosslinking group or polymerizable group. The crosslinking group or polymerizable group is introduced as a side chain into the fluorine-containing polymer. The crosslinking group or polymerizable group is a functional group causing the fluorine-containing polymer to be crosslinked or polymerized by reaction based on irradiation of light (preferably ultraviolet rays), irradiation of an electron beam (EB), or heating. Examples of the crosslinking group or polymerizable group include acryloyl, methacryloyl, isocyanate, epoxy, aziridine, oxazoline, aldehyde, carbonyl, hydrazine, carboxyl, methylol, and active methylene groups. As the crosslinking fluorine polymer, commercially available products may be used.

The crosslinking reaction or polymerization (light irradiation, irradiation of an electron beam, and heating) of the fluorine-containing polymer is preferably performed at the same time when the over coat layer is applied or after the application of the layer.

In the case that the fluorine-containing compound is used in the form of fine particles, the particle size thereof is preferably 5–60 nm, more preferably 10–40 nm, and most preferably 15–35 nm.

The coating amount of the over coat layer is preferably adjusted in the manner that the percentage of the material of the over coat layer, which occupies voids made in the low-refractive-index layer before the formation of the over coat layer, is preferably less than 70% by volume, more preferably less than 60% by volume, and most preferably less than 50% by volume.

The thickness of the over coat layer is preferably 1–50 nm, more preferably 3–25 nm, and most preferably 5–20 nm.

[Anti-reflection Film]

It is allowable to add, to the respective layers of the anti-reflection film or a coating solution thereof, not only the above-mentioned components (the inorganic fine particles, the polymer, the dispersing medium, the polymerization initiator, and the polymerization accelerator) but also a polymerization inhibitor, a leveling agent, a thickener, an anti-coloring agent, an ultraviolet ray absorber, a silane coupling agent, an antistatic agent, and an adhesive agent.

Examples of the leveling agent include fluorinated alkyl esters (for example, FC-430 and FC-431 (trade names) made by Sumitomo 3M Ltd.), and polysiloxanes (for example, SF1023, SF1054, and SF1079 (trade names) made by General Electric Co., DC190, DC200, DC510, and DC1248 (trade names) made by Dow Corning Co., and BYK300, BYK310, BYK320, BYK322, BYK330, and BYK370 (trade names) made by BYK Chemie Co.).

The respective layers of the anti-reflection film can be formed by application, according to any one of dip coat, air knife coat, curtain coat, roller coat, wire bar coat, gravure coat, and extrusion coat (described in U.S. Pat. No. 2,681,294) methods. Two or more layers may be applied at the same time. The method for application at the same time is described in U.S. Pat. Nos. 2,761,791, 2,941,898, 3,508,947, and 3,526,528, and in p. 253 of "Coating Kogaku (Coating Engineering)" written by Yuji Harasaki and published by Asakura Syoten (1973).

The reflectivity of the anti-reflection film is preferably as low as possible. Specifically, the average reflectance in the wavelength range of 450 to 650 nm is preferably 2% or less, more preferably 1% or less, and most preferably 0.7% or less. The haze of the anti-reflection film is preferably 3% or less, more preferably 1% or less, and most preferably 0.5% or less. The strength of the anti-reflection film is preferably H or more, more preferably 2H or more, and most preferably 3H or more according to 1 kg load pencil hardness.

A layer other than the above-mentioned layers may be fitted to the anti-reflection film. For example, an adhesive layer, a shield layer, a slip layer, or an antistatic layer, as well as a hard coat layer, may be provided on the transparent support. The shield layer is provided to shield electromagnetic waves and infrared rays.

The anti-reflection film may have an antiglare function for scattering light from the outside. The antiglare function can be gained by making unevenness in a surface of the anti-reflection film. For example, relatively large grains (grain size: 50 nm to 2 $\mu$m) may be added in a small amount (0.1 to 50% by weight) to the low-refractive-index layer, the high-refractive-index layer, the middle-refractive-index layer, or the hard coat layer. In the case that the anti-reflection film has the antiglare function, the haze of the anti-reflection film is preferably 3–30%, more preferably 5–20%, and most preferably 7–20%.

The anti-reflection film is used in an image display device such as a liquid crystal display device (LCD), a plasma display panel (PDP), an electroluminescence display (ELD), or a cathode ray tube display device (CRT). The transparent support side of the anti-reflection film is bonded to the image display face of an image display device.

Figure 6:
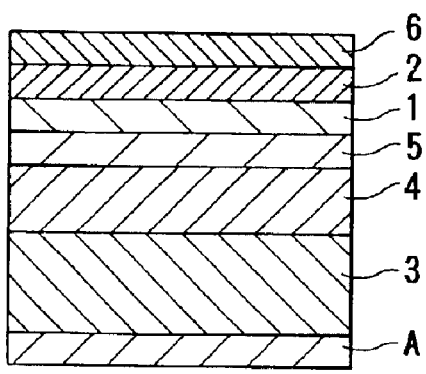
FIGS. 6(a)–(d) are sectional schematic views showing various embodiments wherein an anti-reflection film is applied in an image display device respectively.
Figure 6:
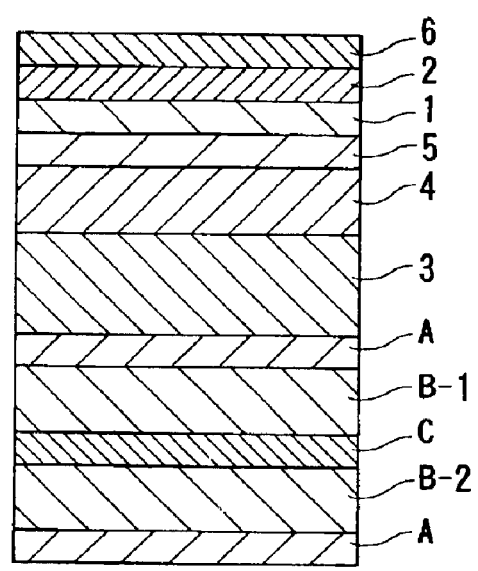
Figure 6:
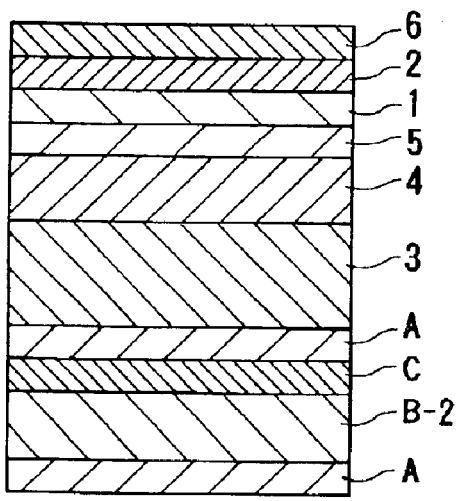
Figure 6:
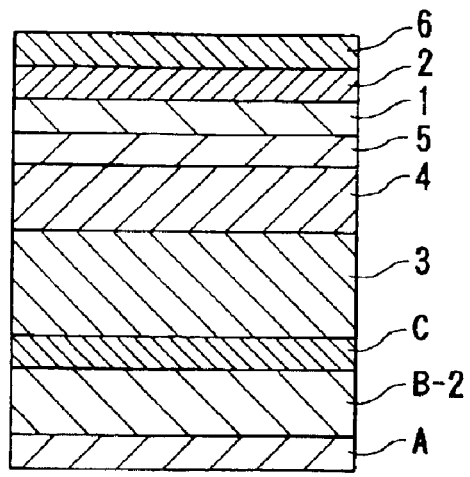

FIGS. 6(a)–(d) are sectional schematic views of various embodiments wherein an anti-reflection film is used in an image display device. FIG. 6(a) shows a preferred embodiment wherein an anti-reflection film is used in a PDP, an ELD or a CRT. Concerning to the anti-reflection film, its transparent support (3) is bonded to the image display face of an image display device through an adhesive layer (A).

FIGS. 6(b), (c) and (d) show preferred embodiments wherein an anti-reflection film is used in an LCD. In FIG. 6(b), concerning to an anti-reflection film, its transparent support (3) is bonded to a polarizing plate protecting film (B-1) through an adhesive layer (A), and the other polarizing plate preventing film (B-2) is bonded to the image display face of an image display device through an adhesive layer (A).

In FIG. 6(c), concerning to an anti-reflection film, its transparent support (3) is bonded to a polarizing plate (C) through an adhesive layer (A), and a polarizing plate protecting film (B-2) is bonded to the image display face of an image display device through an adhesive layer (A).

In FIG. 6(d), concerning to an anti-reflection film, its transparent support (3) is bonded directly to a polarizing plate (C), and a polarizing plate protecting film (B-2) is bonded to the image display face of an image display device through an adhesive layer (A).

Additives such as grains and dyes may be added to the adhesive layer (A).

With respect to the Embodiment 1, additional modifications or changes can be made as described in items (i) to (viii) below.

(i) The anti-reflection film according to (1) to (10), in which one of the high-refractive-index layer or low-refractive index layer is formed by crosslinking reaction or polymerization reaction of an ionizing-radiation-curable resin composition, under atmosphere where oxygen concentration is 15 vol % or less.

(ii) The anti-reflection film according to (i), wherein the atmosphere of oxygen concentration of 15 vol % or less is realized by purging by nitrogen.

(iii) The anti-reflection film according to (i) or (ii), wherein the oxygen concentration is 6 vol % or less.

(iv) An anti-reflection film, in which any one of the anti-reflection film according to (1) to (10) and (i) to (iii) is formed on a transparent support composed of triacetyl cellulose.

(v) The anti-reflection film according to any one of (1) to (10), and (i) to (iv), wherein a surface of the film at the side of the low-refractive-index layer has a dynamic friction coefficient of 0.25 or less.

(vi) The anti-reflection film according to any one of (1) to (10), and (i) to (v), wherein the surface of the film at the side of said low-refractive-index layer, has a contact angle of 90 degrees or more with water.

(vii) A polarizing plate, which comprises the anti-reflection film according to any one of (1) to (10) and (i) to (vi), on or as at least one of the protective films of the polarizing film.

(viii) An image display device, in which the anti-reflection film according to any one of (1) to (10) and (i) to (vi), or the polarizing plate according to (vii), is disposed on the image display surface.

In addition, the descriptions of the preferable mode in the Embodiment 1 are given below.

[Polymer Composed of Organic Compound in High-refractive-index Layer and Middle-refractive-index Layer]

When the polymer is formed by photopolymerization, it is preferable to conduct the formation under the atmosphere where the oxygen concentration is 15 vol % or less.

For example, the polymer can be formed by applying, on a transparent support, a coating solution containing a composition of an ionizing-radiation-curable resin having a photopolymerizing functional group (a polyfunctional monomer and a polyfunctional oligomer, or the like), and then by subjecting the ionizing-radiation-curable resin composition to photocrosslinking reaction or photopolymerization reaction.

As the photopolymerizing functional polymer, an unsaturated polymerizing functional group, such as an acryloyloxy group, methacryloyloxy group, vinyl group, styryl group, allyl group, or the like, can be mentioned. Among these, an acryloyloxy group is preferable.

Specific example of the photopolymerizing polyfunctional monomer having a photopolymerizing functional group may include, (meth)acrylic diesters of alkyleneglycol such as, neopentyl glycol acrylate, 1,6-hexanediol(meth) acrylate, propyleneglycol (meth)acrylate; (meth)acrylic diesters of polyoxyalkyleneglycol such as, triethyleneglycol di(meth)acrylate, dipropyleneglycol di(meth)acrylate, polyethyleneglycol di(meth)acrylate, polypropyleneglycol di(meth)acrylate; (meth)acrylic diesters of polyhydric alcohol, such as pentaerythritol di(meth)acrylate; and (meth) acrylic diesters of ethyleneoxide or propyleneoxide adducts such as, 2,2-bis{4-(acryloxy.diethoxy)phenyl}propane, 2,2-bis{4-(acryloxy.polypropoxy)phenyl}propane.

In addition to the above, epoxy(meth)acrylates, urethane (meth)acrylates, polyester(meth)acrylates, can be preferably used as a photopolymerizable polyfunctional monomer.

Among the above, esters of polyhydric alcohol and (meth) acrylic acid is preferable, and a polyfunctional monomer having 3 or more (meth)acryloyloxy groups in a molecule is more preferable. In concrete, trimethylolpropane tri(meth) acrylate trimethylolethane tri(meth)acrylate, 1,2,4-cyclohexane tetra(meth)acrylate, pentaglycerol triacrylate, pentaerythritol tetra(meth)acrylate, pentaerythritol tri(meth) acrylate, (di)pentaerythritol triacrylate, (di)pentaerythritol pentaacrylate, (di)pentaerythritol tetra(meth)acrylate, (di) pentaerythritol hexa(meth)acrylate, tripentaerythritol triacrylate, tripentaerythritol hexatriacrylate can be mentioned.

Two or more of the above polyfunctional monomers can be used in combination.

In the polymerization reaction of the photopolymerizing polyfunctional monomer, a photopolymerization initiator is preferable used. As the photopolymerization initiator, a photo-radical-polymerization initiator and a photo-cation-polymerization initiator are preferable, and a photo-radical-polymerization initiator is particularly preferable.

As the specific examples of the photo-radical-polymerization initiator, can be mentioned are acetophenones, benzophenones, Michler's benzoylbenzoates, α-amyloxime esters, tetramethylthiuram monosulfide, and thioxanthones.

As a commercially available photo radical polymerization initiator, can be mentioned are KAYACURE (DETX-S, BP-100; BDMK, CTX, BMS, 2-EAQ, ABQ, CPTX, EPD, ITX, QTX, BTC, MCA, or the like) (trade names) manufactured by Nippon Kayaku Co., Ltd., IRGACURE (651, 184, 500, 907, 369, 1173, 2959, 4265, 4263, or the like) (trade names) manufactured by Nippon Ciba-Geigy Co., Esacure (KIP100F, KB1, EB3, BP, X33, KTO46, KT37, KIP150, TZT, or the like) (trade names) manufactured by Thertomer Co.

Particularly, a photocleavage-type photo-radical-polymerization initiator is preferable. The photocleavage-type photo-radical-polymerization initiator is described in "Saishin UV-Koka Gijutsu (New UV Curing Technology)" page 159, published by Kazuhiro Takabo; publishing company, Gijutsu Joho Kyokai, 1991).

As a commercially available photocleavage-type photo-radical-polymerization initiator, Irugacure (651, 184, and 907) (trade names) manufactured by Nippon Ciba-Geigy Co., or the like can be mentioned.

The photopolymerization initiator is preferably used in the rage of 0.1 to 15 weight parts, and more preferably 1 to 10 weight parts, to 100 weight parts of the polyfunctional monomer.

In addition to the photopolymerization initiator, a photosensitizer can be utilized. Examples of the photosensitizer include n-butyl amine, triethyl amine, tri-n-butylphosphine, Michler's ketones, and thioxanthones.

As a commercially available photosensitizer, KAYACURE (DMBI, EPA) (trade names) manufactured by Nippon Kayaku Co., Ltd. or the like can be mentioned.

The chemical resistance and physical strength (abrasion resistance or the like) of high-refractive-index layer, and middle-refractive-index layer can be improved by forming the polymer under the atmosphere where the oxygen concentration is 15 vol % or less.

Preferably the formation of polymer by crosslinking reaction or polymerization reaction is conducted under atmosphere of oxygen concentration being 6 vol % or less, and further preferably oxygen concentration being 3 vol % or less, and particularly preferably oxygen concentration being 2 vol % or less.

As a method to make the oxygen concentration being 15 vol % or less, preferable is a method wherein the air (nitrogen concentration, about 79 vol %; oxygen concentration about 21 vol %) is displaced with another gas, and particularly preferable is a method wherein the air is displaced by nitrogen (purging by nitrogen).

[Polymer in Low-refractive-index Layer]

(2) Binder

The polymerization reaction of the binder polymer is preferably a photopolymerization reaction when a binder polymer is formed by photopolymerization reaction, it is preferable to conduct the reaction under atmosphere of an oxygen concentration of 15 vol % or less.

By forming the binder polymer under the atmosphere of the oxygen concentration of 15 vol % or less, it is possible to improve the chemical resistance and physical strength (abrasion resistance property or the like) of the low-refractive-index layer.

Preferably the formation of binder polymer by crosslinking reaction or polymerization reaction is conducted under atmosphere of oxygen concentration being 6 vol % or less, and further preferably oxygen concentration being 3 vol % or less, and particularly preferably oxygen concentration being 2 vol % or less.

As a method to make the oxygen concentration being 15 vol % or less, preferable is a method wherein the air (nitrogen concentration, about 79 vol %; oxygen concentration about 21 vol %) is displaced with another gas, and particularly preferable is a method wherein the air is displaced by nitrogen (nitrogen purge).

[Anti-reflection Film]

The reflectivity of the anti-reflection film is preferably as low as possible. Specifically, the average reflectance in the wavelength range of 450 to 650 nm is preferably 2% or less, more preferably 1% or less, and most preferably 0.7% or less. The haze of the anti-reflection film is preferably 3% or less, more preferably 1% or less, and most preferably 0.5% or less.

To further improve physical strength (such as abrasion resistance) of the anti-reflection film, the dynamic friction coefficient of the surface of the side having the low-refraction-index layer is preferably 0.25 or less. Herein, the dynamic friction coefficient means a dynamic friction coefficient between a stainless steel ball having a diameter of 5 mm and the surface of the low-refractive-index layer side; when the stainless steel ball is moved on the surface of the low-refractive-index layer side, under a load of 100 g onto the stainless steel ball, at a rate of 60 cm/min. The dynamic friction coefficient is more preferably 0.17 or less, and particularly preferably 0.15 or less. In addition, the film strength of the anti-reflection film is preferably H or more, more preferably 2H or more, and particularly preferably 3H or more, in the pencil hardness test according to JIS K 5400.

Further, to improve the stainproofing property of the anti-reflection film, the contact angle of the surface of the side having the low-refractive-index layer with water is preferably 90 degrees or more, more preferably 95 degrees or more, and particularly preferably 100 degrees or more.

Both the values of the dynamic friction coefficient and the contact angle with water are preferably kept even after application of the anti-reflection film of the present invention to a polarizing plate.

A layer other than the above-mentioned layers may be provided on to the anti-reflection film. For example, an adhesive layer, a shield layer, a slip layer, or an antistatic layer, as well as a hard coat layer, may be provided on the transparent support. The shield layer is provided to shield electromagnetic waves and infrared rays.

It is allowable to add, to the respective layers of the anti-reflection film or a coating solution thereof, not only the above-mentioned components (the inorganic fine particles, the polymer, the dispersing medium, the polymerization initiator, and the polymerization accelerator) but also a polymerization inhibitor, a leveling agent, a thickener, an anti-coloring agent, an ultraviolet ray absorber, a silane coupling agent, an antistatic agent, and an adhesive agent.

Examples of the leveling agent include fluorinated alkyl esters (for example, FC-430 and FC-431 (trade names) made by Sumitomo 3M Ltd.), and polysiloxanes (for example, SF1023, SF1054, and SF1079 (trade names) made by General Electric Co., DC190, DC200, DC510, and DC1248 (trade names) made by Dow Corning Co., and BYK300, BYK310, BYK320, BYK322, BYK330, and BYK370 (trade names) made by BYK Chemie Co.).

[Image Display Device]

The anti-reflection film is used in an image display device such as a liquid crystal display device (LCD), a plasma display panel (PDP), an electro luminescence display (ELD), or a cathode ray tube display device (CRT). The transparent support side of the anti-reflection film is bonded to the image display face of an image display device.

FIG. 6(a)–(d) is a summarized sectional view which typically shows various embodiments of the application of the anti-reflection film of the present invention to an image display device.

Second Embodiment of the Invention (Embodiment 2)

The following will describe an anti-reflection film having a low-refractive-index layer, wherein fine voids are made between short fibrous inorganic fine particles, referring to drawings showing a basic constitution of the anti-reflection film.

FIGS. 7(a)–(d) are sectional schematic views showing a layer constitution of an anti-reflection film, when the anti-reflection film has multiple layers.

Figure 7:
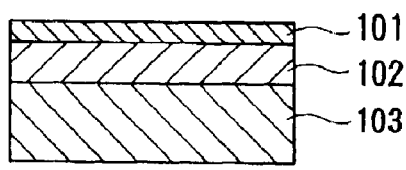
FIGS. 7(a)–(d) are sectional views schematically illustrating examples (a), (b), (c) and (d) of the multi-layered anti-reflection film in the present invention.
Figure 7:
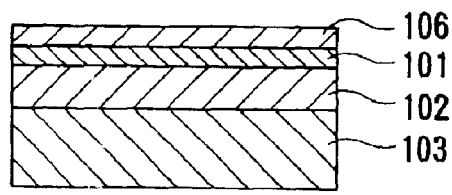
Figure 7:
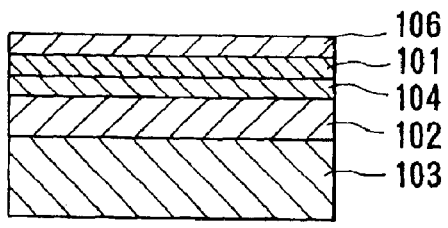
Figure 7:
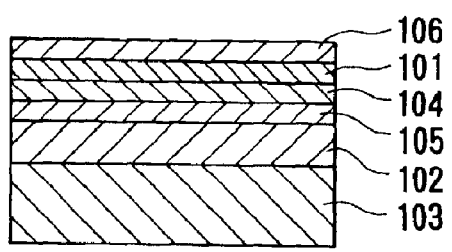

The embodiment shown in FIG. 7(a) has a layer constitution of a transparent support (103), a hard coat layer (102), and a low-refractive-index layer (101), in this order. The transparent support (103) and the low-refractive-index layer (101) have the refractive indices satisfying the following relationship.

Refractive index of transparent support>Refractive index of low-refractive-index layer Further, in the case that an anti-reflection film is placed on the surface of a hard material as a glass (a screen surface of CRT, and a lens surface of glasses and cameras), a low-refractive-index layer (101) and a hardcoat layer (102) may be formed directly on the screen surface or the lens surface, without a transparent support (103).

The embodiment shown in FIG. 7(b) has a layer constitution of a transparent support (103), a hardcoat layer (102), a low-refractive-index layer (101), and a over coat layer (106), in this order. The transparent support (103) and the low-refractive-index layer (101) have the refractive indices satisfying the following relationship.

Refractive index of transparent support>Refractive index of low-refractive-index layer The embodiment shown in FIG. 7(c) has a layer constitution of a transparent support (103), a hard coat layer (102), a high-refractive-index layer (104), a low-refractive-index layer (101), and a over coat layer (106), in this order. The transparent support (103), the high-refractive-index layer (104), and the low-refractive-index layer (101) have the refractive indices satisfying the following relation.

> Refractive index of high-refractive-index layer>Refractive index of transparent support>Refractive index of low-refractive-index layer With respect to the anti-reflection film having the layer constitution as shown in FIG. 7(c), as described in JP-A-59-50401, each of the high-refractive-index layer and the low-refractive-index layer preferably satisfies the above mentioned equation (I) and equation (II), respectively.

The embodiment shown in FIG. 7(d) has a layer constitution of a transparent support (103), a hard coat layer (102), a middle-refractive-index layer (105), a high-refractive-index layer (104), a low-refractive-index layer (101), and a over coat layer (106), in this order. The transparent support (103), the middle-refractive-index layer (105), the high-refractive-index layer (104), and the low-refractive-index layer (101) have the refractive indices satisfying the following relationship.

> Refractive index of high-refractive-index layer>Refractive index of middle-refractive-index layer>Refractive index of transparent support>Refractive index of low-refractive-index layer With respect to the anti-reflection film having the layer constitution as shown in FIG. 7(d), as described in JP-A-59-50401, each of the middle-refractive-index layer, the high-refractive-index layer, and the low-refractive-index layer preferably satisfies the above-mentioned equations (III), (IV) and (V), respectively.

[Short Fibrous Inorganic Fine Particles in Low-refractive-index Layer]

Figure 8:
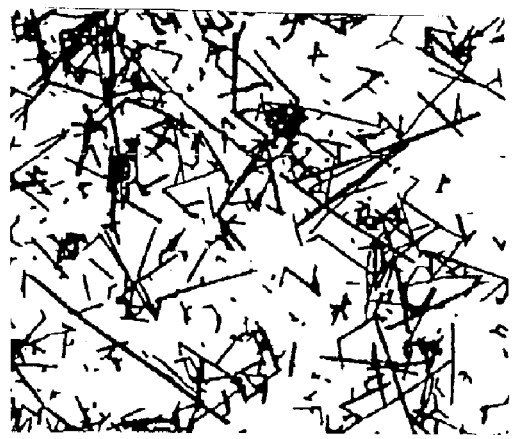
FIGS. 8(a)–(c) are electromicro photographs showing examples (a), (b), and (c) of the short fibrous inorganic fine particles for use in the present invention.
Figure 8:
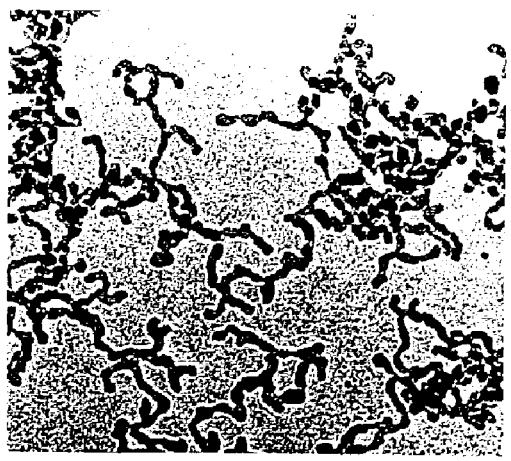
Figure 8:
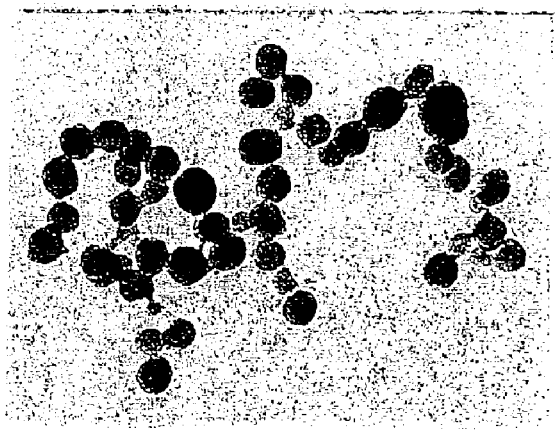

Preferable examples of the short fibrous inorganic fine particles include (a) needle-shaped particles, (b) chain-state particles formed by plural sphere particles connected with each other, and (c) pearl-like (pearl necklace-shaped) particles formed by plural sphere particles connected with each other, as shown in FIG. 8, are preferred. Especially, chain-state particles formed by plural sphere particles connected with each other as shown in FIG. 8(b) are preferable.

As to the size of the particles, preferred are a mean diameter (D) of 5 to 30 nm, a length (L) of 15 to 100 nm, and an aspect ratio (L/D) of 3 to 20, more preferably a mean diameter (D) of 5 to 25 nm, a length (L) of 20 to 80 nm, and an aspect ratio (D/L) of 4 to 15, particularly preferably a mean diameter (D) of 5 to 20 nm, a length (L) of 30 to 60 nm, and an aspect ratio (L/D) of 3 to 10.

Preferably the short fibrous inorganic fine particles (inorganic short fibers) are made of a metal oxide. The metal atom is as same to those mentioned in the description of [Inorganic fine particles in low-refractive-index layer] of the above-described embodiment 1. Inorganic materials comprising two kinds of metals may be used, as same to the description of [Inorganic fine particles in low-refractive-index layer] of the above-described embodiment 1.

The short fibrous inorganic fine particles are made of a main component of these metal oxides, and they may further contain other element(s). The term "main component" means a component having the largest content (% by weight) among components forming the particles. Examples of the other elements is similar to the description of [Inorganic fine particles in low-refractive-index layer] of the above-described embodiment 1. The short fibrous inorganic fine particles are preferably amorphous. The short fibrous inorganic fine particles are especially preferably silica.

The short fibrous inorganic fine particles can be directly prepared by sol-gel method, or precipitation method, as a dispersion. Further, powder of short fibrous inorganic fine particles produced by a drying and sedimentation method can be mechanically crushed to obtain a dispersion. Further, some short fibrous inorganic fine particles which are commercially available (e.g., silicon dioxide sol) may be used.

As described in JP-A-11-61043, the short fibrous inorganic fine particles can be produced by a method comprising the following steps: (1) ammonia is added to a mixed solution containing water, an organic solvent, and an alkoxysilane, thereby conducting hydrolysis of the alkoxysilane to form silica fine particles having a grain size ranging from 5 to 30 nm, (2) after the reaction, the unreacted alkoxysilane, the organic solvent, and the catalyst are removed from the resulted mixed solution, to form an aqueous dispersion solution of silica fine particles, (3) said aqueous dispersion solution is adjusted so that the density of silica fine particles therein becomes 0.1 to 5% by weight in terms of a solid content, and the concentration of ammonia therein becomes 50 to 400 ppm, and (4) said aqueous dispersion solution is subjected to a hydrothermal treatment at the temperature of 250° C. or more.

For a formation of the low-refractive-index layer, the short fibrous inorganic fine particles are preferably used in the state of dispersion in a suitable solvent. As a dispersion medium, used are those shown in the description of [Inorganic fine particles in low-refractive-index layer] of the above-described embodiment 1.

The amount of the short fibrous inorganic fine particles is generally from 50 to 95% by weight, preferably from 50 to 90% by weight, more preferably from 60 to 90% by weight, and especially preferably from 70 to 90% by weight, based on the low-refractive-index layer. If the amount is much less than the above-mentioned range, voids can not be formed. On the other hand, if the amount is much larger than the range, a sufficient mechanical strength cannot be obtained.

[Micro Voids Among Short Fibrous Inorganic Fine Particles of Low-refractive-index Layer]

Figure 9:
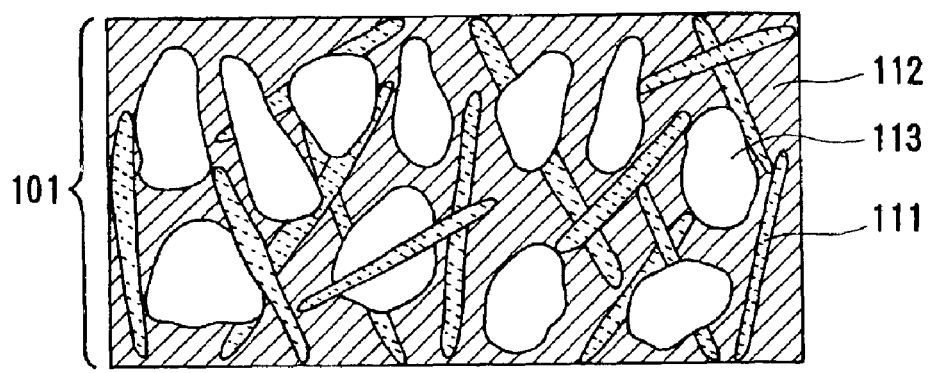
FIG. 9 is a sectional view schematically illustrating a preferable embodiment of the anti-reflection film comprising a low-refractive-index layer according to the present invention.

FIG. 9 is a sectional view schematically illustrating a low-refractive-index layer. The upside of the anti-reflection film of FIG. 9 is a surface, while an image display device or a lens is placed at the downside. The anti-reflection film may consist of only the low-refractive-index layer.

As shown in FIG. 9, micro voids (113) are formed among short fibrous inorganic fine particles (111) in the low-refractive-index layer (101). The low-refractive-index layer (111) further contains a polymer (112) in an amount of 5 to 50% by weight. The polymer (112) combines the short fibrous inorganic fine particles (111), but the voids (113) among particles are not filled with the polymer. As shown in FIG. 9, the voids (113) among particles are preferably closed with both the polymers (112) and the short fibrous inorganic fine particles (111), and therefore they are not open pores.

The void ratio of the low-refractive-index layer is 1 to 50% by volume, preferably 3 to 45% by volume, and more preferably 5 to 35% by volume.

If the void ratio increases, the refractive index of the low-refractive-index layer decreases. According to the present invention, the size of micro voids among particles also can be easily adjusted to a suitable value (so as to cause neither a light-scattering nor a problem in a mechanical strength of the low-refractive-index layer), by properly adjusting the particle size of the short fibrous inorganic fine particles. By this method, a low-refractive-index layer can be rendered to a porous film having microscopically fine voids, but an optically or macroscopically uniform film.

By a formation of micro voids, the macroscopic refractive index of the low-refractive-index layer becomes lower than the total of refractive indices of fine particles and a polymer each constituting the low-refractive-index layer. The refractive index of a layer is a total of refractive indices per volume of layer-constituting elements. The refractive index of the fine particles and the polymer is a value of more than 1, respectively, while the refractive index of air is 1.00. Therefore, a low-refractive-index layer having a very low refractive index can be obtained by a formation of micro voids.

The micro voids among particles are preferably closed by inorganic fine particles and a polymer in a low-refractive-index layer. The thus-closed voids have an advantage in that stain materials on the low-refractive-index surface are scarcely adhered to others, as compared to opening pores (apertures) that have openings toward the surface of a low-refractive-index layer.

[Polymer of Low-refractive-index Layer]

The low-refractive-index layer contains a polymer in an amount of 5 to 50% by weight. The polymer has functions not only to combine (glue) short fibrous inorganic fine particles, but also to maintain the structure of the low-refractive-index layer that contains micro voids among the particles. The amount of a polymer to be used is adjusted so as to keep the mechanical strength of the low-refractive-index layer without filling the voids with the polymer. The amount of a polymer is preferably 10 to 50% by weight, more preferably 10 to 40% by weight, and especially preferably 10 to 30% by weight, based on a total amount of the low-refractive-index layer.

In order to combine short fibrous inorganic fine particles with a polymer, it is preferable (1) to bond the polymer to a surface-treating agent for the short fibrous inorganic fine particles, or (2) to use the polymer as a binder for the short fibrous inorganic fine particles.

The polymer bonded to a surface-treating agent according to (1) is preferably the binder polymer according to (2). The polymer for use in (2) is preferably formed by adding monomers to a coating solution for the low-refractive-index layer, and then polymerizing them simultaneously with or after coating the low-refractive-index layer. Preferably (1) and (2) are carried out in combination.

(1) A surface treatment and (2) a binder are explained in this order.

(1) The description about surface treatment is the same as in the item [Polymer in low-refractive-index layer] in Embodiment 1.

(2) The description about a binder is the same as in the item [Polymer in low-refractive-index layer] in Embodiment 1.

[Low-refractive-index Layer]

The low-refractive-index layer is a layer that contains the above-described short fibrous inorganic fine particles and polymers, and also it has macro voids among these particles. The use of the short fibrous inorganic fine particles makes it difficult that a surface defect (pointing defects) occurs, as compared to a low-refractive-index layer having micro voids been formed by using, for example, spherical or amorphous inorganic fine particles. Occurrence of the pointing defects is affected by surface characteristics (unevenness, etc.) of a substrate, which carries the low-refractive-index layer thereon, and consequently they are apt to occur when such substrate carries on the surface thereof a fine particle-containing layer (for example, when fine particles are contained in a hard coat layer, a middle-refractive-index layer, or a high-refractive-index layer). The short fibrous inorganic fine particles not only effect to restrain occurrence of pointing defects in a low-refractive-index layer having micro voids among particles, but also forms a film having a very high mechanical strength.

The low-refractive-index layer has a refractive index preferably in the range of 1.30 to 1.55, and more preferably 1.35 to 1.50.

The low-refractive-index layer has a thickness of preferably in the range of 30 nm to 200 nm, more preferably in the range of 50 nm to 150 nm, and most preferably in the range of 60 nm to 120 nm.

The haze of the low-refractive-index layer is preferably 5% or less, more preferably 3% or less, and most preferably 1% or less.

The mechanical strength of the low-refractive-index layer is preferably H or more, more preferably 2H or more, and most preferably 3H or more, in the pencil hardness test according to JIS K 5400. Wherein, the mechanical strength of each of the hardcoat layer, the high-refractive-index layer, and the medium-refractive-index layer has the same preferable range as described in the above.

[Transparent Support]

The description about the transparent support is the same as in the item [Transparent support] in Embodiment 1.

[Hard Coat Layer]

The description about the hard coat layer is the same as in the item [Hard coat layer] in Embodiment 1.

[Inorganic Particles in High- and Middle-refractive-index Layers]

The refractive index of inorganic fine particles for use in the both high- and middle-refractive-index layers is preferably in the range of 1.80 to 2.80, and more preferably in the range of 1.90 to 2.80.

The weighted mean particle size of the primary particles of the inorganic fine particles is preferably 1 to 150 nm, more preferably in the range of 1 to 100 nm, and most preferably in the range of 1 to 80 nm.

The weighted mean particle size of the inorganic fine particles incorporated in the both high- and middle-refractive-index layers, which are produced, is generally in the range of 1 to 200 nm, preferably in the range of 5 to 150 nm, more preferably in the range of 10 to 100 nm, and most preferably in the range of 10 to 80 nm.

The mean particle size of the inorganic fine particles can be measured by a light-scattering method, or an electron microscopic photography.

The specific surface area of the inorganic fine particles is preferably in the range of 10 to 400 $m^2/g$, more preferably in the range of 20 to 200 $m^2/g$, and most preferably in the range of 30 to 150 $m^2/g$.

The inorganic fine particles are preferably made of metal oxides or sulfides. Examples of the metal oxides or sulfides include titanium dioxide (e.g., rutile, mixed crystals of rutile/anatase, anatase, amorphous structure), tin oxide, indium oxide, zinc oxide, zirconium oxide, and zinc sulfide. Titanium dioxide, tin oxide, and indium oxide are particularly preferred. The inorganic fine particles contain these metal oxides or sulfides as a main component, and further they may contain other elements. The term "main component" means a component having the largest content (% by weight) among those particle-composing elements. Examples of the other elements include Ti, Zr, Sn, Sb, Cu, Fe, Mn, Pb, Cd, As, Cr, Hg, Zn, Al, Mg, Si, P, and S.

The inorganic fine particles may be subjected to a surface treatment. The surface treatment can be carried out using inorganic compounds or organic compounds. Examples of the inorganic compounds for use in the surface treatment include alumina, silica, zirconium oxide, and iron oxide. Alumina and silica are preferred. Examples of the organic compounds for use in the surface treatment include polyol, alkanol amine, stearic acid, a silane coupling agent, and a titanate coupling agent. The silane coupling agent is most preferred. Two or more kinds of surface treatments may be carried out in combination.

The shape of inorganic fine particles is preferably rice grain-shaped, spherical, cubic, spindle-shaped, or amorphous.

Two or more kinds of inorganic fine particles may be used in both high- and middle-refractive-index layers, respectively.

The ratio of inorganic fine particles in the both high- and middle-refractive-index layers is generally in the range of 5 to 65% by volume, preferably in the range of 10 to 60% by volume, and more preferably in the range of 20 to 55% by volume.

The inorganic fine particles can be used in the state of dispersion when the high- or middle-refractive-index layer is formed. As a dispersion medium for inorganic fine particles in the high-refractive-index layer or the middle-refractive-index layer, a liquid having boiling point of 60 to 170° C. is preferably used. Examples of the dispersion medium is similar to the description of [Inorganic fine particles in high-refractive-index layer and middle-refractive-index layer] of the above-described embodiment 1.

The inorganic fine particles can be dispersed in a medium by means of a dispersing machine. Examples of the dispersing machine is similar to the description of [Inorganic fine particles in high-refractive-index layer and middle-refractive-index layer] of the above-described embodiment 1.

[Polymers in both High- and Middle-refractive-index Layers]

The description about the polymer in the high-refractive-index layer and the middle-refractive-index layer is the same as in the item [Polymer composed of organic compound in high-refractive-index layer and middle-refractive-index layer] in the above-described Embodiment 1.

[Structure of both High- and Middle-refractive-index Layers]

Figure 10:
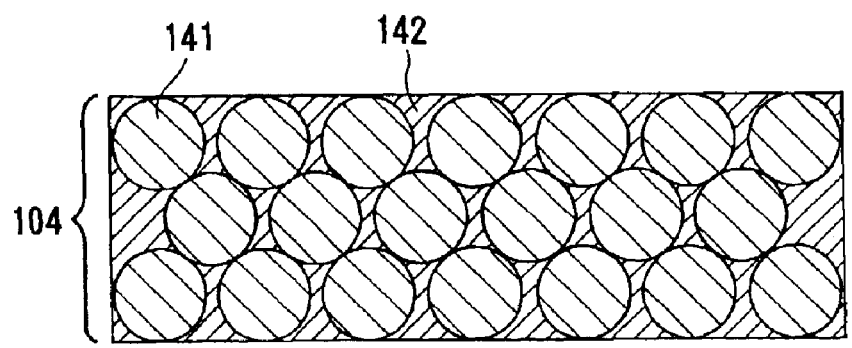
FIG. 10 is a sectional view schematically illustrating another preferable embodiment of the high-refractive-index layer according to the present invention.

FIG. 10 is a sectional view schematically illustrating a preferable high-refractive-index layer (104) (or middle-refractive-index layer). A low-refractive-index layer is superposed on (upper side of) the high-refractive-index layer (104) of FIG. 10, while an image display device or lens is placed under the high-refractive-index layer.

As shown in FIG. 10, the high-refractive-index layer (104) is a layer in which there is no void, and a space among the inorganic fine particles (141) is fully packed with the polymer (142). In the high-refractive-index layer (104), inorganic fine particles (141) having a mean grain size of 1 to 200 nm are piled (three particles in FIG. 10). Further, a space among the inorganic fine particles (141) is packed with the crosslinked polymer (141) having an anionic group.

The refractive index of the high-refractive-index layer is preferably in the range of 1.55 to 2.40, and more preferably in the range of 1.70 to 2.20.

The refractive index of the middle-refractive-index layer is preferably in the range of 1.55 to 1.85, and more preferably in the range of 1.65 to 1.75.

The refractive indices of both high- and middle-refractive-index layers can be adjusted to the above-mentioned ranges, respectively, by changing the volume ratio of the inorganic fine particles and the polymer having an anionic group.

The refractive index can be measured by means of a Abbe refractometer, or by the shape of a spectral reflectance curve obtained by measuring a spectral reflectance of light from the surface of a layer.

The thickness of both high- and middle-refractive-index layers is preferably in the range of 5 nm to 200 nm, more preferably in the range of 10 nm to 150 nm, and most preferably in the range of 30 nm to 100 nm.

The haze of both high- and middle-refractive-index layers is preferably 5% or less, more preferably 3% or less, and most preferably 1% or less.

The mechanical strength of both high- and middle-refractive-index layers is preferably H or more, more preferably 2H or more, and most preferably 3H or more, in terms of the pencil hardness per Kg of load.

[Over Coat Layer]

Figure 11:
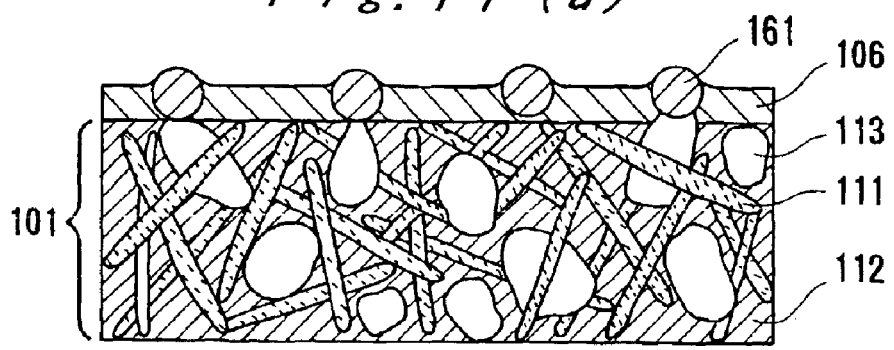
FIGS. 11(a)–(c) are sectional views schematically illustrating another preferable embodiment of both the low-refractive-index layer and over coating layer according to the present invention respectively.
Figure 11:
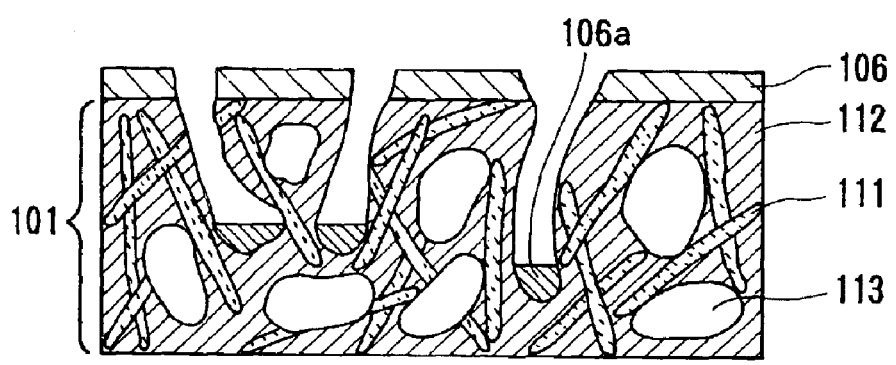
Figure 11:
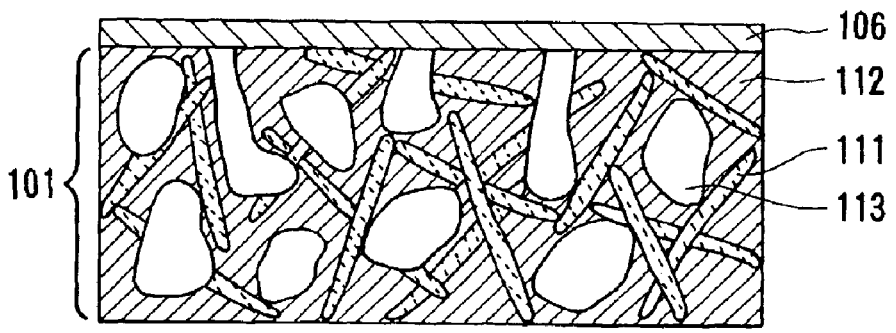
Figure 12:
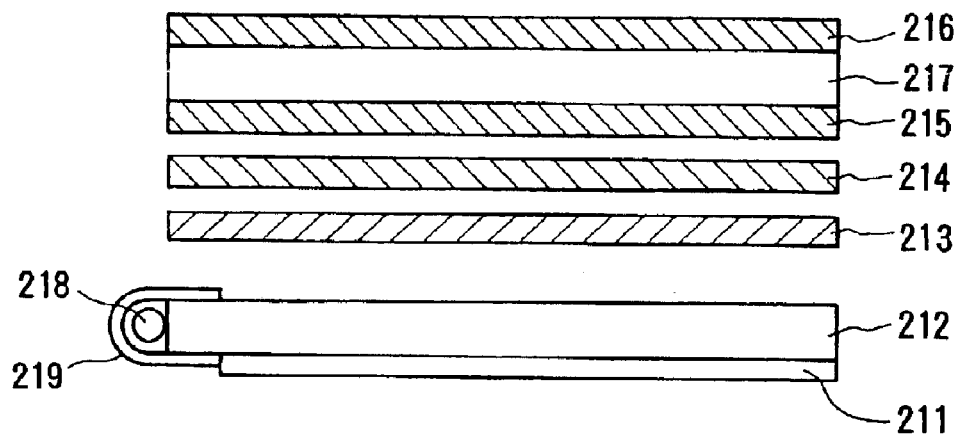
FIG. 12 is a view showing a typical constitution of an ordinary liquid crystal display device.

FIG. 11 is a sectional view schematically illustrating a low-refractive-index layer (101) and an over coat layer (106) according to a preferable embodiment of the present invention. In the low-refractive-index layer (101), short fibrous inorganic fine particles (111) according to the present invention and a polymer (112) are incorporated, and consequently voids (113) are formed among the particles.

An over coat layer (106) shown in FIG. 11(a) contains fine particles of a fluorine-containing compound (161). An opening of the voids (113) in the low-refractive-index layer (101) is sealed with the fine particles of a fluorine-containing compound (161), so that the voids (113) in the low-refractive-index layer (101) are maintained even after forming the over coat layer (106).

In an over coat layer (106) shown in FIG. 11(b), the coating amount of materials of the over coat layer is adjusted to the degree that the voids in the low-refractive-index layer (101) are not completely sealed with the materials. Therefore, even after forming the over coat layer (106), the voids (113) in the low-refractive-index layer (101) are maintained. In FIG. 11(b), the material of the over coat layer (106a) occupies a part of the voids (113).

FIG. 11(c) is a sectional view schematically illustrating a low-refractive-index layer (101) and an over coat layer (106) according to an preferable embodiment of the present invention. The over coat layer (106) is made of a fluorine-containing polymer having a weight-average molecular weight of 20,000 or more, and the over coat layer covers an unevenness of the surface of the low-refractive-index layer, but does not enter into the voids (113) in the interior of the low-refractive-index layer (101). Accordingly, even after formation of the over coat layer, voids (113) in the low-refractive index layer are maintained. Further, in the case of this embodiment, voids are maintained even if the over coat layer (106) is coated with an amount larger than the volume of the voids (111) in the low-refractive-index layer (101). Therefore, in the embodiment shown in FIG. 11(c), the over coat layer (106) covers, as a continuous layer, the surface of the low-refractive-index layer (101).

The over coat layer is the same as in to the description of [Over coat layer] of the above embodiment 1, except for the following point.

In the case that the fluorine-containing compound is used as the fine particles, the particle size of the fine particles is preferably in the range of 5 to 60 nm, more preferably in the range of 20 to 60 nm, and most preferably in the range of 25 to 40 nm.

Especially, in this embodiment, the thickness of the overcoat layer is preferably 3 to 50 nm, more preferably 5 to 35 nm, and particularly preferably 7 to 25 nm.

[Anti-reflection Film]

The description about the anti-reflection film in Embodiment 1 for the item [Anti-reflection film] is applied to Embodiment 2.

Although the details and preferable ranges of each component of the Embodiment 2 are described above, for example, by referring to the descriptions mentioned for the Embodiment 1, additional descriptions of the preferable mode in the Embodiment 2 are given below.

[Anti-reflection Film]

To further improve physical strength (such as abrasion resistance) of the anti-reflection film, the dynamic friction coefficient of the surface of the side having the low-refraction-index layer is preferably 0.25 or less. Herein, the dynamic friction coefficient means a dynamic friction coefficient between a stainless steel ball having a diameter of 5 mm and the surface of the low-refractive-index layer side; when the stainless steel ball is moved on the surface of the low-refractive-index layer side, with a load of 100 g onto the stainless steel ball, at a rate of 60 cm/min. The dynamic friction coefficient is more preferably 0.17 or less, and particularly preferably 0.15 or less. In addition, the film strength of the anti-reflection film is preferably H or more, more preferably 2H or more, and particularly preferably 3H or more, in the pencil hardness test according to JIS K 5400.

Further, to improve the stainproofing property of the anti-reflection film, the contact angle of the surface of the side having the low-refractive-index layer with water is preferably 90 degrees or more, more preferably 95 degrees or more, and particularly preferably 100 degrees or more.

Both the values of the dynamic friction coefficient and the contact angle with water are preferably kept even after application of the anti-reflection film of the present invention to a polarizing plate.

[Image Display Device]

The anti-reflection film according to the Embodiment 2 can be utilized in an image display device in the same manner as the anti-reflection film according to the Embodiment 1. Examples of the image display device include those shown in FIGS. 6(a)–(d).

Third Embodiment of the Invention (Embodiment 3)

Referring to the drawings, the following will describe basic structures of polarizing plates having optical compensation capacity and anti-reflection ability of the present invention, and basic structures of image display devices, of a liquid-crystal-display type and a color-liquid-crystal-display type, having the polarizing plate.

Figure 13:
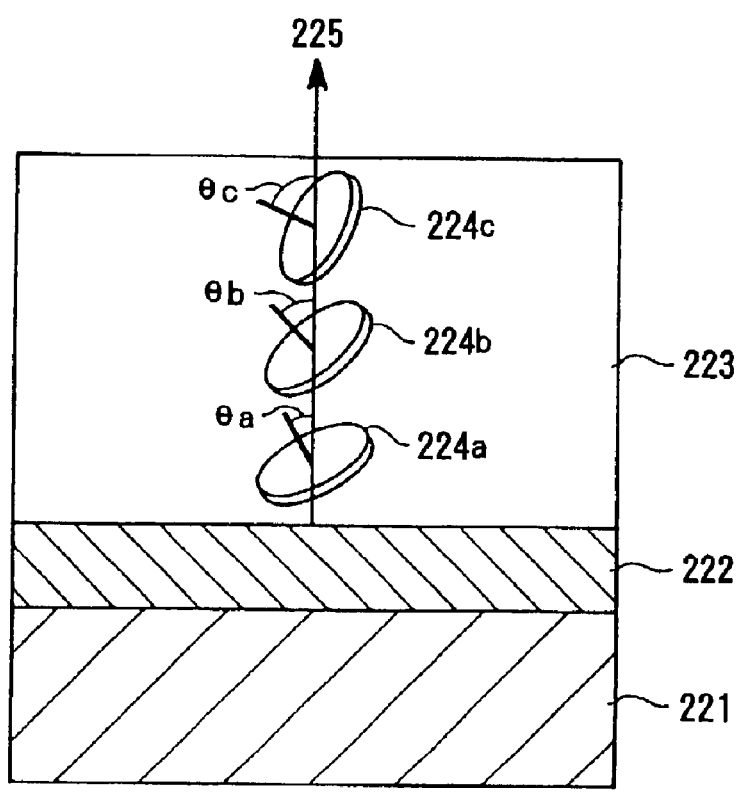
FIG. 13 is a sectional schematic view showing a representative layer constitution of an optical compensation film.

FIG. 13 is an example of a schematic cross sectional view showing the layer construction of the optical compensative layer. The optical compensative layer has a layer construction of a transparent support 221, an alignment layer 222, and an optical anisotropic layer 223, in the written order. The optical anisotropic layer contains liquid crystall discotic compounds 224a, 224b and 224c, and their light axes have inclined angles of θa, θb, and θc with the direction of a normal line 225 of the transparent support. These inclined angles are increased from the transparent support side of the optical anisotropic layer toward the surface side thereof.

Figure 14:
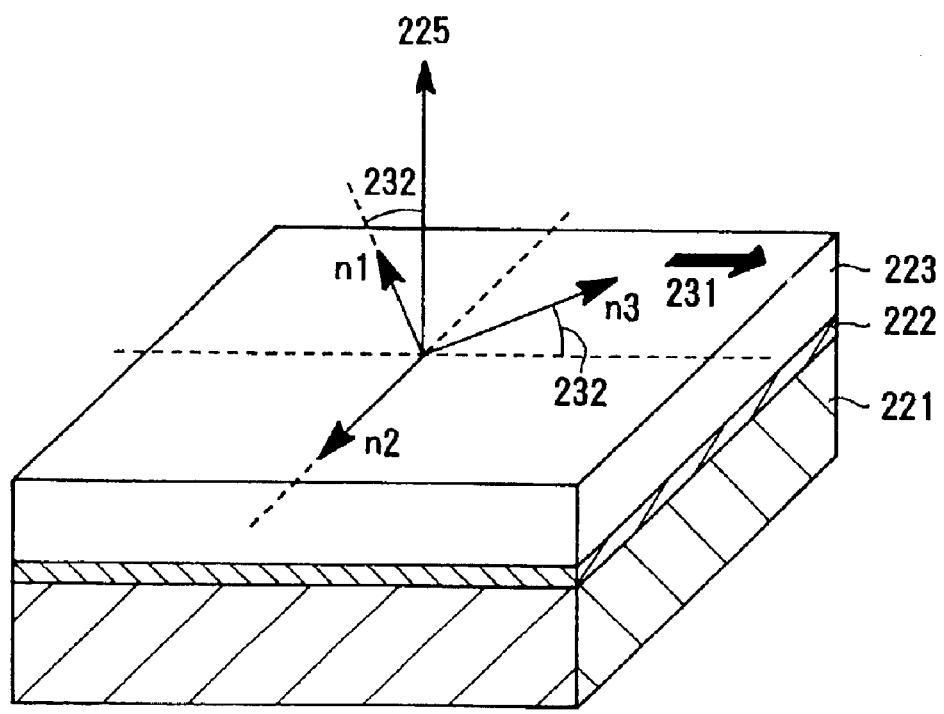
FIG. 14 is a diagram showing a representative constitution of an optical compensation film and a relationship between main refractive indexes of three axes.

FIG. 14 shows optical characteristics of the optical compensative layer. The alignment layer is subjected to a treatment, such as rubbing, for alignment of the liquid crystalline discotic compound. The notation 231 shows a rubbing direction of the alignment layer. The notations n1, n2 and n3 stand for refractive indices of three orthogonal axes of the optical compensative layer. Viewing from the front, the axes satisfy a relation of n1≦n3≦n2. Herein, the phrase "viewing from the front" means viewing a projection of FIG. 14 to a plane that is perpendicular to the normal line.

The optical compensative layer has a minimum value in the absolute value other than zero of retardation, in the direction inclined from a normal line direction of the transparent support. In the drawing, the notation 232 stands for an angle of the direction showing the minimum value in the absolute value of retardation with the normal line direction 225 of the transparent support. In order to improve viewing angle characteristics of TN-LCD, the angle 232 is preferably 5~50°, and especially preferably 10~40°.

The optical compensative layer satisfies the following equation:

$$20 \leq \{(nx+ny)/2-nz\} \times d \leq 400$$

wherein nx, ny, and nz stand for main refractive indices of three orthogonal axes of the transparent support, nz stands for a main refractive index in the direction of thickness of the transparent support, and d stands for a thickness of an optical compensative layer (unit: nm).

Preferably the optical compensative layer also satisfies the following equation:

$$50 \leq \{(nx+ny)/2-nz\} \times d \leq 400$$

and particularly preferably the optical compensative layer further satisfies the following equation:

$$100 \leq \{(nx+ny)/2-nz\} \times d \leq 400.$$

As a transparent support used in an optical compensation film, a plastic film is preferably used. Examples of the material of the plastic film include cellulose esters (for example, triacetylcellulose, diacetylcellulose, propionylcellulose, butyrylcellulose, acetylpropionylcellulose, and nitrocellulose), polyamides, polycarbonates, polyesters (for example, polyethylene terephthalate, polyethylene naphthalate, poly-1,4-cyclohexanedimethylene terephthalate, polyethylene-1,2-diphenoxyethane-4,4'-dicarboxylate, and polybutylene telephthalate), polystyrenes (for example, syndiotactic polystyrene), polyolefins (for example, polypropylene, polyethylene, and polymethylpentene), polysulfones, polyethersulfones, polyarylate, polyetherimides, polymethylmethacrylates, and polyetherketones; and ZEONEX (trade name, made by Nippon Zeon Co., Ltd.) and ARTON (trade name, made by JSR Co., Ltd.) as a commercial item.

The light transmittance of the transparent support is preferably 80% or more, and more preferably 86% or more. The transparent support preferably has optical isotropy when seen from its front. The haze of the transparent support is preferably 2.0% or less, and more preferably 1.0% or less. The refractive index of the transparent support is preferably 1.4–1.7.

From these viewpoints, preferable are triacetylcellulose, polycarbonate, and polyethylene terephthalate; ZEONEX and ARTON. For a protecting film for protecting a polarizing layer of the polarizing plate for an LCD, triacetylcellulose is especially preferable.

If a main refractive index inside the transparent support surface is nx and ny, while a main refractive index in the direction of thickness is nz, and the thickness is d, the relation of the main refractive indices is to satisfy nz<ny=nx (negative uniaxiality), and a retardation represented by $\{(nx+ny)/2-nz\} \times d$ is to be 20~400 nm. A retardation of the transparent support is more preferably 30~150 nm. It is not necessary that nx and ny are strictly equal, and no problem to apply in practice arises if $|nx-ny|/|nx-nz| \leq 0.2$. A front retardation represented by $|nx-ny| \times d$ is preferably 50 nm or less, and further preferably 20 nm or less.

An undercoat layer may be laminated on the transparent support in order to give the support adhesion properties to an adjacent layer. The raw material of such an undercoat layer is not especially limited, but may be, for example, gelatin, a poly(meth)acrylate resin, a substitution product thereof, or a styrene/butadiene resin, in case of the layer is formed on triacetylcellulose. Surface treatments, such as chemical treatment, mechanical treatment, corona treatment, or glow discharge treatment, may be performed.

The alignment layer functions to determine the alignment direction of a liquid crystalline discotic compound provided thereon. This alignment (orientation) gives a light axis inclined from the normal line direction of the transparent support. No limitation exists if the alignment layer is able to impart alignment to an optical anisotropic layer. Preferable examples of the alignment layer include, a layer formed by an organic compound and then subjected to rubbing treatment on its surface, an oblique vapor-deposition layer of an inorganic compound, a microgroove layer formed by patterning by a resist or the like, a Langmuir-Blodgett membrane of ω-tricosanoic acid, dioctadecyl-methylammonium chloride and methyl stearate, and a dielectric layer aligned by electric field or magnetic field.

A layer subjected to a rubbing treatment is preferable, as it is simple and cheap in production.

Illustrative of organic compounds for the alignment layer are polymers, such as polymethyl methacrylate, acrylic acid/methacrylic acid copolymer, styrene/maleimide copolymer, polyvinyl alcohol, poly(N-methylolacrylamide), styrene/vinyltoluene copolymer, chlorosulfonated polyethylene, nitrocellulose, polyvinyl chloride, chlorinated polyolefins, polyesters, polyimides, vinyl acetate/vinyl chloride copolymer, ethylene/vinyl acetate copolymer, carboxymethylcellulose, polyethylene, polypropylene, and polycarbonate; and silane-coupling agents. Among these, polyimides, polystyrene, polyvinyl alcohol and alkyl-modified polyvinyl alcohol having an alkyl group (preferably, the group has at least 6 carbon atoms) are preferable. Alkyl(.preferably having at least 6 carbon atoms)-containing alkyl-modified polyvinyl alcohol is especially preferable. As polyimide, mentioned are polyamic acid (for example, LQ/LX series (trade name, manufactured by Hitachi Chemical Co., Ltd.) and SE series (trade name, manufactured by Nissan Chemical Industries, ltd.), etc.) coated and baked at 100~300° C. for 0.5~1 hour. As the alkyl-modified polyvinyl alcohol, MP103, MP203, and R1130 (trade names, each manufactured by Kuraray Co.) can be mentioned.

The alignment layer is preferably cured to prevent disordered alignment of the liquid crystal discotic compound by the solvent from causing, when the discotic compound is provided thereon. As the method to cure the alignment layer, preferably employed is a method that uses an ethylenically unsaturated group, isocyanate group, epoxy group, aziridine group, oxazoline group, aldehyde group, carbonyl group, hydrazine group, carboxyl group, hydroxyl group, methylol group, active-methylene group, and the like; and in the method, these crosslinkable functional group are cured by heat or irradiation of ionizing radiation.

A treatment widely adopted for a liquid crystal alignment treatment step of LCD, can be utilized as the above rubbing treatment. More precisely, a method wherein the surface of an alignment layer is rubbed with gauze, felt, rubber, nylon- or polyester-fibers, or the like, in a given direction can be utilized, to attain alignment. In general, a rubbing treatment is carried out several times with a cloth evenly embedded with fibers having uniform length and diameter.

Further, the optical anisotropic layer may be aligned without using an alignment layer. For this, a method can be mentioned wherein a liquid crystalline discotic compound layer forming the optical anisotropic layer is aligned by subjecting it to the influence of electric field, magnetic field, polarizing radiation or oblique non-polarizing radiation, etc.

An optical anisotropic layer is a layer having negative birefringence, and comprised of a compound containing discotic structure units. The optical anisotropic layer is a layer of a liquid crystalline discotic compound or a polymer layer obtained by curing of a polymerizable discotic compound. Illustrative of the discotic compound for the present invention can include benzene derivatives disclosed in a study report of C. Destrade et al., Mol. Cryst., 71, page 111 (1981); truxene derivatives disclosed in Mol. Cryst., 122, page 141 (1985), and Phyics. Lett., A, 78, page 82 (1990); cyclohexane derivatives disclosed in a study report of B. Kohne et al., Angew. Chem. Soc., 96, page 70 (1984); macrocycles of azacrown series and phenylacetylene series disclosed in a study report of J. M. Lehn et al., J. Chem. Commun. page 1794 (1985), and a study report of J. Zhang et al., J. Am. Chem. Soc. 116, page 2655 (1994). The aforesaid discotic (disc-like) compound generally is crystalline and has a structure wherein these compounds are existent in the center of the molecule as mother nucleus and a linear alkyl or alkoxyl groups and substituted benzoyloxy group, etc. are substituted radially as side chains. In general, compounds called discotic liquid crystals are included in this compound. However, the discotic compound for the present invention is not limited to the above description if the compound per se has a negative uniaxial property and is capable of imparting a definite alignment. Further, in the present invention, the phrase "formed from the discotic compound" referred to herein means that the final product is not necessarily the discotic compound and, for example, those obtained from a low molecular discotic liquid crystal, which has a functional group capable of crosslinking by heat or irradiation of ionizing radiation and is converted into a higher molecular compound to lose liquid crystalline property by heat or irradiation of ionizing radiation, is also included.

Preferable examples of the discotic compound include the following:

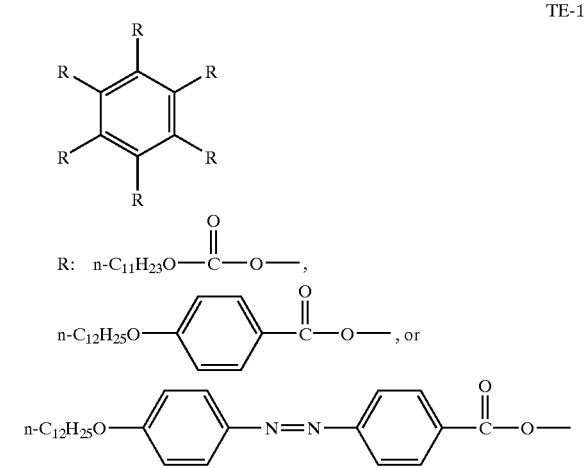

TE-1

TE-2
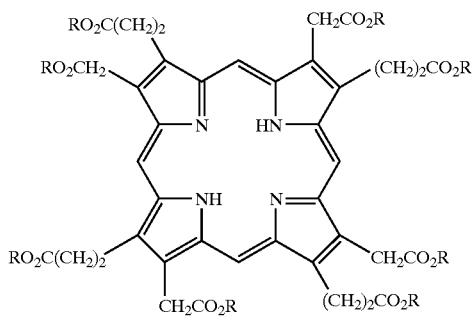
R: n-C$_{12}$H$_{25}$—
TE-3
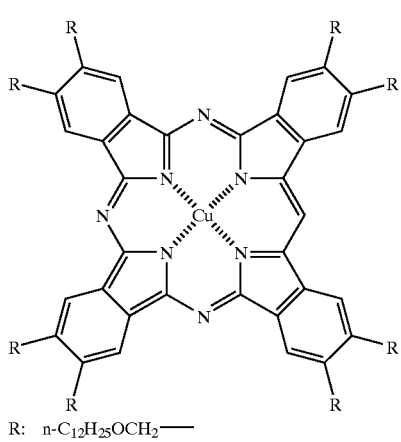
R: n-C$_{12}$H$_{25}$OCH$_2$—
TE-4
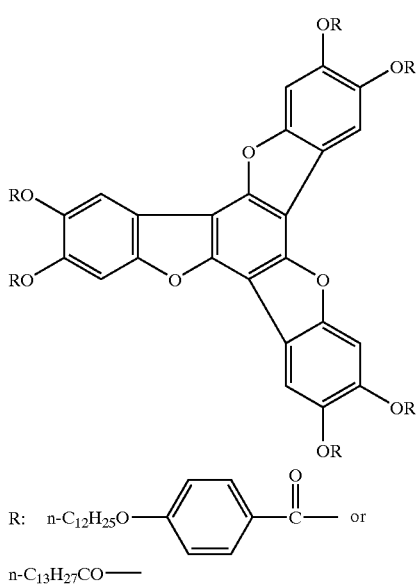
R: n-C$_{12}$H$_{25}$O—⌬—C(=O)— or
n-C$_{13}$H$_{27}$CO—
TE-5
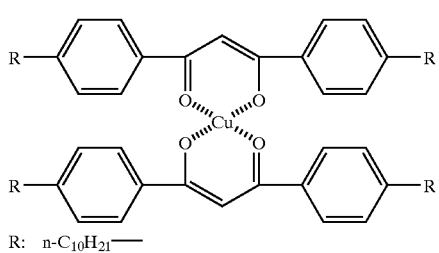
R: n-C$_{10}$H$_{21}$—
TE-6
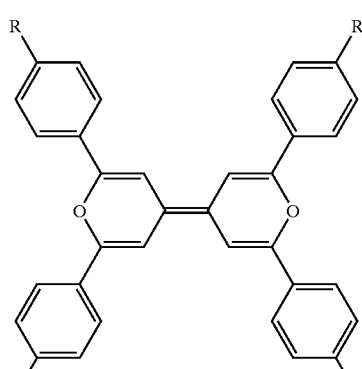
R: n-C$_8$H$_{17}$—
TE-7
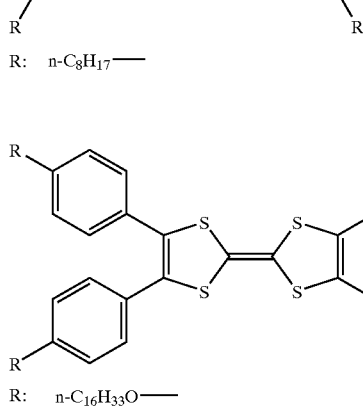
R: n-C$_{16}$H$_{33}$O—
TE-8
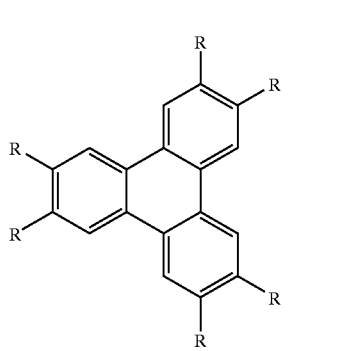
(1) R: n-C$_m$H$_{2m+1}$O— (m is an integer of 2 to 15),
(2) 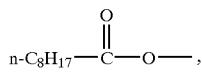 n-C$_8$H$_{17}$—C(=O)—O—,
(3) 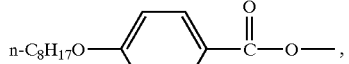
(4) 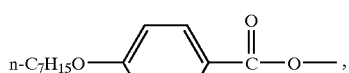
(5) 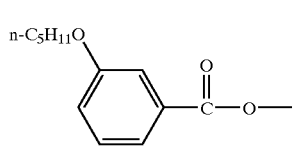

(6)
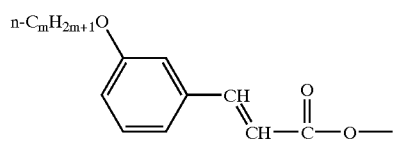
(m is an integer of 7 to 10), (7)
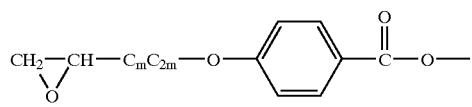
(m is an integer of 4 to 10), or (8)
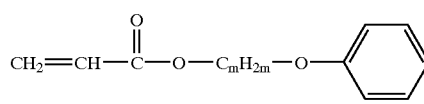
(m is an integer of 4 to 10)

TE-9

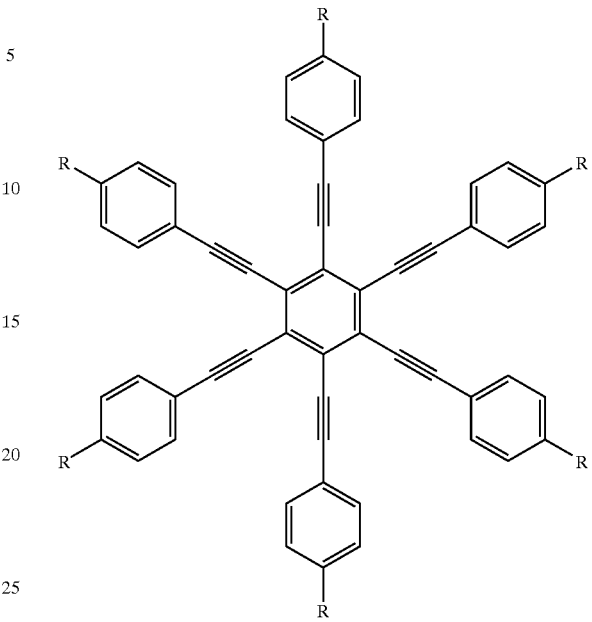

TE-10

R: $C_7H_{15}O-$

TE-11

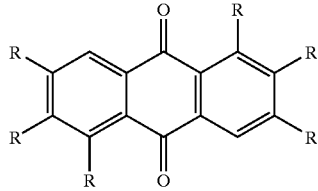

(1)
R: $n\text{-}C_{13}H_{27}\overset{O}{\underset{\|}{C}}-O-$ or (2)
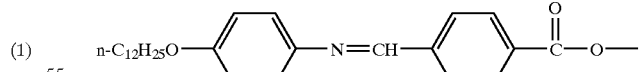

(1)
R: $n\text{-}C_{10}H_{21}\overset{O}{\underset{\|}{C}}-O-$, (2)
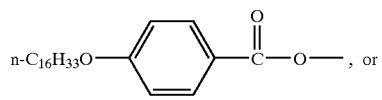, or (3)
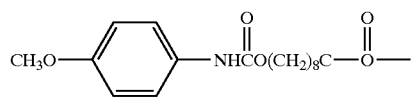

The optical anisotropic layer is obtained by applying a coating liquid dissolving the discotic compound and other compounds onto an alignment layer, drying the coated alignment layer, heating the layer up to a discotic nematic phase-forming temperature, and cooling the coated layer while holding the alignment state. Or alternatively, the alignment layer is heated up to a discotic nematic phase-forming temperature and thereafter polymerized and fixed by irradiation of ionizing radiation. A temperature for the discotic nematic liquid phase-solid phase transition is preferably 50~300° C., and especially preferably 70~170° C.

The optical anisotropic layer may be incorporated with any of the compounds such as a plasticizer, a surfactant, a polymerizable monomer, a high molecular compound, etc. for controlling the inclined angle of the liquid crystalline discotic compound, a discotic nematic phase-forming temperature, compatibility, coating property, etc. so far as the alignment of the discotic compound is not disturbed.

A polymerizable monomer preferably has a vinyl group, a vinyloxy group, an acryloyl group, and a methacryloyl group. The polymerizable monomer can be used in an amount of generally 1~50% by weight, preferably generally 5~30% by weight, based on the discotic compound.

Any of the high molecular compounds can be used so far as they possess compatibility with the discotic compound. The high molecular compound is preferably cellulose esters. Above all, cellulose acetate butyrate is especially preferable. The high molecular compound can be used in an amount of generally 0.1~10% by weight, preferably 0.1~5% by weight, based on the discotic compound. Further, a butyrating degree of the cellulose acetate butyrate is preferably 30~80%, while an acetylating degree thereof is preferably 30~80%.

Figure 15:
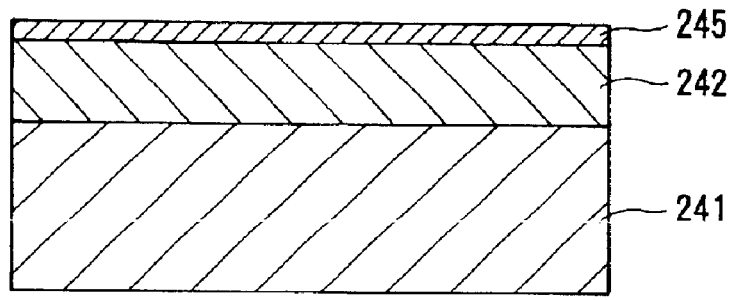
FIGS. 15(a)–(d) are sectional schematic view showing representative layer constitution of an anti-reflection film respectively.
Figure 15:
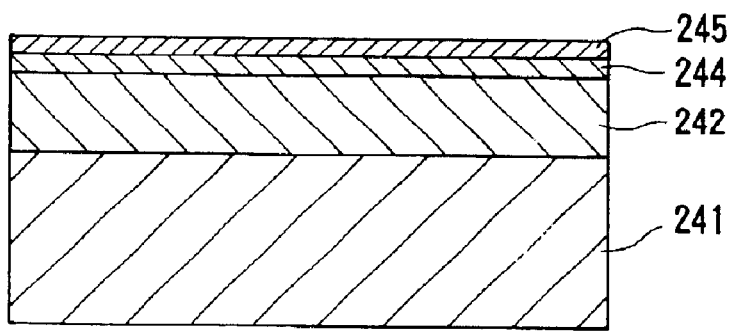
Figure 15:
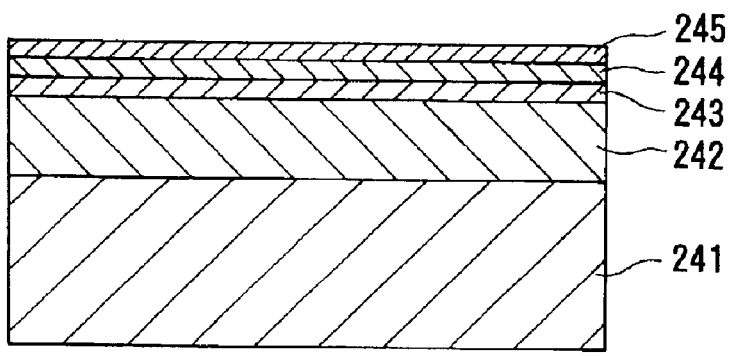
Figure 15:
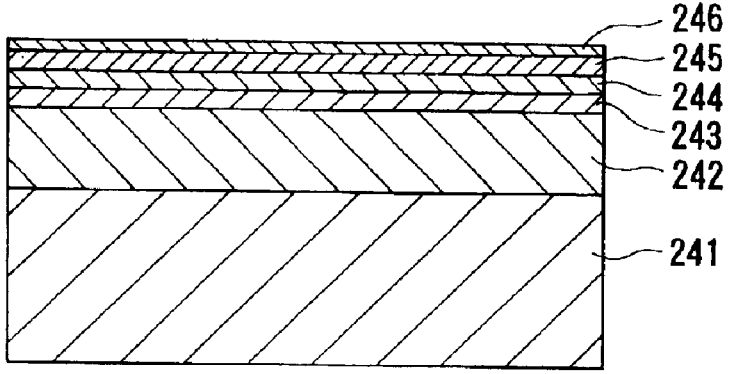

FIG. 15($a$) is a sectional schematic view, which shows an example of a layer structure of an anti-reflection film. The anti-reflection film has a layer structure wherein a transparent support 241, a hard coat layer 242, and a low-refractive-index layer 245 are arranged in this order. The refractive index and the thickness of the low-refractive-index layer preferably satisfy the following equation:

$$m\lambda/4 \times 0.7 < n1d1 < m\lambda/4 \times 1.3$$

wherein m is a positive odd number (is generally 1), n1 is the refractive index of the low-refractive-index layer, and d1 is the thickness (nm) of the low-refractive-index layer.

FIG. 15($b$) is a sectional schematic view, which shows an example of a layer structure of an anti-reflection film. The anti-reflection film has a structure wherein a transparent support 241, a hard coat layer 242, a high-refractive-index layer 244, and a low-refractive-index layer 245 are arranged in this order.

In the anti-reflection film having the high-refractive-index layer 244 and the low-refractive-index layer 245, as shown in FIG. 15($b$), the high-refractive-index layer and the low-refractive-index layer preferably satisfy the following equation (I) and the following equation (II), respectively, as described in JP-A-59-50401.

$$m\lambda/4 \times 0.7 < n1d1 < m\lambda/4 \times 1.3 \tag{I}$$

wherein m is a positive integer (is generally 1, 2 or 3), n1 is the refractive index of the high-refractive-index layer, and d1 is the thickness (nm) of the high-refractive-index layer.

$$n\lambda/4 \times 0.7 < n2d2 < n\lambda/4 \times 1.3 \tag{II}$$

wherein n is a positive odd number (is generally 1), n2 is the refractive index of the low-refractive-index layer, and d2 is the thickness (nm) of the low-refractive-index layer.

FIG. 15($c$) is a sectional schematic view, which shows an example of a layer structure of an anti-reflection film. The anti-reflection film has a structure wherein a transparent support 241, a hard coat layer 242, a middle-refractive-index layer 243, a high-refractive-index layer 244, and a low-refractive-index layer 245 are arranged in this order.

In the anti-reflection film having a middle-refractive-index layer 243, the high-refractive-index layer 244, and the low-refractive-index layer 245, as shown in FIG. 15($c$), the middle-refractive-index layer, the high-refractive-index layer, and the low-refractive-index layer preferably satisfy the following equation (III), equation (IV), and equation (V), respectively, as described in JP-A-59-50401.

$$h\lambda/4 \times 0.7 < n3d3 < h\lambda/4 \times 1.3 \tag{III}$$

wherein h is a positive integer (is generally 1, 2 or 3), n3 is the refractive index of the middle-refractive-index layer, and d3 is the thickness (nm) of the middle-refractive-index layer.

$$j\lambda/4 \times 0.7 < n4d4 < j\lambda/4 \times 1.3 \tag{IV}$$

wherein j is a positive integer (is generally 1, 2 or 3), n4 is the refractive index of the high-refractive-index layer, and d4 is the thickness (nm) of the high-refractive-index layer.

$$k\lambda/4 \times 0.7 < n5d5 < k\lambda/4 \times 1.3 \tag{V}$$

wherein k is a positive odd number (is generally 1), n5 is the refractive index of the low-refractive-index layer, and d5 is the thickness (nm) of the low-refractive-index layer.

FIG. 15($d$) is a sectional schematic view, which shows an example of a layer structure of an anti-reflection film. The anti-reflection film has a structure wherein a transparent support 241, a hard coat layer 242, a middle-refractive-index layer 243, a high-refractive-index layer 244, a low-refractive-index layer 245, and an over coat layer 246 are arranged in this order.

The refractive index and thickness of the high-refractive-index layer, the middle-refractive-index layer or the low-refractive-index layer are the same as shown in FIG. 15($c$).

The over coat layer preferably has effects of giving stainproofing property based on water repellency and oil repellency, and of improving scratch-resistance based on slipping ability. Its optical properties and refractive index are not limited, but its thickness is preferably 20 nm or less.

It is preferable to use a plastic film as a transparent support in the anti-reflecting film. Illustrative of materials for the plastic film are cellulose esters (for example, triacetyl cellulose, diacetyl cellulose, propionyl cellulose, butyryl cellulose, acetyl propionyl cellulose, and nitrocellulose), a polyamide, a polycarbonate, a polyester (for example, polyethylene terephthalate, polyethylene naphthalate, poly-1,4-cyclohexanedimethylene terephthalate, polyethylene 1,2-diphenoxyethane-4,4'-dicarboxylate or polybutylene terephthalate), a polystyrene (for example, syndiotactic polystyrene), a polyolefin (for example, polypropylene, polyethylene or polymethylpentene), a polysulfone, a polyethersulfone, a polyallylate, a polyether imide, polymethyl methacrylate, and a polyether ketone. Also included are Zeonex (trade name, manufactured by Nippon Zeon Co.) and ARTON (trade name, manufactured by JSR KK) as commercial available products.

The transparent support preferably has a light transmittance of 80% or more, more preferably 86% or more. The transparent support preferably has optical isotropy when seen from its front. Haze of the transparent support is preferably 2.0% or less, more preferably 1.0% or less. A refractive index of the transparent support is preferably 1.40 to 1.70.

Viewing from these points, preferable are triacetyl cellulose, polycarbonate, polyethylene terephthalate, Zeonex and ARTON. As a protective membrane for protecting polarizing layers of polarizing plates for use in LCD, triacetyl cellulose is especially preferable.

A sub-layer (undercoat layer) may be provided on the transparent support for imparting tight adherence to adjacent layers. No particular limitation exists in materials for forming such sub-layer. On triacetyl cellulose, for example, gelatin, poly(meth)acrylate resins or a substitute thereof, styrene/butadiene resin, etc. can be used. In addition, a surface treatment such as a chemical treatment, a mechanical treatment, corona treatment, glow discharge treatment, etc. may be carried out.

It is preferable to use a polymer having a saturated hydrocarbon or polyether, as a main chain thereof, as a compound for use in the hard coat layer. More preferable is a polymer having a saturated hydrocarbon as a main chain. The polymeric binder is preferably crosslinked. The polymer having a saturated hydrocarbon as a main chain thereof is preferably obtained by polymerization reaction of an ethylenically unsaturated monomer. For obtaining a crosslinked polymeric binder, it is preferable to use a monomer having at least two ethylenically unsaturated groups.

Illustrative of the monomer having at least two ethylenically unsaturated groups include an ester of a polyhydric alcohol and (meth)acrylic acid (for example, ethyleneglycol di(meth)acrylate, 1,4-cyclohexanediol diacrylate, pentaerithritol tetra(meth)acrylate, pentaerithritol tri(meth)acrylate, trimethylolpropane tri(meth)acrylate, trimethylolethane tri(meth)acrylate, dipentaerithritol tetra(meth)acrylate, dipentaerithritol penta(meth)acrylate, pentaerithritol hexa(meth)acrylate, 1,3,5-cyclohexanetriol triacrylate, polyurethane polyacrylate, and polyester polyacrylate), vinylbenzenes and derivative thereof (for example, 1,4-divinylbenzene, 4-vinylbenzoic acid-2-acryloylethyl ester, and 1,4-divinylcyclohexanone), a vinylsulfone (for example, divinylsulfone), and an acrylamide (for example, methylene-bis-acrylamide), and a methacrylamide.

A polymer containing a polyether as a main chain thereof is preferably synthesized by ring-opening polymerization of a polyfunctional epoxy compound.

These monomers having ethylenically unsaturated groups have to be cured by polymerization due to ionizing radiation or heat after application onto the film.

In place of or in addition to the monomer having at least two ethylenically unsaturated groups, a crosslinked structure may be introduced into the polymeric binder by the reaction of a crosslinking group. Examples of the crosslinking functional group include isocyanate group, epoxy group, aziridine group, oxazoline group, aldehyde group, carbonyl group, hydrazine group, carboxyl group, methylol group, and active methylene group. Vinylsulfonic acid, an acid anhydride, a cyanoacrylic derivative, melamine, etherified methylol, an ester, a urethane, and a metal alkoxide such as tetramethoxysilane can also be utilized as a monomer for introducing a crosslinking structure. A functional group exhibiting crosslinking property as a result of a decomposition reaction such as a blocked isocyanate group may also be used. Further, the term "crosslinking group" referred to herein means a group exhibiting reactivity as a result of a decomposition of the functional group mentioned above, and is not limited to the aforesaid compounds.

Compounds having such crosslinking groups have to be crosslinked by heat or the like after applied onto a film.

Further, the hard coat layer may be incorporated with inorganic fine particles with a purpose of adjusting the refractive index and enhancing hardness of the membrane. Inorganic fine particles have preferably an average particle size of 0.5 μm or less, and especially preferably not more than 0.2 μm or less.

Preferable inorganic fine particles are silicon dioxide particles, titanium dioxide particles, aluminum oxide particles, tin oxide particles, calcium carbonate particles, barium sulfate particles, talc, kaolin, and calcium sulfate particles. Especially preferable are silicon dioxide particles, titanium dioxide particles, and aluminum oxide particles.

An amount of the inorganic fine particles incorporated is preferably 10–90% by weight of the total amount of the hard coat layer, more preferably 20–80% by weight, and especially preferable is 30–60% by weight.

The thickness of the hard coat layer is preferably 1–15 μm.

As shown in FIG. 15(b), a high-refractive-index layer may be disposed between a low-refractive-index layer and a transparent support. As shown in FIG. 15(c), a middle-refractive-index layer may be disposed between a high-refractive-index layer and a transparent support.

The refractive index of the high-refractive-index layer is preferably 1.65–2.40, and more preferably 1.70–2.20. The refractive index of the middle-refractive-index layer is adjusted to a value between the refractive index of the low-refractive-index layer and that of the high-refractive-index layer. The refractive index of the middle-refractive-index layer is preferably 1.55–1.80. The haze of the high-refractive-index layer and the middle-refractive-index layer is preferably 3% or less.

The middle-refractive-index layer and the high-refractive-index layer are preferably formed using polymers having a high refractive index. Examples of the polymers having a high refractive index include polystyrene, styrene copolymers, polycarbonate, melamine resins, phenol resins, epoxy resins, and polyurethanes obtained by reaction of a cyclic (aliphatic or aromatic) isocyanate and a polyol. Polymers having other cyclic (aromatic, heterocyclic or aliphatic) groups, and polymers having a halogen atom other than fluorine as a substituent, also have a high refractive index. The polymer may be produced by polymerization reaction of a monomer, which can be radical-hardened by introduction of a double-bond.

Inorganic fine particles having a high refractive index may be dispersed in the above-mentioned monomer and initiator, in silicon compounds substituted with an organic compound, or in the above-mentioned polymer. Preferred examples of the inorganic fine particles include oxides of a metal (for example, aluminum, titanium, zirconium, or antimony). In the case that the monomer and the initiator are used, the middle-refractive-index layer or high-refractive-index layer having excellent injury resistance and adhesive ability can be made, by hardening the monomer by polymerization reaction through ionizing radiation or heat, after the application of them. The average particle size of the inorganic fine particles is preferably 10–100 nm.

The high-refractive-index layer or middle-refractive-index layer may be made from an organic metal compound having a film-forming ability. Preferably, the organic metal compound is a compound that can be dispersed in an appropriate medium, or is in a liquid form. Examples of the organic metal compound include metal alcolates (for example, titanium tetraethoxide, titanium tetra-1-propoxide, titanium tetra-n-propoxide, titanium tetra-n-butoxide, titanium tetra-sec-butoxide, titanium tetra-tert-butoxide, aluminum triethoxide, aluminum tri-I-propoxide, aluminum tributoxide, antimony triethoxide, antimony tributoxide, zirconium tetraethoxide, zirconium tetra-I-propoxide, zirconium tetra-n-propoxide, zirconium tetra-n-butoxide, zirconium tetra-sec-butoxide, and zirconium tetra-tert-butoxide), chelate compounds (for example, di-isopropoxytitanium bisacetylacetonate, di-butoxytitanium bisacetylacetonate, di-ethoxytitanium bisacetylacetonate, bisacetylacetone zirconium, aluminum acetylacetonate, aluminum-di-n-butoxide monoethylacetoacetate, aluminum-I-propoxide monomethylacetoacetate, and tri-n-butoxide zirconium monoethylacetoacetate), salts of organic acids (for example, zirconyl ammonium carbonate), and active inorganic polymers made mainly of zirconium.

A compound used for the low-refractive-index layer includes a compound containing a fluorine atom, a silicon-series compound substituted by an organic group that is represented by the following formula.

$$R^{21}_a R^{22}_b SiX_{4-(a+b)}$$

wherein $R^{21}$ and $R^{22}$ each stands for an alkyl group, an alkenyl group, an allyl group, and a hydrocarbon group having a halogen atom, an epoxy group, an amino group, a mercapto group, a methacryloxy group, or a cyano group; X stands for a hydrolysable substituent selected from a group consisting of an alkoxyl group, an alkoxyalkoxyl group, a halogen atom, and an acyloxy group, a and b each stands for 0, 1 or 2, and a+b equals 1 or 2. The product resulted from the hydrolysis of the compound represented by the above formula also can be used. The compound used for the low-refractive-index layer may be used together with a compound other than these compounds.

The low-refractive-index layer may be formed, by making therein microvoids, which have a size smaller than a light wavelength and are filled with air or being evacuated, uniformly.

By the microvoids, the low-refractive-index layer has a void percentage of generally 1 to 50% by volume, preferably 3 to 50% by volume, more preferably 3 to 45% by volume, and particularly preferably 5 to 35% by volume. As methods for forming microvoids in the low-refractive-index layer, there are known a method of forming them at the time when carbon dioxide and water vapor are released, according to sol-gel process that is generally known; or a method of making microvoids between or inside fine particles, by including the particle having size of 0.1 µm or less, as described in JP-A-9-288201. As methods for forming microvoids inside fine particles, there are known sol-gel method (described in JP-A-53-112732, and JP-B-57-9051), precipitation method (APPLIED OPTICS, 27, 3356(1988)), and the like.

The fluorine compound used in the low-refractive-index layer may be a polymer produced by polymerizing a monomer having a fluorine atom. Specific examples of the monomer unit include fluoroolefins (for example, fluoroethylene, vinylidene fluoride, tetrafluoroethylene, hexafluoroethylene, hexafluoropropylene, and perfluoro-2,2-dimethyl-1,3-dioxol); alkyl ester derivatives resulting from partial or complete fluorination of (meth)acrylic acid; and completely- or partially-fluorinated vinyl ethers. The desired polymer can be obtained by copolymerizing any one of them, or two or more of them at an arbitrary ratio.

In addition, there may be used not only polymers having, as a constituent unit, the above-mentioned fluorine-containing monomer, but also copolymers that additionally include a monomer containing no fluorine atom. The monomer unit that can be used in combination is not especially limited. Examples thereof include olefins (ethylene, propylene, isoprene, vinyl chloride, vinylidene chloride, etc.), acrylic esters (methyl acrylate, ethyl acrylate, and 2-ethylhexyl acrylate), methacrylic esters (methyl methacrylate, ethyl methacrylate, butyl methacrylate, ethyleneglycol dimethacrylate, etc.), styrene derivatives (styrene, divinylbenzene, vinyltoluene, Δ-methylstyrene, etc.), vinyl ethers (methyl vinyl ether, etc.), vinyl esters (vinyl acetate, vinyl propionate, vinyl cinnamate, etc.), acrylamides (N-tert-butylacrylamide, N-cyclohexylacrylamide, etc.), methacrylamides, and acrylonitrile derivatives.

As shown in FIG. 15(d), an over coat layer may be provided to the anti-reflection film.

Especially preferably, a slipping layer or a stainproofing layer may be provided on the low-refractive-index layer.

Examples of a lubricant used in the slipping layer include polyorganosiloxane (for example, polydimethylsiloxane, polydiethylsiloxane, polydiphenylsiloxane, polymethylphenylsiloxane, and alkyl-modified polydimethylsiloxane), natural waxes (for example, carnauba wax, candelilla wax, jojoba oil, rice wax, Japan wax, beeswax, lanolin, spermaceti wax, and montan wax), petroleum wax (for example, paraffin wax, and microcrystalline wax), synthetic waxes (for example, polyethylene wax, Fisher-Tropsch wax), higher aliphatic acid amides (for example, stearamide, oleic amide, and N,N'-methylenebisstearamide), higher aliphatic esters (for example, methyl stearate, butyl stearate, glycerin monostearate, and sorbitan monooleate), metal salts of higher aliphatic acids (for example, zinc stearate), and fluorine-containing polymers (for example, perfluoro-main-chain-type perfluoropolyether, perfluoro-side-chain-type perfluoropolyether, alcohol-modified perfluoropolyether, and isocyanate-modified perfluoropolyether).

For the stainproofing layer, a fluorine-containing compound is used from the viewpoint of water repellency and oil repellency.

Examples of the fluorine-containing compound include perfluoropolyether lubricants (for example, FOMBLIN Z60 (trade name), made by Ausimont K.K.), perfluoroalkyl group-containing silane compounds (for example, (heptadecafluoro-1,1,2,2-tetradecyl)triethoxysilane, and KP-801M (trade name, manufactured by Shin-Etsu Silicone Co., Ltd.), or the like), and fluorine-containing polymers comprising a fluorine-containing monomer as a constituent unit.

Specific examples of the monomer unit include, for example, fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of (meth)acrylic acid (for example, BISCOAT 6FM (trade name), made by Osaka Organic Chemical Industry Ltd., and M-2020 (trade name), made by Daikin Industries, Ltd.), and completely or partially fluorinated vinyl ethers, or the like. The desired polymer can be obtained by copolymerizing any one of them, or two or more of them in combination, at a desired ratio.

If the polymer contains the above-mentioned fluorine-containing monomer, a non-fluorine monomer may be contained as a constituent unit in order to impart functions of flexibility, crosslinking ability, or the like. Examples of the polymer containing such non-fluorine monomer, as the constituent unit, include copolymers of the above-mentioned fluorine monomer and (meth)acrylate(ester) monomer; and JN-7219, JN-7221, and JN-7225 (trade name, made by JSR Co., Ltd.), which have further a structure to impart slipping ability.

From the viewpoint of good balance between slipping ability and stainproofing ability, JN-7219, JN-7221, and JN-7225 are preferable for the over coat layer.

If an over coat layer is laminated on a low-refractive-index layer, the material for forming the over coat layer penetrate into microvoids in the low-refractive-index layer so that its void percentage becomes unfavorably low. In order to keep a low refractive index, the percentage of the material of the over coat in the voids in the low-refractive-index layer is preferably less than 70% by volume.

Specifically, for this purpose, a method can be mentioned where the size of the material of the over coat layer is made larger than the size of the microvoids; and such is attained by any one of the methods where, at the time of coating, raw materials in a coating solution are formed to (1) be fine particles such as latex, (2) be an emulsion-like, or (3) have high molecular weight. From the viewpoint of film-forming ability, especially preferable is the method of making the molecular weight of the material high.

In the case that the molecular weight of the fluorine-containing compound making the over coat layer is made high, the weight-average molecular weight of the fluorine-containing compound is 30,000 to 2,000,000, and more preferably 50,000 to 2,000,000. In this case, the percentage of low-molecular weight components having a molecular weight of less than 20,000 such as a crosslinking agent, and a surfactant, other than the fluorine-containing compound, is generally 50% or less, and preferably 20% or less by weight of solid components in the over coat layer.

The thickness of the protecting film is preferably 20 nm or less, and more preferably 10 nm or less, in order to give no effect on anti-glare property ability.

In order to give anti-glare property to the anti-reflection film, unevenness (concave-convex) may be made in the anti-reflection film. Examples of the method for making unevenness include, a method of applying an unevenness layer wherein particles are added to a binder on a transparent support, as described in JP-A-61-209154; a method of laminating a film wherein an unevenness surface is beforehand formed, onto a coating layer on a transparent support to transfer the unevenness, as described in JP-A-6-16851; a method of applying an anti-reflection film to a product wherein unevenness is made, directly or through another layer such as a hard coat layer, in a transparent support by embossing; and a method of making unevenness by embossing after the formation of an anti-reflection film.

In the case that the anti-reflection film is formed on unevenness, a distribution of its thickness is generated by leveling to deteriorate anti-reflection ability, therefore this method is not preferable. In the case that anti-glare property is given to the coating-type anti-reflection film, it is preferable to use a method, in which unevenness is provided by embossing after formation of the anti-reflection film.

In the case that unevenness is made by embossing, plastic deformation is hardly caused in the hard coat layer. Therefore, the unevenness is made by plastic deformation of the transparent support. However, by disposing a polymer layer comprising (meth)acrylate, which is more easily deformed than the transparent support, between the transparent support and the hard coat layer, plastic deformation by pressure from the outside becomes larger. As a result, unevenness can easily be made in the surface. Further, in this step, not only the pressure but also heat may be used. By performing the embossing at a higher temperature than the glass transition temperature of (meth)acrylate, the plastic deformation can be further promoted. By changing the structure of the ester moiety of (meth)acrylate, the glass transition temperature of the polymer can be set up arbitrary. However, the glass transition temperature of the acrylate is preferably between normal temperature and a temperature of 140 to 200° C., which is generally the glass transition temperature of a transparent support. Specifically, the glass transition temperature of the acrylate is preferably 80 to 110° C. This is the following reason: this temperature has smaller value than that of the glass transition temperature of the transparent support, therefore, at normal temperature, the polymer does not damage the hard coat property of the anti-reflection film, and, at the time of making unevenness, it is possible to promote only the plastic deformation of the deformation layer, without changing optical and mechanical properties of the transparent support.

Each of the optical compensative film and the anti-reflection film can be formed by applying the materials according to the dip coating method, the air-knife coating method, the curtain coating method, the roller coating method, the wire bar coating method, the gravure coating method, and the extrusion coating method (U.S. Pat. No. 2,681,294). Two or more layers may be coated at the same time. A method for coating layers at the same time is disclosed in U.S. Pat. Nos. 2,761,791, 2,941,898, 3,508,947, and 3,526,528, and "Kotingu Kogaku (Coating Technology)" written by Yuji Harazaki, p. 253, published by Asakura Shoten (1973).

Figure 16:
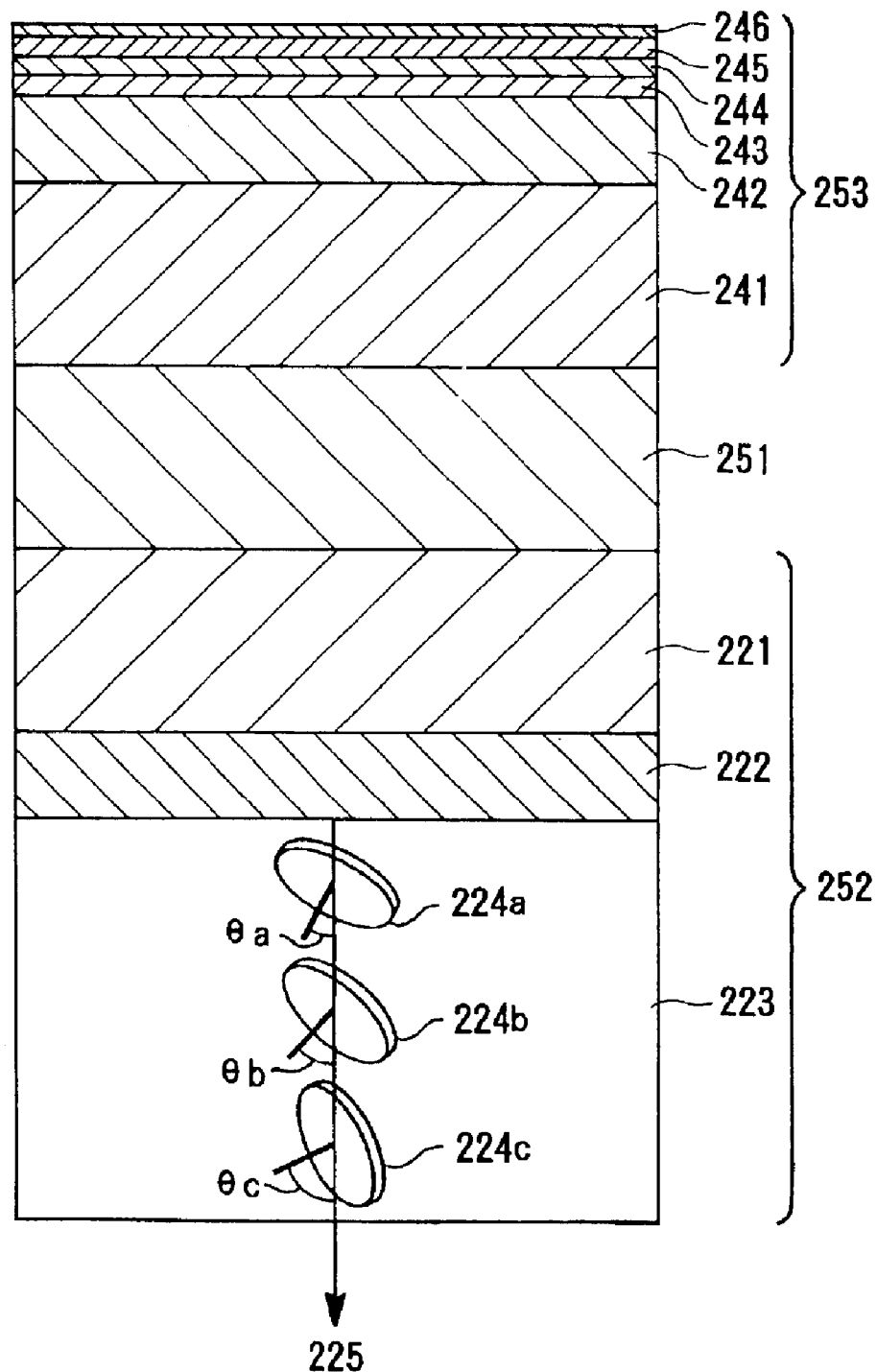
FIG. 16 is a sectional schematic view showing a representative layer constitution of a polarizing plate having optical compensation capacity and anti-reflection ability.

FIG. 16 shows an example of the construction drawings of the polarizing plate having anti-reflection capacity as well as optical compensative capacity, of the present invention. The polarizing plate of the present invention comprises two transparent supports 221, and 241, a polarizing layer 251 interposed therebetween, an optical compensative film 252 containing an optical anisotropic layer 223 on the surface opposite to the polarizing layer of one of the transparent supports, and an anti-reflection film 253 on the surface opposite to the polarizing layer of the other transparent support.

Figure 17:
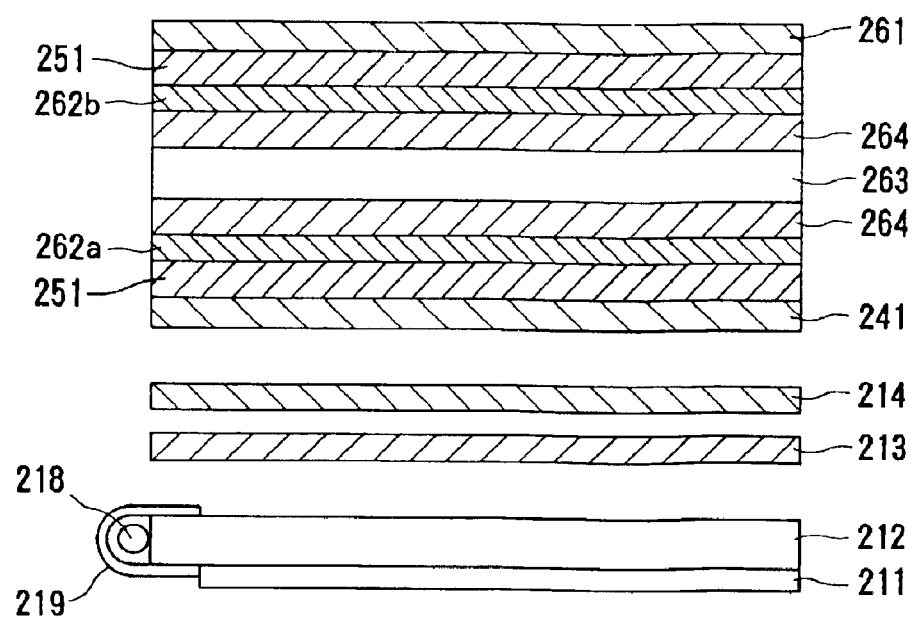
FIG. 17 is a drawing showing a representative construction of the liquid crystal display device employing the polarizing plate in the present invention.

The polarizing plate according to the present invention, which has optical compensative capacity and anti-reflection capacity, can be applied to a liquid-crystal-display-type image display device. FIG. 17 shows an example of the construction drawings of a liquid-crystal-display-type image display device. The anti-reflection film 261 is disposed, as a polarizing plate, on the side of a display in such manner that the anti-reflection film is faced to the side of the display, while the optical compensative layer (film) 262b is stuck to a liquid crystal cell 263 by the aid of a adhesive 265 or the like. This polarizing plate having the optical compensative film is also used as a polarizing plate on the side of backlight, while the optical compensative film 262a is stuck to the liquid crystal cell by the aid of a adhesive or the like.

Figure 18:
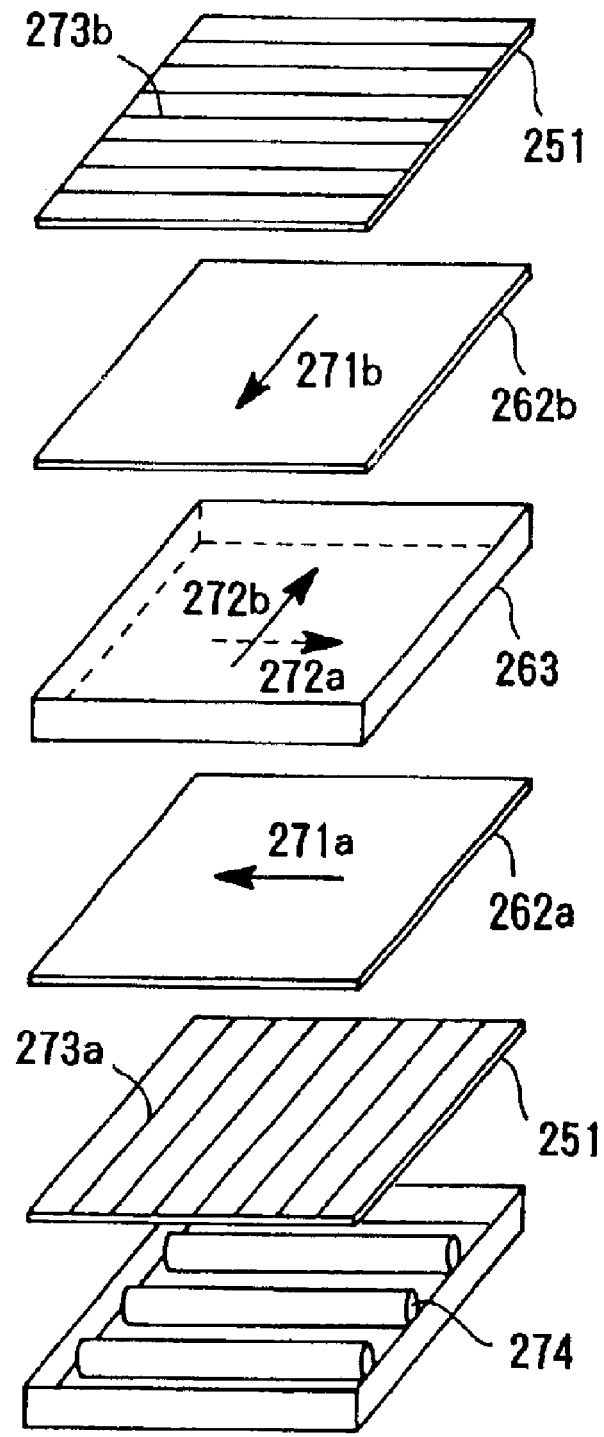
FIG. 18 is a drawing showing a representative structure of the liquid crystal display device in the present invention.

FIG. 18 is a representative schematic layout of the polarizing plate of the present invention for carrying out optical compensation. A backlight 274 side is a lower side, and a rubbing direction of a lower optical compensative film 262a is 271a while a rubbing direction of an upper optical compensative film 262b is 271b. A broken arrow mark 272a of a liquid crystal cell 263 shows a rubbing direction of a liquid crystal cell substrate on the side of the backlight while a solid line 272b shows a rubbing direction of a liquid crystal cell substrate on the side of the display. The notations 273a and 273b respectively show axes of transmittance of the polarizing plate.

As a schematic layout other than FIG. 18, the optical compensative film may not be provided in the form divided into 2 polarizing plates as described above. In other words, two optical anisotropic layers may be provided on the side of the liquid crystal cell of the lower polarizing plate.

Figure 19:
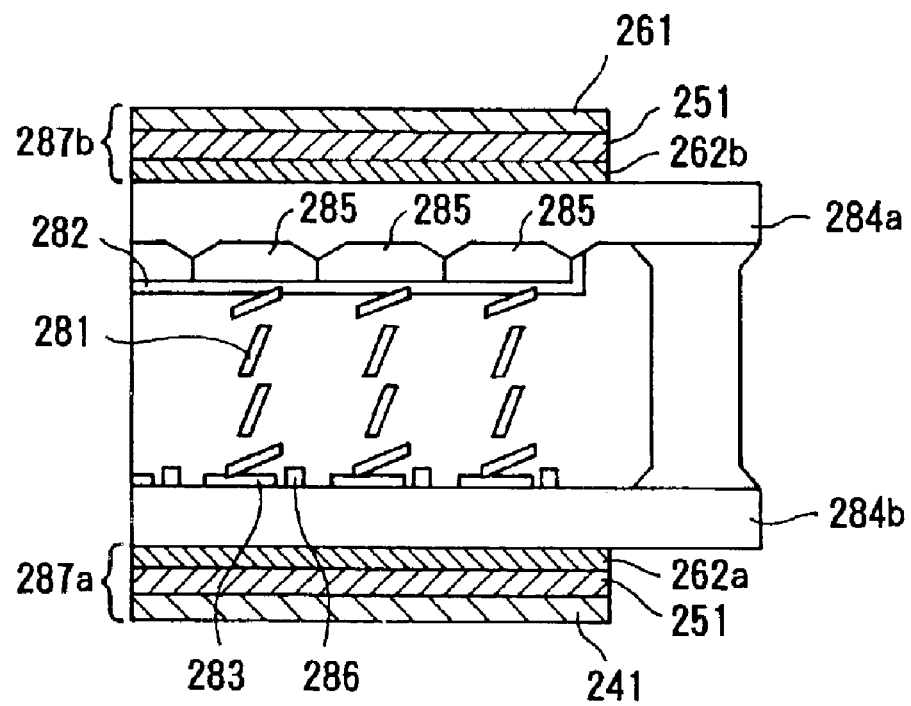
FIG. 19 is a drawing showing a representative structure of the color liquid crystal display device in the present invention.

FIG. 19 shows a representative construction drawing of a color-liquid-crystal-display-type image display device of the present invention. In FIG. 19, the color-liquid-crystal-display-type image display device is constructed by a liquid crystal cell comprising a glass substrate 284a provided with a facing transparent electrode 282 and a color filter 285, a glass substrate 284b provided with pixel electrodes 283 and TFT 286, and twisted nematic liquid crystals (twisted nematic liquid crystalline molecules) 281 interposed between the two substrates, and a pair of polarizing plates 287a (a lower polarizing plate) and 287b (a upper polarizing plate) provided on both sides of the liquid crystal cell. Among these parts, the notation 287b is the polarizing plate of the present invention, and the notation 287a may have an optical anisotropic layer. Or alternatively, the lower polarizing plate may be provided with two optical anisotropic layers as described above.

The anti-reflection film of the present invention can easily be manufactured by coating, and is suitable for mass-production. By using such an anti-reflection film as above, it is possible to effectively prevent reflection of light on the image display face of an image display device.

It is possible to provide an anti-reflection film having a high-refractive-index layer, which has a very high refractive index and is transparent. It is also possible to provide an anti-reflection film having a high-refractive-index layer excellent in physical strength (abrasion resistance, and the like) and weathering resistance (light resistance, moisture/heat resistance and the like).

The anti-reflection film has a low-refractive-index layer, which is excellent in strength and has a very low-refractive-index. The low-refractive-index layer is remarkably improved in view of prevention of face-troubles (pointing defects) from being generated.

By a polarizing plate having optical compensation capacity and anti-reflection ability according to the present invention, a liquid-crystal-display-type image display device using the polarizing plate, or a color-liquid-crystal-display-type image display device using the polarizing plate, it is possible to overcome deterioration in display quality based on reflection from light from the outside. By enlarging the field angle of a liquid-crystal-display-type or color liquid-crystal-display-type image display device in a TN mode, it is possible to provide a liquid-crystal-display-type image display device having excellent display quality in all directions. Furthermore, the device can be easily and stably manufactured, and can be supplied at a low price.

In order to explain the present invention in detail, the present invention will be described by way of working examples hereinafter. However, the present invention is not limited to these examples.

EXAMPLES

Examples Related to Embodiment 1

Example 1-1
(Preparation of Coating Solution of Hard Coat Layer)

155.0 g of methyl ethyl ketone and 220.0 g of cyclohexanone were added to 625 g of a methyl ethyl ketone solution of the commercially available hard coating material (DESORAITO Z7503 (trade name), manufactured by JSR Co., Ltd.) (solid content density; 72% by weight, silica content; 38% by weight). After stirring, the mixture was filtered through 4 μm mesh of a polypropylene filter to prepare a coating solution for hard coat layer.

(Preparation of a Titanium Dioxide Fine Particle-dispersed Solution)

The following were dispersed in a sand grinder mill to prepare a dispersion solution of titanium dioxide, having a weight-average particle size of 53 nm: 30.0 parts by weight of titanium dioxide fine particles having a core/shell structure (TTO-55B (trade name), shell material: alumina (9% by weight of the total particles), manufactured by Ishihara Sangyo Kaisha, Ltd.); 4.5 parts by weight of a commercially available anionic monomer (PM-21 (trade name), made by Nippon Kayaku Co., Ltd.); 0.3 part by weight of a commercially available cationic monomer (DMAEA (trade name), made by Kohjin Co., Ltd.); and 65.2 parts by weight of cyclohexanone.

(Preparation of a Coating Solution for a Middle-refractive-index Layer)

The following were added to 49.60 g of the above-mentioned titanium dioxide dispersed solution and then the resultant mixture was stirred: 18.08 g of dipentaerythritol hexaacrylate (DPHA (trade name), made by Nippon Kayaku Co., Ltd.); 0.920 g of a photopolymerization initiator (Irgacure 907 (trade name), made by Chiba Geigy Co.); 0.307 g of a photosensitizer (Kayacure DETX (trade name), made by Nippon Kayaku Co., Ltd.); 230.0 g of methyl ethyl ketone; and 500 g of cyclohexanone. The mixture was filtrated with a filter made of polypropylene and having pores of 0.4 μm in diameter, to prepare a coating solution for a middle-refractive-index layer.

(Preparation of a Coating Solution for a High-refractive-index Layer)

The following were added to 110.0 g of the above-mentioned titanium dioxide dispersed solution and then the resultant mixture was stirred: 6.29 g of dipentaerythritol hexaacrylate (DPHA (trade name), made by Nippon Kayaku Co., Ltd.); 0.520 g of a photopolymerization initiator (Irgacure 907 (trade name), made by Chiba Geigy Co.); 0.173 g of a photosensitizer (Kayacure DETX (trade name), made by Nippon Kayaku Co., Ltd.); 230.0 g of methyl ethyl ketone; and 460.0 g of cyclohexanone. The mixture was filtrated with a filter made of polypropylene and having pores of 0.4 μm in diameter, to prepare a coating solution for a high-refractive-index layer.

(Preparation of a Coating Solution for a Low-refractive-index Layer)

To 500 g of a commercially available methanol dispersion solution of silica fine particles (methanol silica sol, concentration: 30% by weight, made by Nissan Chemical industries, Ltd.,) were added 7.5 g of a silane coupling agent (KBM-503 (trade name), made by Shin-Etsu Chemical Co., Ltd.) and 5.0 g of 0.1 N hydrochloric acid, and then the mixture was stirred at room temperature for 5 hours. Thereafter, the mixture was allowed to stand still at room temperature for 5 days to prepare a solution wherein the silica fine particles treated with the silane coupling agent were dispersed in methanol.

To 121.0 g of the methanol dispersion solution of fine silica particles subjected to silane coupling agent treatment, 7.43 g of dipentaerythritol hexaacrylate (DPHA, manufactured by Nippon Kayaku Co., Ltd.), 0.297 g of photopolymerization initiator (Irgacure 907 (trade name), manufactured by Ciba-Geigy Co.), 0.149 g of a photosensitizer (Kayacure DETX (trade name), manufactured by Nippon Kayaku Co., Ltd.), 300 g of methyl iso-butyl ketone, and 300 g of 2-butanol were added and stirred. The thus-prepared mixture was filtrated through a 0.4 μm mesh polypropylene filter to prepare a coating solution for low-refractive-index layer.

(Preparation of a Coating Solution for an Over Coat Layer)

To 50.0 g of a thermally crosslinkable fluorine-containing polymer (TN-020C (trade name), concentration of solid content: 6% by weight, methyl isobutyl ketone solution, manufactured by JSR Co., Ltd.) were added 110.6 g of methyl isobutyl ketone and 39.4 g of cyclohexanone, and then the mixture was stirred. The mixture was filtrated with a filter made of polypropylene and having pores of 0.4 μm in diameter, to prepare a coating solution for an over coat layer.

(Production of an Anti-reflection Film)

The above-mentioned coating solution for a hard coat layer was applied onto a triacetylcellulose film (TAC-TD80U (trade name), made by Fuji Photo Film Co., Ltd.) having a thickness of 80 μm with a bar coater. The applied layer was dried at 90° C. and was then hardened by irradiation of ultraviolet rays, to form a hard coat layer having a thickness of 6 μm.

The above-mentioned coating solution for a middle-refractive-index layer was applied onto the hard coat layer with a bar coater. The applied layer was dried at 60° C. and was then hardened by irradiation of ultraviolet rays, to form a middle-refractive-index layer (refractive index: 1.70, thickness: 70 nm, TTO-55B, 21% by volume).

The above-mentioned coating solution for a high-refractive-index layer was applied onto the middle-refractive-index layer with a bar coater. The applied layer was dried at 60° C. and was then hardened by irradiation of ultraviolet rays, to form a high-refractive-index layer (refractive index: 1.95, thickness: 50 nm, TTO-55B, 51% by volume).

The above-mentioned coating solution for a low-refractive-index layer was applied onto the high-refractive-index layer with a bar coater. The applied layer was dried at 60° C. and was then hardened by irradiation of ultraviolet rays, to form a low-refractive-index layer (refractive index: 1.40, and thickness: 75 nm).

The above-mentioned coating solution for an over coat layer was applied onto the low-refractive-index layer with a bar coater, so that the applied amount of solid content would be 35 mg/m². The resultant was heated at 120° C. for 10 minutes, to form an over coat layer. In this way, an anti-reflection film was produced.

(Evaluation of the Anti-reflection Film)

The produced anti-reflection film was evaluated as to the following items. The results are shown in Tables 1 and 2.

(1) Whitening Test

A sunshine weather meter (S-80 (trade name), made by Suga Test Instruments Co.) was used to perform a whitening test under the condition of exposure to a sunshine carbon arc light at a relative humidity of 60% for 90 hours. The degree of whitening caused of the anti-reflection film before and after the exposure was observed, and then the anti-reflection film was evaluated according to the following three ranks.

A: Whitening was never observed by visual observation.

B: Whitening was slightly observed by visual observation.

C: Whitening was remarkably observed by visual observation.

(2) Evaluation of Haze

The haze before and after the above-mentioned exposure was evaluated with a haze meter (NHD-1001DP (trade name), made by Nippon Densyoku Industries Co., Ltd.).

(3) Evaluation of Average Reflectance

Spectral reflectance at an incidence angle of 5° in the wavelength region of 380 to 780 nm was measured by means of a spectrophotometer (manufactured by JASCO Corporation). An average reflectance before and after the mentioned exposure was obtained in the wavelength region of 450 to 650 nm.

(4) Evaluation of Pencil Hardness

The anti-reflection film before or after the above-mentioned exposure, was humidified under the conditions of 25° C. and 60% R.H. for 2 hours. Thereafter, according to the evaluation method of the pencil hardness specified by JIS-K-5400, the pencil hardness per Kg of load was evaluated using the testing pencil specified by JIS-S-6006.

(5) Evaluation of Steel Wool Scratch-resistance

A load of 500 g/cm² was applied to a steel wool of #0000 on the anti-reflection film before or after the above-mentioned exposure, and then the steel wool was caused to go and return 50 times. The state of generated scratch was observed and evaluated according to the following three ranks.

A: There was no scratch.

B: There were minor scratches, but they were hardly seen.

C: There were scratches remarkably.

(6) Evaluation of Wiping Easiness of Fingerprint

Fingerprints were attached on the surface of an anti-reflection film that was before or after the above-mentioned exposure. Then, a state at the time when the fingerprints were wiped with a cleaning cloth was observed and evaluated according to the following three grades.

A: Fingerprints were completely wiped off.

B: Part of fingerprints were left without being wiped off.

C: Substantially all fingerprints were left without being wiped off.

(7) Evaluation of Wiping Easiness of Ink of Marking Pen

An oil-based ink of a marking pen (ZEBRA macky (trade name), red, manufactured by ZEBRA Co.) was attached on the surface of an anti-reflection film that was before or after the exposure, and left for 30 minutes. Thereafter, a state at the time when the ink was wiped with a cleaning cloth was observed and evaluated according to the following three grades.

A: Marking-pen-ink was completely wiped off.

B: Part of marking-pen-ink was left without being wiped off.

C: Substantially all marking-pen-ink was left without being wiped off.

(8) Evaluation of Void Ratio in Low-Refractive-Index Layer

A void ratio in the low-refractive-index layer was calculated by comparison between a refractive index determined by the material which is incorporated in the low-refractive-index layer, and a refractive index determined by the spectral reflectance curve of the low-refractive-index layer.

(9) Evaluation of Void Occupation Ratio of Materials of Over Coating Layer in the Low-refractive-index Layer Based on the shapes of spectral curves of reflectance before and after coating the over coating layer, variation of the refractive index before and after coating was estimated, to measure a void occupation ratio in the low-refractive-index layer, owing to over coat layer materials.

Comparative Example 1-1

(Preparation of a Titanium Dioxide Fine Particle-dispersed Solution)

The following were dispersed in a sand grinder mill to prepare a solution wherein titanium dioxide, which had a weight-average particle size of 55 nm, was dispersed: 30.0 parts by weight of titanium dioxide fine particles having no core/shell structure (TTO-55N (trade name), shell material: none, made by Ishihara sangyo Kaisha, Ltd.); 4.5 parts by weight of a commercially available anionic monomer (PM-21 (trade name), made by Nippon Kayaku Co., Ltd.); 0.3 part by weight of a commercially available cationic monomer (DMAEA (trade name), made by Kohjin Co., Ltd.); and 65.2 parts by weight of cyclohexanone.

(Preparation of a Coating Solution for a Middle-refractive-index Layer)

The following were added to 45.14 g of the above-mentioned titanium dioxide dispersed solution, and then the resultant mixture was stirred: 18.74 g of dipentaerythritol hexaacrylate (DPHA (trade name), made by Nippon Kayaku Co., Ltd.); 0.941 g of a photopolymerization initiator (Irgacure 907 (trade name), made by Chiba Geigy Co.); 0.314 g of a photosensitizer (Kayacure DETX (trade name), made by Nippon Kayaku Co., Ltd.); 230.0 g of methyl ethyl ketone; and 500 g of cyclohexanone. The mixture was filtrated with a filter made of polypropylene and having pores of 0.4 μm in diameter, to prepare a coating solution for a middle-refractive-index layer.

(Preparation of Coating Solution for High-refractive-index Layer)

To 100.2 g of the thus-prepared dispersion solution of titanium dioxide, 7.76 g of dipentaerythritol hexaacrylate (DPHA (trade name), manufactured by Nippon Kayaku Co., Ltd.), 0.566 g of a photopolymerization initiator (Irgacure 907 (trade name), manufactured by Ciba-Geigy Co.), 0.189 g of a photosensitizer (Kayacure DETX (trade name), manufactured by Nippon Kayaku Co., Ltd.), 230.0 g of methyl ethyl ketone, and 460.0 g of cyclohexanone were added and stirred. The thus-prepared mixture was filtrated through a 0.4 μm mesh polypropylene filter, to prepare a coating solution for high-refractive-index layer.

(Production of an Anti-reflection Film)

The above-mentioned coating solution for a middle-refractive-index layer was applied onto the hard coat layer formed in Example 1-1, with a bar coater. The applied layer was dried at 60° C. and was then hardened by irradiation of ultraviolet rays, to form a middle-refractive-index layer (refractive index: 1.70, thickness: 70 nm, TTO-55N, 19% by volume).

The above-mentioned coating solution for a high-refractive-index layer was applied onto the middle-refractive-index layer with a bar coater. The applied layer was dried at 60° C. and was then hardened by irradiation of ultraviolet rays, to form a high-refractive-index layer (refractive index: 1.95, thickness: 50 nm, TTO-55N, 47% by volume).

The above-mentioned coating solution for a low-refractive-index layer, prepared in Example 1-1, was applied onto the high-refractive-index layer with a bar coater. The applied layer was dried at 60° C. and was then hardened by irradiation of ultraviolet rays to form a low-refractive-index layer (refractive index: 1.40, and thickness: 75 nm).

The above-mentioned coating solution for an over coat layer, prepared in Example 1-1, was applied onto the low-refractive-index layer with a bar coater, so that the applied amount of solid contents would be 35 mg/m². The resultant was heated at 120° C. for 10 minutes, to form an over coat layer. In this way, an anti-reflection film was produced.

(Evaluation of the Anti-reflection Film)

The produced anti-reflection film was evaluated in the same manner as in Example 1-1. The results are shown in Tables 1 and 2.

Example 1-2

(Preparation of a Titanium Dioxide Fine Particle-dispersed Solution)

The following were dispersed in a sand grinder mill to prepare a dispersion solution of titanium dioxide, having a weight-average particle size of 54 nm: 30.0 parts by weight of titanium dioxide fine particles having a core/shell structure (TTO-55D (trade name), shell material: alumina/zirconium oxide (22% by weight of the total particles), manufactured by Ishihara Sangyo Kaisha, Ltd.); 4.5 parts by weight of a commercially available anionic monomer (PM-21 (trade name), made by Nippon Kayaku Co., Ltd.); 0.3 part by weight of a commercially available cationic monomer (DMAEA (trade name), made by Kohjin Co., Ltd.); and 65.2 parts by weight of cyclohexanone.

(Preparation of a Coating Solution for a Middle-refractive-index Layer)

The following were added to 57.85 g of the above-mentioned titanium dioxide dispersed solution and then the resultant mixture was stirred: 16.86 g of dipentaerythritol hexaacrylate (DPHA (trade name), made by Nippon Kayaku Co., Ltd.); 0.910 g of a photopolymerization initiator (Irgacure 907 (trade name), made by Chiba Geigy); 0.303 g of a photosensitizer (Kayacure DETX (trade name), made by Nippon Kayaku Co., Ltd.); 230.0 g of methyl ethyl ketone; and 500 g of cyclohexanone. The mixture was filtrated with a filter made of polypropylene and having pores of 0.4 μm in diameter, to prepare a coating solution for a middle-refractive-index layer.

(Preparation of a Coating Solution for a High-refractive-index Layer)

The following were added to 128.5 g of the above-mentioned titanium dioxide dispersed solution and then the resultant mixture was stirred: 3.57 g of dipentaerythritol hexaacrylate (DPHA (trade name), made by Nippon Kayaku Co., Ltd.); 0.519 g of a photopolymerization initiator (Irgacure 907 (trade name), made by Chiba Geigy); 0.173 g of a photosensitizer (Kayacure DETX (trade name), made by Nippon Kayaku Co., Ltd.); 230.0 g of methyl ethyl ketone; and 460.0 g of cyclohexanone. The mixture was filtrated with a filter made of polypropylene and having pores of 0.4 μm in diameter, to prepare a coating solution for a high-refractive-index layer.

(Production of an Anti-reflection Film)

The above-mentioned coating solution for a middle-refractive-index layer was applied onto the hard coat layer formed in Example 1-1 with a bar coater. The applied layer was dried at 60° C. and was then hardened by irradiation of ultraviolet rays to form a middle-refractive-index layer (refractive index: 1.70, thickness: 70 nm, TTO-55D, 25% by volume).

The above-mentioned coating solution for a high-refractive-index layer was applied onto the middle-refractive-index layer with a bar coater. The applied layer was dried at 60° C. and was then hardened by irradiation with ultraviolet rays, to form a high-refractive-index layer (refractive index: 1.95, thickness: 50 nm, TTO-55D, 59% by volume).

The coating solution for a low-refractive-index layer, prepared in Example 1-1, was applied onto the high-refractive-index layer with a bar coater. The applied layer was dried at 60° C. and was then hardened by irradiation of ultraviolet rays to form a low-refractive-index layer (refractive index: 1.40, and thickness: 75 nm).

The above-mentioned coating solution for an over coat layer, prepared in Example 1-1, was applied onto the low-refractive-index layer with a bar coater, so that the applied amount of solid contents would be 35 mg/m². The resultant was heated at 120° C. for 10 minutes to form an over coat layer. In this way, an anti-reflection film was produced.

(Evaluation of the Anti-reflection Film)

The produced anti-reflection film was evaluated in the same manner as in Example 1-1. The results are shown in Tables 1 and 2.

Example 1-3

The following were dispersed in a sand grinder mill to prepare a dispersion solution of titanium dioxide, having a weight-average particle size of 54 nm: 30.0 parts by weight of titanium dioxide fine particles having a core/shell structure (TTO-55A (trade name), shell material: alumina (5% by weight of the total particles), made by Ishihara sangyo Kaisha, Ltd.); 4.5 parts by weight of a commercially available anionic monomer (PM-21 (trade name), made by Nippon Kayaku Co., Ltd.); 0.3 part by weight of a commercially available cationic monomer (DMAEA (trade name), made by Kohjin Co., Ltd.); and 65.2 parts by weight of cyclohexanone.

(Preparation of a Coating Solution for a Middle-refractive-index Layer)

The following were added to 47.52 g of the above-mentioned titanium dioxide dispersed solution and then the resultant mixture was stirred: 18.39 g of dipentaerythritol hexaacrylate (DPHA (trade name), made by Nippon Kayaku Co., Ltd.); 0.931 g of a photopolymerization initiator (Irgacure 907 (trade name), made by Chiba Geigy Co.); 0.311 g of a photosensitizer (Kayacure DETX (trade name), made by Nippon Kayaku Co., Ltd.); 230.0 g of methyl ethyl ketone; and 500 g of cyclohexanone. The mixture was filtrated with a filter made of polypropylene and having pores of 0.4 μm in diameter, to prepare a coating solution for a middle-refractive-index layer.

(Preparation of a Coating Solution for a High-refractive-index Layer)

The following were added to 105.5 g of the above-mentioned titanium dioxide dispersed solution and then the resultant mixture was stirred: 6.97 g of dipentaerythritol hexaacrylate (DPHA (trade name), made by Nippon Kayaku Co., Ltd.); 0.542 g of a photopolymerization initiator (Irgacure 907 (trade name), made by Chiba Geigy); 0.181 g of a photosensitizer (Kayacure DETX (trade name), made by Nippon Kayaku Co., Ltd.); 230.0 g of methyl ethyl ketone; and 460.0 g of cyclohexanone. The mixture was filtrated with a filter made of polypropylene and having pores of 0.4 μm in diameter, to prepare a coating solution for a high-refractive-index layer.

(Production of an Anti-reflection Film)

The above-mentioned coating solution for a middle-refractive-index layer was applied onto the hard coat layer formed in Example 1-1 with a bar coater. The applied layer was dried at 60° C. and was then hardened by irradiation of ultraviolet rays to form a middle-refractive-index layer (refractive index: 1.70, thickness: 70 nm, TTO-55A, 20% by volume).

The above-mentioned coating solution for a high-refractive-index layer was applied onto the middle-refractive-index layer with a bar coater. The applied layer was dried at 60° C. and was then hardened by irradiation with ultraviolet rays, to form a high-refractive-index layer (refractive index: 1.95, thickness: 50 nm, TTO-55A, 49% by volume).

The coating solution for a low-refractive-index layer, prepared in Example 1-1, was applied onto the high-refractive-index layer with a bar coater. The applied layer was dried at 60° C. and was then hardened by irradiation with ultraviolet rays, to form a low-refractive-index layer (refractive index: 1.40, and thickness: 75 nm).

The above-mentioned coating solution for an over coat layer, prepared in Example 1-1, was applied onto the low-refractive-index layer with a bar coater, so that the applied amount of solid contents would be 35 mg/m$^2$. The resultant was heated at 120° C. for 10 minutes, to form an over coat layer. In this way, an anti-reflection film was produced.

(Evaluation of the Anti-reflection Film)

The produced anti-reflection film was evaluated in the same manner as in Example 1-1. The results are shown in Tables 1 and 2.

Example 1-4

(Preparation of a Coating Solution for an Over Coat Layer)

To 50.0 g of a thermally crosslinking fluorine-containing polymer (JN-7214 (trade name), concentration of solid components: 6% by weight in methyl isobutyl ketone solution, made by JSR Co., Ltd.) were added 110.6 g of methyl isobutyl ketone and 39.4 g of cyclohexanone, and then the mixture was stirred. The mixture was filtrated with a filter made of polypropylene and having pores of 0.4 μm in diameter, to prepare a coating solution for an over coat layer.

(Production of an Anti-reflection Film)

The above-mentioned coating solution for an over coat layer was applied onto the low-refractive-index layer, prepared in Example 1-1, with a bar coater, so that the applied amount of solid components would be 35 mg/m$^2$. The resultant was heated at 120° C. for 10 minutes to form an over coat layer. In this way, an anti-reflection film was produced.

(Evaluation of the Anti-reflection Film)

The produced anti-reflection film was evaluated in the same manner as in Example 1-1. The results are shown in Tables 1 and 2.

Example 1-5

(Preparation of a Coating Solution for an Over Coat Layer)

To 3.0 g of a commercially available fluorine-containing polymer (Sitop CTX-809A (trade name), made by Asahi Glass Co.) having an average-weight molecular weight of 200,000 was added 197.0 g of a commercially available fluorine-based solvent (Florinate FC77 (trade name), made by Sumitomo 3M Ltd.), and then the mixture was stirred. The mixture was filtrated with a filter made of polypropylene and having pores of 0.4 μm in diameter, to prepare a coating solution for an over coat layer.

(Production of an Anti-reflection Film)

The above-mentioned coating solution for an over coat layer was applied onto the low-refractive-index layer prepared in Example 1-1, with a bar coater, so that the applied amount of solid content would be 35 mg/m$^2$. The resultant was heated at 120° C. for 10 minutes, to form an over coat layer. In this way, an anti-reflection film was produced.

(Evaluation of the Anti-reflection Film)

The produced anti-reflection film was evaluated in the same manner as in Example 1-1. The results are shown in Tables 1 and 2.

Example 1-6

(Preparation of a Coating Solution for an Over Coat Layer)

To 50.0 g of a ultraviolet-crosslinking fluorine-containing polymer (TN-011 (trade name), concentration of solid content: 6% by weight, methyl isobutyl ketone solution, made by JSR Co., Ltd.) were added 110.6 g of methyl isobutyl ketone and 39.4 g of cyclohexanone, and then the mixture was stirred. The mixture was filtrated with a filter made of polypropylene and having pores of 0.4 μm in diameter, to prepare a coating solution for an over coat layer.

(Production of an Anti-reflection Film)

The above-mentioned coating solution for an over coat layer was applied onto the low-refractive-index layer prepared in Example 1-1, with a bar coater, so that the applied amount of solid content would be 35 mg/m$^2$. The resultant was dried at 60° C. Thereafter, the applied layer was irradiated with ultraviolet rays and hardened to form an over coat layer. In this way, an anti-reflection film was produced.

(Evaluation of the Anti-reflection Film)

The produced anti-reflection film was evaluated in the same manner as in Example 1-1. The results are shown in Tables 1 and 2.

Example 1-7
(Preparation of a Coating Solution for an Over Coat Layer)

To 1.0 g of a commercially available silane coupling agent (KP-801M (trade name), made by Sin-Etsu Chemical Co., Ltd.) was added 330 g of a commercially available fluorine-based solvent (Florinate FC77 (trade name), made by Sumitomo 3M Ltd.), and then the mixture was stirred. The mixture was filtrated with a filter made of polypropylene and having pores of 0.4 μm in diameter, to prepare a coating solution for an over coat layer.

(Production of an Anti-reflection Film)

The above-mentioned coating solution for an over coat layer was applied onto the low-refractive-index layer prepared in Example 1-1, with a bar coater, so that the applied amount of solid content would be 5 mg/m². The resultant was heated at 120° C. for 30 minutes, to form an over coat layer. In this way, an anti-reflection film was produced.

(Evaluation of the Anti-reflection Film)

The produced anti-reflection film was evaluated in the same manner as in Example 1-1. The results are shown in Tables 1 and 2.

Example 1-8
(Preparation of a Coating Solution for a Low-refractive-index Layer)

A thermally crosslinking fluorine-containing polymer (TN-O2OC (trade name), concentration of solid contents: 6% by weight, methyl isobutyl ketone solution, made by JSR Co., Ltd.,) was used. The polymer was filtrated with a filter made of polypropylene and having pores of 0.4 μm in diameter, to prepare a coating solution for an over coat layer.

(Production of an Anti-reflection Film)

The above-mentioned coating solution for a low-refractive-index layer was applied onto the high-refractive-index layer prepared in Example 1-1, with a bar coater. The resultant was heated at 120° C. for 10 minutes, to form an over coat layer (refractive index: 1.42, and thickness: 97 nm). In this way, an anti-reflection film was produced.

(Evaluation of the Anti-reflection Film)

The produced anti-reflection film was evaluated in the same manner as in Example 1-1. The results are shown in Tables 1 and 2.

Comparative Example 1-2
(Production of an Anti-reflection Film)

The above-mentioned coating solution for a low-refractive-index layer, prepared in Example 1-8, was applied onto the high-refractive-index layer prepared in Comparative Example 1-1, with a bar coater. The resultant was heated at 120° C. for 10 minutes, to form an over coat layer (refractive index: 1.42, and thickness: 97 nm). In this way, an anti-reflection film was produced.

(Evaluation of the Anti-reflection Film)

The produced anti-reflection film was evaluated in the same manner as in Example 1-1. The results are shown in Tables 1 and 2.

Example 1-9
(Production of an Anti-reflection Film)

An anti-reflection film was produced in the same manner as in Example 1-1, except that when the middle-refractive-index layer, the high-refractive-index layer, and the low-refractive-index layer were formed, irradiation of ultraviolet rays were carried out with purging by nitrogen so that the atmosphere wold have an oxygen concentration of 2 to 4 vol %, to cure each coated layer.

(Evaluation of the Anti-reflection Film)

The produced anti-reflection film was evaluated in the same manner as in Example 1-1. The results are also shown in Tables 1 and 2.

Example 1-10
(Production of an Anti-reflection Film)

An anti-reflection film was produced in the same manner as in Example 1-8, except that when the middle-refractive-index layer and the high-refractive-index layer were formed, irradiation of ultraviolet rays were carried out with purging by nitrogen so that the atmosphere would have an oxygen concentration of 2 to 4 vol %, to cure each coated layer.

(Evaluation of the Anti-reflection Film)

The produced anti-reflection film was evaluated in the same manner as in Example 1-1. The results are also shown in Tables 1 and 2.

Example 1-11
(Production of an Anti-reflection Film)

One of the surfaces of a triacetylcellulose film (TAC-TD80UF (trade name), made by Fuji Photo Film Co., Ltd.) having a thickness of 80 μm was subjected to saponification treatment. The coating solution for a hard coat layer as prepared in Example 1-1 was applied onto the other surface of the triacetylcellulose film that had not been subjected to saponification treatment, with a bar coater. The applied layer was dried at 90° C. and was then cured by irradiation of ultraviolet rays, to form a hard coat layer having a thickness of 6 μm.

Onto the thus-prepared hardcoat layer, the middle-refractive-index layer, the high-refractive-index layer, and the low-refractive-index layer were formed in the same manner as in Example 1-1, to prepare an anti-reflection film.

(Evaluation of the Anti-reflection Film)

The produced anti-reflection film was evaluated in the same manner as in Example 1-1. The results are also shown in Tables 1 and 2.

(Preparation of a Polarizing Plate)

A polyvinyl alcohol film having a thickness of 75 μm (manufactured by Kuraray Co.) was immersed in an aqueous solution composed of 1000 parts by weight of water, 7 parts by weight of iodide, and 105 parts by weight of potassium iodide, for 5 minutes, to allow the adsorption of iodide. Thereafter, this film was monoaxially stretched 4.4 times in the lengthwise direction, in a 4 wt %-boric acid aqueous solution, at 40° C., and then the film was dried with being stretched to prepare a polarizing film.

To one side of the polarizing film, the saponified side of the triacetylcellulose film of the anti-reflection film was adhered using a polyvinylalcohol-series adhesive as an adhesive. Further, on the other side of the polarizing film, a saponified triacetylcellulose film was adhered using the same polyvinylalcohol-series adhesive. In this manner, a polarizing plate was prepared.

(Evaluation of the Polarizing Plate)

The thus-prepared polarizing plate was evaluated in the same manner as in Example 3-1 mentioned below, and good results were obtained.

With respect to the evaluation of the anti-reflection films, in addition to the above items (1) to (9), each anti-reflection film was evaluated on the following items (10) and (11).

(10) Evaluation of Dynamic Friction Coefficient

The dynamic friction coefficient was evaluated as an indication of the sliding property of the surface of the low-reflective-index layer side of the anti-reflection film. The dynamic friction coefficient was measured, after the anti-reflection film sample was subjected to humidification of a temperature of 25° C. and a relative humidity of 60% for 2 hours, by means of a dynamic friction meter (HEIDON-14) using a stainless steel ball having a diameter of 5 mm, with a load of 100 g, at a rate of 60 cm/min.

(11) Evaluation of Contact Angle

The anti-reflection film sample was subjected to humidification at a temperature of 25° C. and a humidity of 60%RH for 2 hours. Thereafter, contact angle with water of the surface of the anti-reflective film on the side of the low-reflective-index layer was measured.

TABLE 1

|  | Whitening test | Haze (%) Before | Haze (%) After | Average reflectance (%) Before | Average reflectance (%) After | Dynamic friction coefficient | Pencil hardness Before | Pencil hardness After | Steel wool scratch-resistance Before | Steel wool scratch-resistance After |
|---|---|---|---|---|---|---|---|---|---|---|
| Example 1-1 | A | 0.2 | 0.2 | 0.52 | 0.53 | 0.09 | 3 H | 3 H | A | A |
| Comparative example 1-1 | C | 0.4 | 2.5 | 0.54 | 0.83 | 0.09 | 3 H | H | A | C |
| Example 1-2 | A | 0.3 | 0.3 | 0.53 | 0.52 | 0.09 | 3 H | 3 H | A | A |
| Example 1-3 | B | 0.2 | 0.3 | 0.53 | 0.57 | 0.09 | 3 H | 2 H | A | A |
| Example 1-4 | A | 0.1 | 0.1 | 0.65 | 0.64 | 0.10 | 3 H | 3 H | A | A |
| Example 1-5 | A | 0.2 | 0.2 | 0.53 | 0.52 | 0.20 | 3 H | 3 H | A | A |
| Example 1-6 | A | 0.2 | 0.2 | 0.55 | 0.54 | 0.10 | 3 H | 3 H | A | A |
| Example 1-7 | A | 0.2 | 0.2 | 0.36 | 0.37 | 0.30 | 3 H | 3 H | B | B |
| Example 1-8 | A | 0.1 | 0.1 | 0.35 | 0.36 | 0.09 | 2 H | 2 H | B | B |
| Comparative example 1-2 | C | 0.4 | 2.3 | 0.37 | 0.68 | 0.09 | 2 H | H | B | C |
| Example 1-9 | A | 0.2 | 0.2 | 0.52 | 0.53 | 0.09 | 3 H | 3 H | A | A |
| Example 1-10 | A | 0.1 | 0.1 | 0.35 | 0.36 | 0.09 | 2 H | 2 H | B | B |
| Example 1-11 | A | 0.2 | 0.2 | 0.52 | 0.53 | 0.09 | 3 H | 3 H | A | A |

TABLE 2

|  | Contact angle (degree) | Easiness of fingerprint to be wiped Before | Easiness of fingerprint to be wiped After | Easiness of marking-pen-ink to be wiped off Before | Easiness of marking-pen-ink to be wiped off After | Void ratio in low-refractive-index layer (by volume %) | Occupation ratio of voids in low-refractive-index layer (by volume %) |
|---|---|---|---|---|---|---|---|
| Example 1-1 | 103 | A | A | A | A | 16.3 | 51.2 |
| Comparative example 1-1 | 103 | A | A | A | A | 16.2 | 51.3 |
| Example 1-2 | 103 | A | A | A | A | 16.3 | 51.1 |
| Example 1-3 | 103 | A | A | A | A | 16.5 | 50.9 |
| Example 1-4 | 101 | A | A | A | A | 16.4 | 100 |
| Example 1-5 | 105 | A | A | A | A | 16.3 | 49.6 |
| Example 1-6 | 100 | A | A | A | A | 16.2 | 52.5 |
| Example 1-7 | 98 | B | B | A | A | 16.1 | 14.0 |
| Example 1-8 | 103 | A | A | A | A | 0 | — |
| Comparative example 1-2 | 103 | A | A | A | A | 0 | — |
| Example 1-9 | 103 | A | A | A | A | 16.3 | 51.2 |
| Example 1-10 | 103 | A | A | A | A | 0 | — |
| Example 1-11 | 103 | A | A | A | A | 16.3 | 51.2 |

Examples Related to Embodiment 2

Example 2-1

(Preparation of Coating Solution of Hard Coat Layer)

155.0 g of methyl ethyl ketone and 220.0 g of cyclohexanone were added to 625 g of a methyl ethyl ketone solution of the commercially available hard coating material (DESORAITO Z7503 (trade name), manufactured by JSR Co., Ltd.) (solid content density; 72% by weight, silica content; 38% by weight). After stirring, the mixture was filtered through 4 μm mesh of a polypropylene filter to prepare a coating solution for hard coat layer.

(Preparation of Dispersion Solution of Short Fibrous Inorganic Fine Particles)

To a mixed solvent of 139.0 of pure water and 167.0 g of methanol, 2982.5 g of a water/methanol solution of tetraethoxy silane (wherein 533.0 g of tetraethoxy silane was dissolved in 2450 g of a mixed solvent of water/methanol (weight ratio 2/8)), and 596.4 g an 0.25% aqueous ammonia were added simultaneously over 15 hours, while maintaining at 60° C. After completion of addition, the resulting mixture was further ripened at the same temperature for 3 hours. Thereafter, the unreacted tetraethoxy silane, methanol, and ammonia were almost completely removed by a ultrafiltration filter, and then a pure water was added to the resulting substance so that the density of silica becomes 1% by weight. The ammonia density measured by an ion-selective electrode was 80 ppm.

Next, the resultant mixture was subjected to hydrothermal treatment, in an autoclave, at 300° C., for 10 hours, and thereafter it was refined by means of an amphoteric ion-exchange resin, to prepare a dispersion solution of short fibrous fine silica particles having the mean diameter of about 15 nm, and the mean length of about 60 nm.

From the thus-obtained aqueous dispersion solution of short fibrous fine silica particles, a methanol dispersion solution of short fibrous fine silica particles having the density of 20% by weight was prepared, according to a solvent substitution method.

(Preparation of Coating Solution for Low-refractive-index Layer)

To 500 g of the thus-prepared methanol dispersion solution of short fibrous fine silica particles, 5.0 g of silane coupling agent (KBM-503 (trade name), manufactured by Shin-Etsu Chemical Co., Ltd.) and 5.0 g of 0.1 N hydrochloric acid were added and stirred at a room temperature for 5 hours, and then stored at a room temperature for 5 days. Thus, a methanol dispersion solution of short fibrous fine silica particles subjected to silane coupling agent treatment, was prepared.

To 138.1 g of the methanol dispersion solution of short fibrous fine silica particles subjected to silane coupling agent treatment, 13.35 g of dipentaerythritol hexaacrylate (DPHA (trade name), manufactured by Nippon Kayaku Co., Ltd.), 0.534 g of a photopolymerization initiator (Irgacure 907 (trade name), manufactured by Ciba-Geigy Co.), 0.267 g of a photosensitizer (Kayacure DETX (trade name), manufactured by Nippon Kayaku Co., Ltd.), 300 g of methyl isobutyl ketone, and 300 g of 2-butanol were added and stirred. The thus-prepared mixture was filtrated through a 0.4 $\mu$m mesh polypropylene filter to prepare a coating solution for low-refractive-index layer.

(Production of Anti-reflection Film)

The anti-reflection film was prepared under the environmental conditions, in which the number of dusts having a size of 0.3 $\mu$m or more is 3 or less per m$^3$ of air.

The above-described coating solution for hard coat layer was coated on a triacetyl cellulose film having 80 $\mu$m thickness (TAC-TD80U (trade name), manufactured by Fuji Photo Film Co. Ltd.) with a bar coater, and the coated layer was dried at 90° C., and irradiated with ultraviolet radiation to harden. Thus, a hard coat layer having 6 $\mu$m thickness was formed.

The above-described coating solution for low-refractive-index layer was applied on the hard coat layer with a bar coater. After being dried at 90° C., thus-coated layer was irradiated with ultraviolet radiation for hardening, to form a low-refractive-index layer (thickness; 95 nm). Thus, an anti-reflection film was prepared.

(Evaluation of Anti-reflection Film)

The thus-produced anti-reflection film was subjected to the following points of evaluation. The results are shown in Table 3.

(1) Evaluation of Pointing Defect

The number of pointing defects having a diameter of 10 $\mu$m or more was counted per m of the produced anti-reflection film. The size of the pointing defect was measured by means of a microscopy. The pointing defect is observed like a bright point by a naked eye.

(2) Evaluation of Average Reflectance

Spectral reflectance at an incidence angle of 50 in the wavelength region of 380 to 780 nm was measured by means of a spectrophotometer (manufactured by JASCO Corporation). An average reflectance was obtained in the wavelength region of 450 to 650 nm.

(3) Evaluation of Refractive Index of Low-refractive-index Layer

A refractive Index was estimated by a computation from a shape of the spectral reflectance curve of low-refractive-index layer.

(4) Evaluation of Void Ratio in Low-Refractive-Index Layer

A void ratio in the low-refractive-index layer was calculated by comparison between a refractive index determined by the material, which is incorporated in the low-refractive-index layer, and a refractive index determined by the above-described spectral reflectance curve.

(5) Evaluation of Pencil Hardness

The anti-reflection film was humidified under the conditions of 25° C. and 60% R.H. for 2 hours. Thereafter, according to the evaluation method of the pencil hardness specified by JIS-K-5400, the pencil hardness per Kg of load was evaluated using the testing pencil specified by JIS-S-6006.

Comparative Example 2-1

(Preparation of Dispersion Solution of Spherical Inorganic Fine Particles)

Similarly to Example 2-1, tetraethoxy silane was subjected to hydrolysis. Thereafter, the resultant mixture was refined by ultrafiltration and adjusted to the silica density of 1% by weight and the ammonia density of 110 ppm, respectively. Then, the mixture was subjected to hydrothermal treatment, in an autoclave, at 200° C., for 10 hours, to prepare a dispersion solution of spherical fine silica particles having the mean diameter of about 15 nm.

From the thus-obtained aqueous dispersion solution of spherical fine silica particles, a methanol dispersion solution of spherical fine silica particles having the density of 20% by weight was prepared according to a solvent substitution method.

(Preparation of Coating Solution of Low-refractive-index Layer)

To 500 g of the thus-obtained methanol dispersion solution of spherical fine silica particles, 5.0 g of silane coupling agent (KBM-503 (trade name), manufactured by Shin-Etsu Chemical Co., Ltd.) and 5.0 g of 0.1 N hydrochloric acid were added and stirred at a room temperature for 5 hours, and then stored at a room temperature for 5 days. Thus, a methanol dispersion solution of spherical fine silica particles subjected to silane coupling agent treatment, was obtained.

To 181.5 g of the methanol dispersion solution of spherical fine silica particles subjected to silane coupling agent treatment, 7.43 g of dipentaerythritol hexaacrylate (DPHA (trade name), manufactured by Nippon Kayaku Co., Ltd.), 0.297 g of photopolymerization initiator (Irgacure 907 (trade name), manufactured by Ciba-Geigy Co.), 0.149 g of a photosensitizer (Kayacure DETX (trade name), manufactured by Nippon Kayaku Co., Ltd.), 300 g of methyl isobutyl ketone, and 300 g of 2-butanol were added and stirred. The

TABLE 3

| | Point defect (number/m$^2$) | Average reflectance (%) | Refractive index of low-refractive-index layer | Void ratio in low-refractive-index layer (% by volume) | Pencil hardness |
|---|---|---|---|---|---|
| Example 2-1 | 0 | 1.76 | 1.40 | 17.3 | 2 H |
| Comparative Example 2-1 | 85 | 1.77 | 1.40 | 16.1 | 2 H |
| Comparative Example 2-2 | 25 | 3.66 | 1.49 | 0 | 2 H |
| Example 2-2 | 0 | 2.12 | 1.42 | 15.1 | 2 H | thus-prepared mixture was filtrated through a 0.4 μm mesh polypropylene filter, to prepare a coating solution for low-refractive-index layer.
(Production of Anti-reflection Film) The anti-reflection film was prepared under the environmental conditions, in which the number of dusts having a size of 0.3 μm or more is 3 or less per m³ of air.

The above-described coating solution for low-refractive-index layer was applied on the hard coat layer prepared in Example 2-1, with a bar coater, and the coated layer was dried at 60° C., and irradiated with ultraviolet radiation for hardening, to form a low-refractive-index layer (thickness; 95 nm). Thus, an anti-reflection film was prepared.
(Evaluation of Anti-reflection Film)

The thus-produced anti-reflection film was subjected to the same evaluation as in Example 2-1. The obtained results are shown in Table 3.

Comparative Example 2-2

(Preparation of Coating Solution for Low-refractive-index Layer)

To 138.1 g of the methanol dispersion solution of spherical fine silica particles subjected to silane coupling agent treatment, which had been prepared in Comparison Example 2-1, 13.35 g of dipentaerythritol hexaacrylate (DPHA (trade name), manufactured by Nippon Kayaku Co., Ltd.), 0.534 g of a photopolymerization initiator (Irgacure 907 (trade name), manufactured by Ciba-Geigy Co.), 0.267 g of a photosensitizer (Kayacure DETX (trade name), manufactured by Nippon Kayaku Co., Ltd.), 300 g of methyl isobutyl ketone, and 300 g of 2-butanol were added and stirred. The thus-prepared mixture was filtrated through a 0.4 μm mesh polypropylene filter, to prepare a coating solution for low-refractive-index layer.
(Production of Anti-reflection Film)

The anti-reflection film was prepared under the environmental conditions, in which the number of dusts having a size of 0.3 μm or more is 3 or less per m³ of air.

The above-described coating solution for low-refractive-index layer was applied on the hard coat layer prepared in Example 2-1, with a bar coater, dried at 60° C., and irradiated with ultraviolet radiation for hardening, to form a low-refractive-index layer (thickness; 95 nm). Thus, an anti-reflection film was prepared.
(Evaluation of Anti-reflection Film)

The thus-produced anti-reflection film was subjected to the same evaluation as in Example 2-1. The obtained results are shown in Table 3.

Example 2-2

(Preparation of Dispersion Solution of Short Fibrous Inorganic Fine Particles)

From an aqueous dispersion solution of an commercially available short fibrous fine silica particles (SNOWTEX PS-M (trade name), manufactured by Nissan Chemical Industries, Ltd.), a methanol dispersion solution of the short fibrous fine silica particles, having the density of 20% by weight, was prepared according to a solvent substitution method.
(Preparation of Coating Solution for Low-refractive-index Layer)

To 500 g of the thus-prepared methanol dispersion solution of short fibrous fine silica particles, 5.0 g of silane coupling agent (KBM-503 (trade name), manufactured by Shin-Etsu Chemical Co., Ltd.) and 5.0 g of 0.1 N hydrochloric acid were added and stirred at a room temperature for 5 hours, and then stored at a room temperature for 5 days. Thus, a methanol dispersion solution of short fibrous fine silica particles subjected to silane coupling agent treatment, was prepared.

To 138.1 g of the methanol dispersion solution of short fibrous fine silica particles subjected to silane coupling agent treatment, 13.35 g of dipentaerythritol hexaacrylate (DPHA (trade name), manufactured by Nippon Kayaku Co., Ltd.), 0.534 g of a photopolymerization initiator (Irgacure 907 (trade name), manufactured by Ciba-Geigy Co.), 0.267 g of a photosensitizer (Kayacure DETX (trade name), manufactured by Nippon Kayaku Co., Ltd.), 300 g of methyl isobutyl ketone, and 300 g of 2-butanol were added and stirred. The thus-prepared mixture was filtrated through a 0.4 μm mesh polypropylene filter, to prepare a coating solution for low-refractive-index layer.
(Production of Anti-reflection Film)

The anti-reflection film was prepared under the environmental conditions, in which the number of dusts having a size of 0.3 μm or more is 3 or less per m³ of air.

The above-described coating solution for low-refractive-index layer was applied on the hard coating layer prepared in Example 2-1, with a bar coater. The coated layer was dried at 60° C., and irradiated with ultraviolet radiation for hardening, to form a low-refractive-index layer (thickness; 95 nm). Thus, an anti-reflection film was prepared.
(Evaluation of Anti-reflection Film)

The thus-produced anti-reflection film was subjected to the same evaluation as in Example 2-1. The results are shown in Table 3.

Example 2-3

(Preparation of Dispersion Solution of Inorganic Fine Particles for High-refractive-index Layer)

20 weight parts of ATO (antimony-containing tin oxide, specific surface area: 95 m²/g, powder specific resistance: 2 Ω·cm), 6 weight parts of an commercially available anionic monomer (PM-21 (trade name), manufactured by Nippon Kayaku Co., Ltd.) and 74 weight parts of cyclohexanone were dispersed by means of a sandgrinder mill, to prepare a dispersion solution of ATO having the weight-mean diameter of 30 nm.
(Preparation of Coating Solution for High-refractive-index Layer)

To 100.0 g of the thus-prepared dispersion solution of ATO, 31.1 g of dipentaerythritol hexaacrylate (DPHA, manufactured by Nippon Kayaku Co., Ltd.), 1.670 g of a photopolymerization initiator (Irgacure 907 (trade name), manufactured by Ciba-Geigy Co.), 0.557 g of a photosensitizer (Kayacure DETX (trade name), manufactured by Nippon Kayaku Co., Ltd.), 76.0 g of methyl ethyl ketone were added and stirred. The thus-prepared mixture was filtrated through a 0.4 μm mesh polypropylene filter, to prepare a coating solution for high-refractive-index layer.
(Preparation of Coating Solution for Low-refractive-index Layer)

To 500 g of a methanol dispersion solution of a commercially available short fibrous fine silica particles (MA-ST-UP (trade name), 20 wt % density, manufactured by Nissan Chemical Industries, Ltd.), 5.0 g of a silane coupling agent (KBM-503 (trade name), manufactured by Shin-Etsu Chemical Co., Ltd.) and 5.0 g of 0.1 N hydrochloric acid were added and stirred at a room temperature for 5 hours, and then stored at a room temperature for 5 days. Thus, a methanol dispersion solution of short fibrous fine silica particles subjected to silane coupling agent treatment, was obtained.

To 138.1 g of the methanol dispersion solution of short fibrous fine silica particles subjected to silane coupling agent treatment, 13.35 g of dipentaerythritol hexaacrylate (DPHA (trade name), manufactured by Nippon Kayaku Co., Ltd.), 0.534 g of a photopolymerization initiator (Irgacure 907 (trade name), manufactured by Ciba-Geigy Co.), 0.267 g of a photosensitizer (Kayacure DETX (trade name), manufactured by Nippon Kayaku Co., Ltd.), 300 g of methyl isobutyl ketone, and 300 g of 2-butanol were added and stirred. The thus-prepared mixture was filtrated through a 0.4 µm mesh polypropylene filter to prepare a coating solution for low-refractive-index layer.

(Preparation of Coating Solution for Over Coat Layer)

A thermal crosslinking fluorine-containing polymer (JN-7214 (trade name), manufactured by, JSR Co., Ltd.) was refined to remove low-molecular-weight ingredients thereof. The molecular weight of the thus-refined fluorine-containing polymer was a number-average molecular weight of 50,000 and a weight-average molecular weight of 70,000.

To 50.0 g of a solution of the refined fluorine-containing polymer (density of solid content: 6% by weight, methyl isobutyl ketone solution), 110.6 g of methyl isobutyl ketone and 39.4 g of cyclohexanone were added and stirred. The resultant mixture was filtrated through a 0.4 µm mesh polypropylene filter, to prepare a coating solution for over coat layer.

(Production of Anti-reflection Film)

The anti-reflection film was prepared under the environmental conditions, in which the number of dusts having a size of 0.3 µm or more is 3 or less per $m^3$ of air.

The above-described coating solution for high-refractive-index layer was coated on a triacetyl cellulose film having 80 µm thickness (TAC-TD80U (trade name), manufactured by Fuji Photo Film Co. Ltd.), with a bar coater. After being dried at 90° C., the coated layer was irradiated with ultraviolet radiation to harden it. Thus, a high-refractive-index layer (refractive index 1.59, thickness; 4 µm) was formed.

The above-described coating solution for low-refractive-index layer was applied on the high-refractive-index layer, with a bar coater, and the coated layer was dried at 60° C., and irradiated with ultraviolet radiation for hardening, to form a low-refractive-index layer (refractive index 1.40, thickness; 75 nm). The void ratio in the low-refractive-index layer was 17.4%.

The above-described coating solution for over coat layer was coated on the low-refractive-index layer, with a bar coater, so that a coating amount becomes 35 mg/$m^2$ in terms of the solid content, and heated at 120° C. for 10 minutes to form an over coat layer. Thus, an anti-reflection film was produced.

(Evaluation of Anti-reflection Film)

The thus-produced anti-reflection film was evaluated in the same manner as in Example 2-1, with respect to pointing defect, average reflectance, refractive index of low-refractive-index layer, void ratio in low-refractive-index layer, and pencil hardness. In addition to these, the following evaluations were carried out. The results are shown in Table 4.

(1) Evaluation of Occupation Ratio of Voids in the Low-refractive-index Layer, Owing to Over Coat Layer Materials Based on the shapes of spectral curves of spectral reflectance before and after coating the over coat layer, the variation of refraction before and after the coating was estimated, to measure an occupation ratio of voids in the low-refractive-index layer, owing to over coat layer materials (2) Evaluation of Wiping Easiness of Fingerprint Fingerprints were attached on the surface of an anti-reflection film. Then, a state at the time when they were wiped with a cleaning cloth was observed and evaluated according to the following three grades.

A: Fingerprints were completely wiped off.

B: Part of fingerprints were left without being wiped off.

C: Substantially all fingerprints were left without being wiped off.

(3) Evaluation of Wiping Easiness of Marking-pen-ink

An oil-based ink of a marking pen (ZEBRA macky (trade name), red) was attached on the surface of an anti-reflection film, and left for 30 minutes. Thereafter, a state at the time when the ink was wiped with a cleaning cloth, was observed and evaluated according to the following three grades.

A: Marking-pen-ink was completely wiped off.

B: Part of marking-pen-ink was left without being wiped off.

C: Substantially all marking-pen-ink was left without being wiped off.

(4) Evaluation of Coefficient of Dynamic Friction

The coefficient of dynamic friction was evaluated as an indication of the sliding property of the surface of an anti-reflection film. The dynamic friction was measured, after the anti-reflection film was subjected to humidification of a temperature of 25° C. and a relative humidity of 60% for 2 hours, by means of a dynamic friction meter (HEIDON-14) using a stainless steel ball having a diameter of 5 mm, under a load of 100 g, at a rate of 60 cm/min.

(5) Evaluation of Steel Wool Scratch-resistance

0000 steel wool under a loading condition of 500 g/cm was reciprocated 50 times. A state of scratch occurred after the treatment was observed and evaluated according to the following three grades.

A: There was caused no scratch

B: There were caused miner scratches, but they are hardly seen.

C: There were caused scratches remarkably

Comparative Examples 2-3

(Preparation of Coating Solution for Low-refractive-index Layer)

TABLE 4

| | Point defect (number/$m^2$) | Average reflectance (%) | Occupation ratio of over coat layer material (% by volume) | Dynamic friction coefficient | Pencil hardness | Steel wool scratch-resistance | Easiness of fingerprint to be wiped off | Easiness of magic ink to be wiped off |
|---|---|---|---|---|---|---|---|---|
| Example 2-3 | 0 | 1.88 | 42.8 | 0.09 | 3 H | A | A | A |
| Comparative Example 2-3 | 155 | 1.89 | 51.3 | 0.09 | 3 H | A | A | A |
| Example 2-4 | 0 | 2.10 | 48.4 | 0.09 | 3 H | A | A | A |
| Example 2-5 | 0 | 3.75 | 28.2 | 0.10 | H | B | A | A |
| Example 2-6 | 0 | 1.90 | 42.2 | 0.08 | 3 H | A | A | A |

To 500 g of a methanol dispersion solution of a commercially available spherical fine silica particles (methanol silica sol, concentration: 30% by weight, manufactured by Nissan Chemical Industries, Ltd.), 7.5 g of a silane coupling agent (KBM-503 (trade name), manufactured by Shin-Etsu Chemical Co., Ltd.), 5.0 g of 0.1 N hydrochloric acid were added and stirred at a room temperature for 5 hours, and then stored at a room temperature for 5 days. Thus, a methanol dispersion solution of spherical fine silica particles subjected to silane coupling agent treatment, was prepared.

To 121.0 g of the methanol dispersion solution of spherical fine silica particles subjected to silane coupling agent treatment, 7.43 g of dipentaerythritol hexaacrylate (DPHA (trade name), manufactured by Nippon Kayaku Co., Ltd.), 0.297 g of a photopolymerization initiator (Irgacure 907 (trade name), manufactured by Ciba-Geigy Co.), 0.149 g of a photosensitizer (Kayacure DETX (trade name), manufactured by Nippon Kayaku Co., Ltd.), 300 g of methyl isobutyl ketone, and 300 g of 2-butanol were added and stirred. The thus-prepared mixture was filtrated through a 0.4 μm mesh polypropylene filter, to prepare a coating solution for low-refractive-index layer.

(Production of Anti-reflection Film)

The anti-reflection film was prepared under the environmental conditions, in which the number of dusts having a size of 0.3 μm or more is 3 or less per $m^3$ of air.

The above-described coating solution for low-refractive-index layer was applied on the high-refractive-index layer prepared in Example 2-3, with a bar coater. After being dried at 60° C., the coated layer was irradiated with ultraviolet radiation for hardening, to form a low-refractive-index layer (refractive index; 1.40, thickness; 75 nm). The void ratio in the low-refractive-index layer was 16.1% by volume.

The coating solution for over coat layer prepared in Example 2-3 was coated on the low-refractive-index layer, with a bar coater, so that a coating amount becomes 35 mg/m in terms of the solid content, and heated at 120° C. for 10 minutes, to form an over coat layer. Thus, an anti-reflection film was produced.

(Evaluation of Anti-reflection Film)

The thus-produced anti-reflection film was subjected to the same evaluation as in Example 2-3. The results are shown in Table 4.

Example 2-4

(Production of Anti-reflection Film)

The anti-reflection film was prepared under the environmental conditions, in which the number of dusts having a size of 0.3 μm or more is 3 or less per $m^3$ of air.

The coating solution for low-refractive-index layer prepared in Example 2-2 was applied on the high-refractive-index layer prepared in Example 2-3, with a bar coater, dried at 60° C., and irradiated with ultraviolet radiation for hardening, to form a low-refractive-index layer (refractive index; 1.42, thickness; 75 nm). The ratio of voids in the low-refractive-index layer was 15.0% by volume.

The coating solution for over coat layer prepared in Example 2-3 was coated on the low-refractive-index layer, with a bar coater, so that a coating amount becomes 35 mg/$m^2$ in terms of the solid content, and heated at 120° C. for 10 minutes, to form an over coat layer. Thus, an anti-reflection film was produced.

(Evaluation of Anti-reflection Film)

The thus-produced anti-reflection film was subjected to the same evaluation as in Example 2-3. The results are shown in Table 4.

Example 2-5

(Preparation of Dispersion Solution of Short Fibrous Inorganic Fine Particles)

A mixture of 30 parts by weight of a commercially available short fibrous tin oxide powder (FS-10P (trade name), manufactured by Ishihara Sangyo Kaisha, Ltd.), 5 parts by weight of gelatin, and 65 parts by weight of pure water were dispersed by a sandgrinder mill, to prepare an aqueous dispersion solution of needle-like tin oxide.

(Preparation of Coating Solution for Low-refractive-index Layer)

To 50 g of the above-described dispersion solution of needle-like tin oxide, 50 g of pure water, 2.5 g of formalin aqueous solution (concentration 5% by weight), 150 g of ethanol, and 150 g of diacetone alcohol were added and stirred. The resultant mixture was filtrated through a 0.4 μm mesh polypropylene filter to prepare a coating solution for low-refractive-index layer.

(Production of Anti-reflection Film)

The anti-reflection film was prepared under the environmental conditions, where the number of dusts having a size of 0.3 μm or more is 3 or less per $m^3$ of air.

The above-described coating solution for low-refractive-index layer was applied on the high-refractive-index layer prepared in Example 2-3, with a bar coater. After being dried at 60° C., the coated layer was irradiated with ultraviolet radiation for hardening, to form a low-refractive-index layer (refractive index; 1.50, thickness; 75 nm). The void ratio in the low-refractive-index layer was 36.1% by volume.

The above-described coating solution for over coat layer was coated on the low-refractive-index layer, with a bar coater, so that a coating amount becomes 35 mg/$m^2$ in terms of the solid content, and heated at 120° C. for 10 minutes to form an over coat layer. Thus, an anti-reflection film was produced.

(Evaluation of Anti-reflection Film)

The thus-produced anti-reflection film was subjected to the same evaluation as in Example 2-3. The results are shown in Table 4.

Example 2-6

(Preparation of Dispersion Solution of Inorganic Fine Particles for High-refractive-index Layer)

20 parts by weight of ITO (tin-containing indium oxide, specific surface area: 40 $m^2$/g, powder specific resistance: 1 Ω·cm), 6 parts by weight of a commercially available anionic monomer (PM-21 (trade name), manufactured by Nippon Kayaku Co., Ltd.) and 74 parts by weight of cyclohexanone were dispersed by means of a sandgrinder mill, to prepare a dispersion solution of ITO having the weight-mean size of 35 nm.

(Preparation of Coating Solution for High-refractive-index Layer)

To the above-described dispersion solution of ITO, 31.1 g of dipentaerythritol hexaacrylate (DPHA (trade name), manufactured by Nippon Kayaku Co., Ltd.), 1.670 g of a photopolymerization initiator (Irgacure 907 (trade name), manufactured by Ciba-Geigy Co.), 0.557 g of a photosensitizer (Kayacure DETX (trade name), manufactured by Nippon Kayaku Co., Ltd.), 76.0 g of methyl ethyl ketone were added and stirred. The thus-prepared mixture was filtrated through a 0.4 μm mesh polypropylene filter, to prepare a coating solution for high-refractive-index layer.

(Production of Anti-reflection Film)

The anti-reflection film was prepared under the environmental conditions, in which the number of dusts having a size of 0.3 μm or more is 3 or less per $m^3$ of air.

The above-described coating solution for high-refractive-index layer was coated on a triacetyl cellulose film having 80 μm thickness (TAC-TD80U (trade name), manufactured by Fuji Photo Film Co. Ltd.), with a bar coater. After being dried at 90° C., the coated layer was irradiated with ultraviolet radiation for hardening. Thus, a high-refractive-index layer (refractive index; 1.59, thickness; 4 μm) was formed.

The coating solution for low-refractive-index layer prepared in Example 2-3 was applied on the high-refractiveindex layer, with a bar coater, dried at 60° C., and irradiated with ultraviolet radiation for hardening, to form a low-refractive-index layer (refractive index; 1.40, thickness; 75 nm). The void ratio in the low-refractive-index layer was 17.2% by volume.

The coating solution for over coat layer prepared in Example 2-3 was coated on the low-refractive-index layer, with a bar coater, so that a coating amount becomes 35 mg/m$^2$ in terms of the solid content, and heated at 120° C. for 10 minutes to form an over coat layer. Thus, an anti-reflection film was produced.

(Evaluation of Anti-reflection Film)

The thus-produced anti-reflection film was subjected to the same evaluation as in Example 2-3. The results are shown in Table 4.

Example 2-7

(Preparation of Dispersion Solution of Inorganic Fine Particles for High-refractive-index Layer)

30.0 parts by weight of titanium dioxide (weight-average size of primary particles: 30 nm), 4.5 parts by weight of a commercially available anionic monomer (PM-21 (trade name), manufactured by Nippon Kayaku Co., Ltd.), 0.3 parts by weight of a commercially available cationic monomer (DMAEA (trade name), manufactured by Kohjin Co., Ltd.) and 65.2 parts by weight of cyclohexanone were dispersed by means of a sandgrinder mill, to prepare a dispersion solution of titanium dioxide having the weight-mean diameter of 53 nm.

(Preparation of Coating Solution for High-refractive-index Layer)

To 15.0 g of the above-described dispersion solution of titanium dioxide, 4.44 g of dipentaerythritol hexaacrylate (DPHA, manufactured by Nippon Kayaku Co., Ltd.), 0.232 g of a photopolymerization initiator (Irgacure 907 (trade name), manufactured by Ciba-Geigy Co.), 0.078 g of a photosensitizer (Kayacure DETX (trade name), manufactured by Nippon Kayaku Co., Ltd.), 350 g of methyl ethyl ketone, and 350 g of cyclohexanone were added and stirred. The thus-prepared mixture was filtrated through a 0.4 μm mesh polypropylene filter, to prepare a coating solution for high-refractive-index layer.

(Preparation of Coating Solution for Over Coat Layer)

To 50.0 g of a thermal cross-linking fluorine-containing polymer (TN-020C (trade name), density of solid content: 6% by weight, methyl isobutyl ketone solution, manufactured by JSR Co., Ltd.), 110.6 g of methyl isobutyl ketone, and 39.4 g of cyclohexanone were added and stirred. The thus-prepared mixture was filtrated through a 0.4 μm mesh polypropylene filter to prepare a coating solution for over coat layer.

(Production of Anti-reflection Film)

The anti-reflection film was prepared under the environmental conditions, in which the number of dusts having a size of 0.3 μm or more is 3 or less per m$^3$ of air.

The above-described coating solution for high-refractive-index layer was coated on the hard coat layer prepared in Example 2-1, with a bar coater. After being dried at 60° C., the coated layer was irradiated with ultraviolet radiation for hardening. Thus, a high-refractive-index layer (refractive index; 1.75, film thickness; 60 nm) was formed.

The above-described coating solution for low-refractive-index layer prepared in Example 2-3 was applied on the high-refractive-index layer, with a bar coater, dried at 60° C., and irradiated with ultraviolet radiation for hardening, to form a low-refractive-index layer (refractive index; 1.40, thickness; 80 nm). The void ratio in the low-refractive-index layer was 17.2% by volume.

The above-described coating solution for over coat layer was coated on the low-refractive-index layer, with a bar coater, so that a coating amount becomes 35 mg/m$^2$ in terms of the solid content, and heated at 120° C. for 10 minutes, to form an over coating layer. Thus, an anti-reflection film was produced.

(Evaluation of Anti-reflection Film)

The thus-produced anti-reflection film was subjected to the same evaluation as in Example 2-3. The results are shown in Table 5.

TABLE 5

| | Point defect (number/m$^2$) | Average reflectance (%) | Occupation ratio of over coat layer material (% by volume) | Dynamic friction coefficient | Pencil hardness | Steel wool scratch-resistance | Easiness of fingerprint to be wiped off | Easiness of marking-pen-ink to be wiped off |
|---|---|---|---|---|---|---|---|---|
| Example 2-7 | 0 | 0.82 | 43.2 | 0.08 | 3 H | A | A | A |
| Comparative Example 2-4 | 205 | 0.83 | 51.0 | 0.09 | 3 H | A | A | A |
| Example 2-8 | 0 | 0.85 | 45.2 | 0.10 | 3 H | A | A | A |
| Example 2-9 | 0 | 0.87 | 46.3 | 0.20 | 3 H | A | A | A |
| Example 2-10 | 0 | 0.76 | 17.0 | 0.35 | 2 H | B | B | A |

Comparative Example 2-4

(Production of Anti-reflection Film)

The anti-reflection film was prepared under the environmental conditions, in which the number of dusts having a size of 0.3 μm or more is 3 or less per m$^3$ of air.

The coating solution for low-refractive-index layer prepared in Comparative Example 2-3 was coated on the high-refractive-index layer prepared in Example 2-7, with a bar coater. After being dried at 60° C., the coated layer was irradiated with ultraviolet radiation for hardening, to form a low-refractive-index layer (refractive index 1.40; thickness; 80 nm). The void ratio in the low-refractive-index layer was 16.3% by volume.

The coating solution for over coat layer prepared in Example 2-7 was coated on the low-refractive-index layer, with a bar coater, so that a coating amount becomes 35 mg/m in terms of the solid content, and heated at 120° C. for 10 minutes, to form an over coat layer. Thus, an anti-reflection film was produced.

(Evaluation of Anti-reflection Film)

The thus-produced anti-reflection film was subjected to the same evaluation as in Example 2-3. The results are shown in Table 5.

Example 2-8

(Preparation of Coating Solution for Over Coat Layer)

To 50.0 g of an ultraviolet cross-linking fluorine-containing polymer (TN-011 (trade name), density of solid content: 6% by weight, methyl isobutyl ketone solution, manufactured by JSR Co., Ltd.), 110.6 g of methyl isobutyl ketone, and 39.4 g of cyclohexanone were added and stirred. The thus-prepared mixture was filtrated through a 0.4 μm mesh polypropylene filter, to prepare a coating solution for over coat layer.

(Production of Anti-reflection Film)

The anti-reflection film was prepared under the environmental conditions, in which the number of dusts having a size of 0.3 μm or more is 3 or less per m$^3$ of air.

The above-described coating solution for over coat layer was coated on the low-refractive-index layer prepared in Example 2-7, with a bar coater, so that a coating amount becomes 35 mg/m$^2$ in terms of the solid content. After being dried at 60° C., the coated layer was hardened by irradiation with ultraviolet radiation, to form an over coating layer. Thus, an anti-reflection film was produced.

(Evaluation of Anti-reflection Film)

The thus-produced anti-reflection film was subjected to the same evaluation as in Example 2-3. The results are shown in Table 5.

Example 2-9

(Preparation of Coating Solution for Over Coat Layer)

To 3.0 g of a commercially available fluorine-containing polymer having the weight-average molecular weight of 200,000 (SAITOP CTX-809A (trade name), manufactured by Asahi Glass Co., Ltd.), 197.0 g of a commercially available fluorine-based solvent (FRORINATO FC77 (trade name), manufactured by Sumitomo 3M Ltd.), was added and stirred. The thus-prepared mixture was filtrated through a 0.4 μm mesh polypropylene filter, to prepare a coating solution for over coating layer.

(Production of Anti-reflection Film)

The anti-reflection film was prepared under the environmental conditions, in which the number of dusts having a size of 0.3 μm or more is 3 or less per m$^3$ of air.

The above-described coating solution for over coat layer was coated on the low-refractive-index layer prepared in Example 2-7, with a bar coater, so that a coating amount becomes 35 mg/m$^2$ in terms of the solid content, and heated at 120° C. for 10 minute, to form an over coating layer. Thus, an anti-reflection film was produced.

(Evaluation of Anti-reflection Film)

The thus-produced anti-reflection film was subjected to the same evaluation as in Example 2-3. The results are shown in Table 5.

Example 2-10

(Preparation of Coating Solution for Over Coat Layer)

To 1.0 g of a fluorine-containing silane coupling agent (KP-801M (trade name), manufactured by Shin-Etsu Chemical Co., Ltd.), 330 g of a commercially available fluorine-based solvent (FRORINATO FC77 (trade name), manufactured by Sumitomo 3M Ltd.) was added and stirred. The thus-prepared mixture was filtrated through a 0.4 μm mesh polypropylene filter, to prepare a coating solution for over coat layer.

(Production of Anti-reflection Film)

The anti-reflection film was prepared under the environmental conditions, in which the number of dusts having a size of 0.3 μm or more is 3 or less per m$^3$ of air.

The coating solution for low-refractive-index layer prepared in Example 2-3 was coated on the high-refractive-index layer prepared in Example 2-7, with a bar coater. After dried at 60° C., the coated layer was irradiated with ultraviolet radiation for hardening, to form a low-refractive-index layer (refractive index 1.40, thickness; 100 nm). The void ratio in the low-refractive-index layer was 17.1% by volume.

The above-described coating solution for over coat layer was coated on the low-refractive-index layer, with a bar coater, so that a coating amount becomes 5 mg/m$^2$ in terms of the solid content, and heated at 120° C. for 30 minutes, to form an over coat layer. Thus, an anti-reflection film was produced.

(Evaluation of Anti-reflection Film)

The thus-produced anti-reflection film was subjected to the same evaluation as in Example 2-3. The results are shown in Table 5.

Example 2-11

(Preparation of Coating Solution for Middle-refractive-index Layer)

To 49.60 g of the dispersion solution of titanium dioxide prepared in Example 2-7, 18.08 g of dipentaerythritol hexaacrylate (DPHA, manufactured by Nippon Kayaku Co., Ltd.), 0.920 g of a photopolymerization initiator (Irgacure 907 (trade name), manufactured by Ciba-Geigy Co.), 0.307 g of a photosensitizer (Kayacure DETX (trade name), manufactured by Nippon Kayaku Co., Ltd.), 230.0 g of methyl ethyl ketone, and 500 g of cyclohexanone were added and stirred. The thus-prepared mixture was filtrated through a 0.4 μm mesh polypropylene filter, to prepare a coating solution for middle-refractive-index layer.

(Preparation of Coating Solution for High-refractive-index Layer)

To 110.0 g of the dispersion solution of titanium dioxide prepared in Example 2-7, 6.29 g of dipentaerythritol hexaacrylate (DPHA, manufactured by Nippon Kayaku Co., Ltd.), 0.520 g of a photopolymerization initiator (Irgacure 907 (trade name), manufactured by Ciba-Geigy Co.), 0.173 g of a photosensitizer (Kayacure DETX (trade name), manufactured by Nippon Kayaku Co., Ltd.), 230.0 g of methyl ethyl ketone, and 460.0 g of cyclohexanone were added and stirred. The thus-prepared mixture was filtrated through a 0.4 μm mesh polypropylene filter, to prepare a coating solution for high-refractive-index layer.

(Production of Anti-reflection Film)

The anti-reflection film was prepared under the environmental conditions, in which the number of dusts having a size of 0.3 μm or more is 3 or less per m$^3$ of air.

The above-described coating solution for middle-refractive-index layer was coated on the hard coat layer prepared in Example 2-1, with a bar coater, dried at 60° C., and irradiated with ultraviolet radiation for hardening, to form a middle-refractive-index layer (refractive index; 1.70, film thickness; 70 nm).

The above-described coating solution for high-refractive-index layer was coated on the middle-refractive-index layer, with a bar coater, dried at 60° C., and irradiated with ultraviolet radiation for hardening, to form a high-refractive-index layer (refractive index; 1.95, film thickness; 50 nm).

The coating solution for low-refractive-index layer prepared in Example 2-3 was coated on the high-refractive-index layer, with a bar coater, dried at 60° C., and irradiated with ultraviolet radiation for hardening, to form a low-refractive-index layer (refractive index; 1.40, thickness; 75 nm). The void ratio in the low-refractive-index layer was 17.2% by volume.

The coating solution for over coat layer prepared in Example 2-7 was coated on the low-refractive-index layer, with a bar coater, so that a coating amount becomes 35 mg/m$^2$ in terms of the solid content, and heated at 120° C. for 10 minutes to form an over coat layer. Thus, an anti-reflection film was produced.

(Evaluation of Anti-reflection Film)

The thus-produced anti-reflection film was subjected to the same evaluation as in Example 2-3. The results are shown in Table 6.

TABLE 6

|  | Point defect (number/m$^2$) | Average reflectance (%) | Occupation ratio of over coat layer material (% by volume) | Dynamic friction coefficient | Pencil hardness | Steel wool scratch-resistance | Easiness of fingerprint to be wiped off | Easiness of marking-pen-ink to be wiped off |
|---|---|---|---|---|---|---|---|---|
| Example 2-11 | 0 | 0.51 | 43.6 | 0.09 | 3 H | A | A | A |
| Comparative example 2-5 | 196 | 0.53 | 51.3 | 0.09 | 3 H | A | A | A |
| Example 2-12 | 0 | 0.65 | 100 | 0.09 | 3 H | A | A | A |
| Example 2-13 | 0 | 0.59 | 48.4 | 0.08 | 3 H | A | A | A |
| Example 2-14 | 0 | 0.52 | 42.3 | 0.09 | 3 H | A | A | A |
| Example 2-15 | 0 | 0.53 | 43.8 | 0.10 | 3 H | A | A | A |
| Example 2-16 | 0 | 0.51 | 46.5 | 0.20 | 3 H | A | A | A |

Comparative Example 2-5
(Production of Anti-reflection Film)

The anti-reflection film was prepared under the environmental conditions that the number of dusts having a size of 0.3 μm or more is 3 or less per m$^3$ of air.

The coating solution for low-refractive-index layer prepared in Comparative Example 2-3 was coated on the high-refractive-index layer prepared in Example 2-11, with a bar coater. After being dried at 60° C., the coated layer was irradiated with ultraviolet radiation for hardening, to form a low-refractive-index layer (refractive index 1.40, thickness; 75 nm). The void ratio in the low-refractive-index layer was 16.4% by volume.

The coating solution for over coat layer prepared in Example 2-7 was coated on the low-refractive-index layer, with a bar coater, so that a coating amount becomes 35 mg/m$^2$ in terms of the solid content, and heated at 120° C. for 10 minutes, to form an over coat layer. Thus, an anti-reflection film was produced.
(Evaluation of Anti-reflection Film)

The thus-produced anti-reflection film was subjected to the same evaluation as in Example 2-3. The results are shown in Table 6.

Example 2-12
(Preparation of Coating Solution for Over Coat Layer)

To 50.0 g of a thermally crosslinking fluorine-containing polymer (JN-7214 (trade name), density of solid content: 6% by weight, methyl isobutyl ketone solution, manufactured by JSR Co., Ltd.), 110.6 g of methyl isobutyl ketone, and 39.4 g of cyclohexanone were added and stirred. The thus-prepared mixture was filtrated through a 0.4 μm mesh polypropylene filter, to prepare a coating solution for over coat layer.
(Production of Anti-reflection Film)

The anti-reflection film was prepared under the environmental conditions, in which the number of dusts having a size of 0.3 μm or more is 3 or less per m$^3$ of air.

The above-described coating solution for over coat layer was coated on the low-refractive-index layer prepared in Example 2-11, with a bar coater, so that a coating amount becomes 35 mg/m$^2$ in terms of the solid content, and heated at 120° C., for 10 minutes, to form an over coat layer. Thus, an anti-reflection film was produced.
(Evaluation of Anti-reflection Film)

The thus-produced anti-reflection film was subjected to the same evaluation as in Example 2-3. The results are shown in Table 6.

Example 2-13
(Production of Anti-reflection Film)

The anti-reflection film was prepared under the environmental conditions, in which the number of dusts having a size of 0.3 μm or more is 3 or less per m$^3$ of air.

The coating solution for low-refractive-index layer prepared in Example 2-2 was coated on the high-refractive-index layer prepared in Example 2-11, with a bar coater, dried at 60° C., and irradiated with ultraviolet radiation for hardening, to form a low-refractive-index layer (refractive index; 1.42, thickness; 75 nm). The void ratio in the low-refractive-index layer was 15.2% by volume.

The coating solution for over coat layer prepared in Example 2-7 was coated on the low-refractive-index layer, with a bar coater, so that a coating amount becomes 35 mg/m$^2$ in terms of the solid content, and heated at 120° C. for 10 minutes, to form an over coat layer. Thus, an anti-reflection film was produced.
(Evaluation of Anti-reflection Film)

The thus-produced anti-reflection film was subjected to the same evaluation as in Example 2-3. The results are shown in Table 6.

Example 2-14
(Production of Anti-reflection Film)

The anti-reflection film was prepared under the environmental conditions, in which the number of dusts having a size of 0.3 μm or more is 3 or less per m$^3$ of air.

The coating solution for over coat layer prepared in Example 2-8 was coated on the low-refractive-index layer prepared in Example 2-11, with a bar coater, so that a coating amount becomes 35 mg/m$^2$ in terms of the solid content. After being dried at 60° C., the coated layer was irradiated with ultraviolet radiation for hardening, to form an over coat layer. Thus, an anti-reflection film was produced.
(Evaluation of Anti-reflection Film)

The thus-produced anti-reflection film was subjected to the same evaluation as in Example 2-3. The results are shown in Table 6.

Example 2-15
(Preparation of Coating Solution for Over Coat Layer)

The following fluorine-containing polymer was synthesized.

Fluorine-containing Polymer

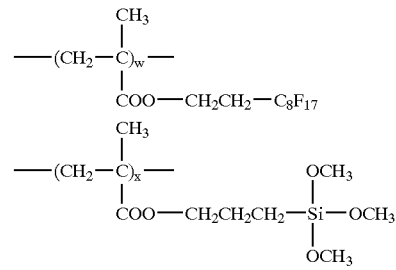

-continued

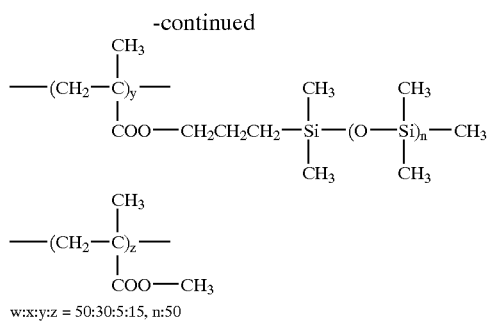

w:x:y:z = 50:30:5:15, n:50

The molecular weight of the fluorine-containing polymers was a number-average molecular weight of 25,000 and a weight-average molecular weight of 40,000.

To 3.0 g of fluorine-containing polymer powder, 157.6 g of methyl isobutyl ketone, and 39.4 g of cyclohexanone were added and stirred. The thus-prepared mixture was filtrated through a 0.4 μm mesh polypropylene filter, to prepare a coating solution for over coat layer.
(Production of Anti-reflection Film)

The anti-reflection film was prepared under the environmental conditions, in which the number of dusts having a size of 0.3 μm or more is 3 or less per m³ of air.

The above-described coating solution for over coat layer was coated on the low-refractive-index layer prepared in Example 2-11, with a bar coater, so that a coating amount becomes 35 mg/m² in terms of the solid content, and heated at 120° C. for 10 minutes, to form an over coating layer. Thus, an anti-reflection film was produced.
(Evaluation of Anti-reflection Film)

The thus-produced anti-reflection film was subjected to the same evaluation as in Example 2-3. The results are shown in Table 6.

Example 2-16
(Production of Anti-reflection Film)

The anti-reflection film was prepared under the environmental conditions, in which the number of dusts having a size of 0.3 μm or more is 3 or less per m³ of air.

The coating solution for over coat layer prepared in Example 2-9 was coated on the low-refractive-index layer prepared in Example 2-11, with a bar coater, so that a coating amount becomes 35 mg/m² in terms of the solid content, and heated at 120° C. for 10 minutes, to form an over coat layer. Thus, an anti-reflection film was produced.
(Evaluation of Anti-reflection Film)

The thus-produced anti-reflection film was subjected to the same evaluation as in Example 2-3. The results are shown in Table 6.

Examples Related to Embodiment 3
(Preparation of a Coating Solution for a Hard Coat Layer)

250 g of a mixture of dipentaerythritol pentaacrylate and dipentaerythritol hexaacrylate (DPHA (trade name), made by Nippon Kayaku Co., Ltd.) was dissolved in 439 g of a mixture solvent of methyl ethyl ketone and cyclohexanone (50/50 by weight %). To the resultant solution was added a solution wherein 7.5 g of a photopolymerization initiator (Irgacure 907 (trade name), made by Chiba Geigy Co.) and 5.0 g of a photosensitizer (Kayacure DETX (trade name), made by Nippon Kayaku Co., Ltd.) were dissolved in 49 g of methyl ethyl ketone. When this solution was applied and hardened by ultraviolet rays to obtain a film, the refractive index thereof was 1.53.

This solution was filtrated with a filter made of polypropylene and having pores of 30 μm in diameter, to prepare a coating solution for a hard coat layer.

(Preparation of a Titanium Dioxide Fine Particle Dispersion)

The following were dispersed in a sand grinder mill to prepare a dispersion of titanium dioxide: 30.0 parts by weight of titanium dioxide (weight-average particle size of primary particles: 50 nm, and refractive index: 2.70); 4.5 parts by weight of an anionic diacrylate monomer (trade name; PM21, made by Nippon Kayaku Co., Ltd.); 0.3 part by weight of a cationic methacrylate monomer (DMAEA (trade name), made by Kohjin Co., Ltd.); and 65.2 parts by weight of methyl ethyl hexanone.
(Preparation of a Coating Solution for a Middle-refractive-index Layer)

The following were dissolved in 151.9 g of cyclohexanone and 37.0 g of methyl ethyl ketone: 0.14 g of a photopolymerization initiator (Irgacure 907 (trade name), made by Chiba Geigy Co.) and 0.04 g of a photosensitizer (Kayacure DETX (trade name), made by Nippon Kayaku Co., Ltd.). Further, to this solution were added 6.1 g of the above-mentioned titanium dioxide dispersion and 2.4 g of a mixture of dipentaerythritol pentaacrylate and dipentaerythritol hexaacrylate (DPHA (trade name), made by Nippon Kayaku Co., Ltd.), and then the resultant was stirred at room temperature for 30 minutes. The mixture was filtrated with a filter made of polypropylene and having pores of 1 μm in diameter, to prepare a coating solution for a middle-refractive-index layer.
(Preparation of a Coating Solution for a High-refractive-index Layer)

The following were dissolved in 1152.8 g of cyclohexanone and 37.2 g of methyl ethyl ketone: 0.06 g of a photopolymerization initiator (Irgacure 907 (trade name), made by Chiba Geigy Co.) and 0.02 g of a photosensitizer (Kayacure DETX (trade name), made by Nippon Kayaku Co., Ltd.). Further, to this solution were added 13.13 g of the above-mentioned titanium dioxide dispersion and 0.76 g of a mixture of dipentaerythritol pentaacrylate and dipentaerythritol hexaacrylate (DPHA (trade name), made by Nippon Kayaku Co., Ltd.), and then the resultant was stirred at room temperature for 30 minutes. Thereafter, the mixture was filtrated with a filter, which was made of polypropylene and had pores of 1 μm in diameter, to prepare a coating solution for a high-refractive-index layer.
(Preparation of a Coating Solution for a Low-refractive-index Layer)

To 200 g of a methanol dispersion solution of silica fine particles (R507 (trade name), made by Nissan Chemical industries, Ltd.) were added 10 g of a silane coupling agent (KBN-803 (trade name), made by Shin-Etsu Silicone Co., Ltd.) and 2 g of 0.1 N hydrochloric acid, and then the resultant mixture was stirred at room temperature for 5 hours. The mixture was allowed to stand at room temperature for 4 days to prepare a dispersion of silica fine particles treated with the silane coupling agent.

To 149 g of the silica fine particle dispersion were added 789 g of isopropyl alcohol and 450 g of methanol. To this solution was added a solution wherein 3.21 g of a photopolymerization initiator (Irgacure 907 (trade name), made by Chiba Geigy Co.) and 1.605 g of a photosensitizer (Kayacure DETX (trade name), made by Nippon Kayaku Co., Ltd.) were dissolved in 31.62 g of isopropyl alcohol, and further to this solution was added a solution wherein 2.17 g of a mixture of dipentaerythritol pentaacrylate and dipentaerythritol hexaacrylate (DPHA (trade name), made by Nippon Kayaku Co., Ltd.) were dissolved in 78.13 g of isopropyl alcohol. The mixture was stirred at room temperature for 20 minutes, and was then filtered with a filter with 1 μm mesh, to prepare a coating solution for a low-refractive-index layer.
(Preparation of a Coating Solution for an Over Coat Layer A)

Methyl isobutyl ketone was added to a solution of a thermally crosslinking fluorine-containing polymer (JN- 7219 (trade name), made by JSR Co., Ltd.) to make the concentration of the polymer to 1.0% by weight. The solution was filtered with 1 μm mesh to prepare a coating solution for an over coat layer A.

(Preparation of a Coating Solution for an Over Coat Layer B)

Low molecular weight components were removed from the solution of the thermally crosslinking fluorine-containing polymer (JN-7219 (trade name), made by JSR Co., Ltd.). The weight-average molecular weight of the resultant fluorine-containing polymer was 70,000.

Methyl isobutyl ketone was added to this fluorine-containing polymer to make the concentration of the polymer to 1.0% by weight. This solution was filtered with 1 μm mesh to prepare a coating solution for an over coat layer B.

(Preparation of a Coating Solution for an Alignment Layer)

To 30 g of a linear alkyl-modified polyvinyl alcohol (MP-203 (trade name), manufactured by Kuraray Co.) were added 130 g of water and 40 g of methanol. The mixture was stirred for dissolving the resin, and then filtered through a filter made of polypropylene having a pore diameter of 30 μm, to prepare a coating solution for an alignment layer.

(Preparation of a Coating Solution for an Optical Anisotropic Layer A)

In 3.65 g of methyl ethyl ketone were dissolved 1.6 g of the aforesaid Compound No. TE-8 (R: (8), m=4) as a liquid crystalline discotic compound, 0.4 g of phenoxydiethyleneglycol acrylate (M-101 (trade name), manufactured by Toagosei Co., Ltd.), 0.05 g of cellulose acetate butyrate (CAB531-1 (trade name), manufactured by Eastman Chemical Inc.) and 0.01 g of a photopolymerization initiator (Irgacure 907 (trade name), manufactured by Ciba-Geigy Co.). The resultant solution was filtered through a filter, which was made of polypropylene and had a pore diameter of 1 μm, to prepare a coating solution for an optical anisotropic layer A.

(Preparation of a Coating Solution for an Optical Anisotropic Layer B)

In 3.43 g of methyl ethyl ketone were dissolved 1.8 g of the aforesaid Compound No. TE-8 (R: (8), m=4) as a liquid crystalline discotic compound, 0.2 g of ethylene glycol-modified trimethylolpropane triacrylate (V#360 (trade name), manufactured by Osaka Organic Chemical Ind.)), 0.04 g of cellulose acetate butyrate (CAB531-1 (trade name), manufactured by Eastman Chemical Inc.), 0.06 g of a photopolymerization initiator (Irgacure 907 (trade name), manufactured by Ciba-Geigy Co.) and 0.02 g of a photosensitizer (Kayacure-DETX (trade name), manufactured, by Nihon Kayaku KK). The resultant solution was filtered through a filter made of polypropylene having a pore diameter of 1 μm, to prepare a coating solution for an optical anisotropic layer B.

(Preparation of a Coating Solution for an Optical Anisotropic Layer C)

In 7.2 g of methyl ethyl ketone was dissolved 1.8 g of the aforesaid Compound No. TE-8 (R: (3)), and the solution was filtered through a filter that was made of polypropylene and had a pore diameter of 1 μm, to prepare a coating solution for an optical anisotropic layer C.

Example 3-1

(Preparation of an Anti-reflection Film)

The aforesaid coating solution for a hard coat layer was coated onto a triacetylcellulose film (manufactured by Fuji Photo Film Co., Ltd.) having a thickness of 80 μm by the aid of a bar coater. Thereafter, the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Eye Graphics Co., Ltd.), to cure the coated layer, to form a hard coat layer having a thickness of 6 μm.

Next, the aforesaid coating liquid for a low-refractive-index layer was coated onto the hard coat layer by the aid of a bar coater, dried at 80° C., and heated at 120° C. for 10 minutes to effect thermal crosslinking, to form a low-refractive-index layer having a thickness of 0.096 μm, thereby manufacturing a film having an anti-reflection film.

(Preparation of an Optical Compensative Film)

The aforesaid coating solution for an alignment layer was coated onto a triacetylcellulose film (manufactured by Fuji Photo Film Co., Ltd.), which had a subbing layer of a gelatin thin film (0.1 μm) and had a thickness of 120 μm, by the aid of a bar coater, and dried at 60° C. The coated layer was subjected to a rubbing treatment, to form an alignment layer having a thickness of 0.5 μm on the film.

The thickness of the triacetylcellulose film provided with the alignment layer was measured by a micrometer, and retardation from various directions was measured by way of an ellipsometer (AEP-100 (trade name), manufactured by Shimadzu Co.), to determine the aforesaid |nx−ny|×d and {(nx+ny)/2−nz}×d. As result, |nx−ny|×d was 3 nm and {(nx+ny)/2−nz}×d was 60 nm. Namely, this triacetylcellulose film was approximately a negative uniaxial film, and its light axis was nearly a direction to the normal line of the film.

The aforesaid coating solution for an optical anisotropic layer A was coated onto the alignment layer, by the aid of a bar coater, dried at 120° C., then heated for further 3 minutes to effect aging of the liquid crystal thereby aligning the discotic compound. Thereafter, the layer was irradiated with UV-rays at an irradiation dose of 300 mJ/cm$^2$ and an illuminance of 400 mW/cm$^2$ using a 160 W/cm air-cooled metal halide lamp (manufactured by EYE Graphics Co., Ltd.), while maintaining the temperature at 120° C., to cure the coated layer to form an optical anisotropic layer having a thickness of 1.8 μm, thereby manufacturing an optical compensative film.

(Preparation of a Polarizing Plate)

The aforesaid anti-reflection film and the optical compensative film were subjected to a saponifying treatment with an aqueous solution of 1.5 N NaOH. A polarizing layer comprised of iodine-doped stretched polyvinyl alcohol, was put between the anti-reflection film and the optical compensative film on the side of their triacetylcellulose surface and adhered, to prepare a polarizing plate of Example 3-1.

Example 3-2

The above-mentioned coating solution for an over coat layer A was applied onto the low-refractive-index layer of Example 3-1, with a bar coater. The applied layer was dried at 120° C. to form an over coat layer. In this way, a film having an anti-reflection film was formed.

A polarizing plate of Example 3-2 was produced in the same manner as Example 3-1, except that this anti-reflection film was used.

Example 3-3

The aforesaid coating liquid for a hard coat layer was coated onto a triacetylcellulose film (manufactured by Fuji Photo Film Co., Ltd.) having a thickness of 80 μm by the aid of a bar coater. Thereafter, the film was dried at 120° C., and then irradiated with UV-rays at an irradiation dose of 300 mJ/cm$^2$ and an illuminance of 400 mW/cm$^2$ using a 160 W/cm$^2$ air-cooled metal halide lamp (manufactured by EYE Graphics Co., Ltd.), to cure the coated layer, thereby a hard coat layer having a thickness of 4 μm was formed.

The above-mentioned coating solution for a high-refractive-index layer was applied onto the hard coat layer with a bar coater. The applied layer was dried at 120° C., and was then irradiated with ultraviolet rays (illuminance: 400 mW/cm², and radiation dose: 300 mJ/cm²), using an air-cooled metal halide lamp having a power of 160 W/cm (made by Eye Graphics Co., Ltd.) to harden the applied layer. In this way, a high-refractive-index layer having a thickness of 0.06 μm was formed.

The above-mentioned coating solution for a low-refractive-index layer was applied onto the high-refractive-index layer with a bar coater. The applied layer was dried at 120° C. and was then irradiated with ultraviolet rays (illuminance: 400 mW/cm², and radiation dose: 300 mJ/cm²), using an air-cooled metal halide lamp having a power of 160 W/cm (made by Eye Graphics Co., Ltd.) to harden the applied layer. In this way, a low-refractive-index layer having a thickness of 0.092 μm was formed.

The above-mentioned coating solution for an over coat layer A was applied onto the low-refractive-index layer with a bar coater. The applied layer was dried at 120° C. to form an over coat layer having a thickness of 20 nm. In this way, a film having an anti-reflection film was produced.

A polarizing plate of Example 3-3 was produced in the same manner as Example 3-1, except that this anti-reflection film was used.

Example 3-4

The aforesaid coating liquid for a hard coat layer was coated onto a triacetylcellulose film (manufactured by Fuji Photo Film Co., Ltd.) having a thickness of 80 μm by the aid of a bar coater, and the film was dried at 120° C. Thereafter, the coated layer was irradiated with UV-rays at an irradiation dose of 300 mJ/cm² and an illuminance of 400 mW/cm² using a 160 W/cm air-cooled metal halide lamp (manufactured by EYE Graphics Co., Ltd.) to cure the coated layer, and a hard coat layer having a thickness of 4 μm was formed.

The above-mentioned coating solution for a middle-refractive-index layer was applied onto the hard coat layer with a bar coater. The applied layer was dried at 120° C., and was then irradiated with ultraviolet rays (illuminance: 400 mW/cm², and radiation dose: 300 mJ/cm²), using an air-cooled metal halide lamp having a power of 160 W/cm (made by Eye Graphics Co., Ltd.) to harden the applied layer. In this way, a middle-refractive-index layer having a thickness of 0.08 μm was formed.

The above-mentioned coating solution for a high-refractive-index layer was applied onto the middle-refractive-index layer with a bar coater. The applied layer was dried at 120° C., and was then irradiated with ultraviolet rays (illuminance: 400 mW/cm², and radiation dose: 300 mJ/cm²), using an air-cooled metal halide lamp having a power of 160 W/cm (made by Eye Graphics Co., Ltd.) to harden the applied layer. In this way, a high-refractive-index layer having a thickness of 0.06 μm was formed.

The above-mentioned coating solution for a low-refractive-index layer was applied onto the high-refractive-index layer with a bar coater. The applied layer was dried at 120° C. and was then irradiated with ultraviolet rays (illuminance: 400 mW/cm², and radiation dose: 300 mJ/cm²), using an air-cooled metal halide lamp having a power of 160 W/cm (made by Eye Graphics Co., Ltd.) to harden the applied layer. In this way, a low-refractive-index layer having a thickness of 0.092 μm was formed.

The above-mentioned coating solution for an over coat layer A was applied onto the low-refractive-index layer with a bar coater. The applied layer was dried at 120° C. to form an over coat layer having a thickness of 20 nm. In this way, a film having an anti-reflection film was produced.

A polarizing plate of Example 3-4 was produced in the same manner as Example 3-1, except that this anti-reflection film was used.

Example 3-5

The aforesaid coating liquid for a hard coat layer was coated onto a triacetylcellulose film (manufactured by Fuji Photo Film Co., Ltd.) having a thickness of 80 μm by the aid of a bar coater. Thereafter, the film was dried at 120° C. and then irradiated with UV-rays at an irradiation dose of 300 mJ/cm² and an illuminance of 400 mW/cm² using a 160 W/cm air-cooled metal halide lamp (manufactured by Eye Graphics Co., Ltd.) to cure the coated layer, thereby a hard coat layer having a thickness of 4 μm was formed.

The above-mentioned coating solution for a middle-refractive-index layer was applied onto the hard coat layer with a bar coater. The applied layer was dried at 120° C., and was then irradiated with ultraviolet rays (illuminance: 400 mW/cm², and radiation value: 300 mJ/cm²) using an air-cooled metal halide lamp having a power of 160 W/cm (made by Eye Graphics Co., Ltd.). to harden the applied layer. In this way, a middle-refractive-index layer having a thickness of 0.08 μm was formed.

The above-mentioned coating solution for a high-refractive-index layer was applied onto the middle-refractive-index layer with a bar coater. The applied layer was dried at 120° C., and was then irradiated with ultraviolet rays (illuminance: 400 mW/cm², and radiation dose: 300 mJ/cm²), using an air-cooled metal halide lamp having a power of 160 W/cm (made by Eye Graphics Co., Ltd.) to harden the applied layer. In this way, a high-refractive-index layer having a thickness of 0.06 μm was formed.

The above-mentioned coating solution for a low-refractive-index layer was applied onto the high-refractive-index layer with a bar coater. The applied layer was dried at 120° C. and was then irradiated with ultraviolet rays (illuminance: 400 mW/cm², and radiation value: 300 mJ/cm²), using an air-cooled metal halide lamp having a power of 160 W/cm (made by Eye Graphics Co., Ltd.) to harden the applied layer. In this way, a low-refractive-index layer having a thickness of 0.092 μm was formed.

The above-mentioned coating solution for an over coat-layer B was applied onto the low-refractive-index layer with a bar coater. The applied layer was dried at 120° C. to form an over coat layer having a thickness of 20 nm. In this way, a film having an anti-reflection film was produced.

A polarizing plate of Example 3-5 was produced in the same manner as Example 3-1, except that this anti-reflection film was used.

Example 3-6

(Impartment of an Anti-glare Property)

The anti-reflection film in Example 3-5 was subjected to embossing with a side-face embossing calendering machine (made by Yuri Roll Machine Co., Ltd.) under conditions of press pressure of 600 kg/cm, preheat roll temperature of 120° C., embossing roll temperature of 120° C., and treating speed of 2 m/minute, so as to produce an anti-reflection film having anti-glare property.

A polarizing plate of Example 3-6 was produced in the same manner as Example 3-1, except that this anti-reflection film was used.

With respect to the anti-reflection film having anti-glare property, the following were measured: the average reflectance in the wavelength range of 450 to 650 nm; the haze value; and the pensile hardness at the surface. As a result, the average reflectance was 1.0%, the haze was 1.5%, and the pensile hardness was H.

Example 3-7

The above-mentioned coating solution for an optical anisotropic layer B was applied onto the orientated layer of Example 3-1 with a bar coater. The applied layer was dried at 120° C., and was further heated for 3 minutes for ripening of the liquid crystal. In this way, its discotic compound was orientated. Thereafter, the applied layer was irradiated with ultraviolet rays (illuminance: 400 mW/cm$^2$, and radiation value: 300 mJ/cm$^2$) while keeping the temperature at 120° C., using an air-cooled metal halide lamp having a power of 160 W/cm (made by Eye Graphics Co., Ltd.) to harden the applied layer. In this way, an optical anisotropic layer having a thickness of 1.8 μm was formed to produce an optical compensative film.

A polarizing plate of Example 3-7 was produced in the same manner as Example 3-1, except that this optical compensative film was used.

Example 3-8

The triacetylcellulose surfaces of both the anti-reflection film and the optical compensative film in Example 3-5 were processed with an adhesive agent. They were separately stuck onto-different surfaces of a commercially available polarizing plate (made by Sanritz Corp.) wherein triacetylcellulose was used as a polarizing-layer protecting-film, so as to produce a polarizing plate of Example 3-8.

Example 3-9

The triacetylcellulose surface of the optical compensative film in Example 3-1 was processed with an adhesive agent. A commercially available polarizing plate (made by Sanritz Corp.) was used, one side of which was composed of triacetylcellulose as a polarizing-layer protecting-film, and the other side of which was composed of triacetylcellulose having an anti-reflection film which was formed by vapor deposition. The optical compensative film in Example 3-1 was stuck onto the triacetylcellulose protecting-film side of the commercially available polarizing plate, so as to produce a polarizing plate of Example 3-9.

Comparative Example 3-1

The aforesaid coating liquid for a hard coat layer was coated onto a triacetylcellulose film (manufactured by Fuji Photo Film Co., Ltd.) having a thickness of 80 μm by the aid of a bar coater. Thereafter, the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Eye Graphics Co., Ltd.) to cure the coated layer, and thereby a hard coat layer having a thickness of 4 μm was formed.

A polarizing plate of Comparative Example 3-1 was produced in the same manner as Example 3-1, except that this hard coat film was used instead of the anti-reflection film.

Comparative Example 3-2

In the same manner as Example 3-5, except that a triacetylcellulose film (manufactured by Fuji Photo Film Co., Ltd.) having a thickness of 80 μm was used in place of the optical compensative film, a polarizing plate of Comparative Example 3-2 was prepared.

Comparative Example 3-3

The aforesaid coating solution for an optical anisotropic layer C was coated onto the alignment layer of Example 3-1 by the aid of a bar coater. The layer was dried at 180° C., then heated further for one minute to effect aging of the liquid crystal, thereby aligning the discotic compound. Then the layer was cooled to room temperature to form an optical anisotropic layer having a thickness of 1.0 μm. In this way, an optical compensative film was prepared.

In the same manner as Example 3-5, except that this optical compensative film was used, a polarizing plate of Comparative Example 3-3 was prepared.

(Evaluation of the Anti-reflection Film)

As for the resultant anti-reflection films, the following items were evaluated:

(1) Average Reflectance

Using a spectrophotometer (made by JASCO Corp.), spectral reflectance, based on an incident angle of 5°, in the wavelength range of 380 to 780 nm, was measured. The result was represented by the average reflectance of 450 to 650 nm.

(2) Haze

A haze of the resultant films were measured by the aid of a haze meter Model 1001DP (trade name, manufactured by Nihon Denshoku Kogyo KK).

(3) Evaluation of Pencil Hardness

The evaluation of pencil hardness disclosed in JIS K 5400 was carried out, as an index of scratch-resistance. After adjusting moisture of the anti-reflection film at 25° C. and a relative humidity of 60% RH for 2 hours, a scratch test was carried out according to JIS S 6006 by using test pencil of 3H, under a load of 1 kg.

| | |
|---|---|
| In the evaluation of n = 5, no scratch was detected: | ◯ |
| In the evaluation of n = 5, 1 or 2 scratch marks were detected: | Δ |
| In the evaluation of n = 5, at least 3 scratch marks were detected: | X |

(4) Contact Angle and Evaluation of Fingerprint Adhesion

As an index of stain-proofing property of the surface of an optical material, the moisture of the optical material was adjusted at a temperature of 25° C. and a humidity of 60% RH for 2 hours. Thereafter, its contact angle with water was measured. In addition, fingerprints were caused to adhere onto the surface of this sample, and then they were wiped out with a cleaning cloth. The state thereof was observed to evaluate fingerprint adhesion according to the following ranks.

| | |
|---|---|
| The fingerprints were completely wiped out: | ◯ |
| The fingerprints were somewhat wiped out: | Δ |
| The fingerprints were hardly wiped out: | X |

(5) Measurement of Dynamic Friction Coefficient

The measurement of dynamic friction coefficient was carried out as an index of a surface-sliding property. The sample film was adjusted in humidity at 25° C. and a relative humidity of 60% RH for 2 hours, and then measured by a HEIDON-14 dynamic friction tester under conditions of employing stainless steel balls having a diameter of 5 mmφ, the load of 100 g, at a velocity of 60 cm/min, and the measured value was used as a dynamic friction coefficient.

(6) Evaluation of Anti-glare Property

An image of a fluorescent lamp (8000 cd/m$^2$) without any louver was projected on the produced anti-glare film, and then the degree of the haziness of the reflection image was evaluated according to the following criteria.

| | |
|---|---|
| The outline of the fluorescent lamp was not recognized at all: | ⊚ |
| The outline of the fluorescent lamp was slightly recognized: | ◯ |
| The fluorescent lamp was hazy, but the outline thereof was able to be recognized: | Δ |
| The fluorescent lamp was hardly hazy: | X |

(Evaluation of the Optical Compensative Film)

As for the resultant optical compensative film, the following items were evaluated:

(1) Haze

Haze of the resultant film was measured by the aid of haze meter Model 1001DP (trade name, manufactured by Nihon Denshoku Kogyo KK).

(2) Light Axis and Variation of Inclination Angle

In the optical compensative film, retardation from all the directions in perpendicular surface to the optical compensative film surface, which perpendicular surface included the rubbing axis, was measured by an ellipsometer (AEP-100 (trade name), manufactured by Shimadzu Co.). Further, retardation of only the support and the alignment layer of the film, from which the optical anisotropic layer of the measured portion had been removed, was likewise measured. By obtaining the optical characteristics (dependency of measuring angle of retardation) of the optical anisotropic layer alone from these two measured values, existence or non-existence of any light axis was investigated, assuming the direction of retardation being zero as light axis. Besides, inclination (variation of inclination angle) of the discotic compound to the surface of the support was calculated by fitting of the optical characteristics.

(3) Size of Domain

A size of domain formed in the optical anisotropic layer was measured by observation through a polarizing microscope.

Table 7 shows results of Examples and Comparative Examples.

Next, a liquid-crystal-display-type image display device as shown in FIG. 17 was prepared using the films of Examples 3-1, 3-5, 3-6, 3-7, 3-8, and 3-9, and Comparative Examples 3-1–3-3, respectively. The same optical compensative film as used in each Example was used as an optical compensative film of the front side polarizing plate.

A liquid crystal cell comprising a nematic liquid crystal at a twisted angle of 90° was put between the substrates with a gap size of 4.5 μm.

Figure 20:
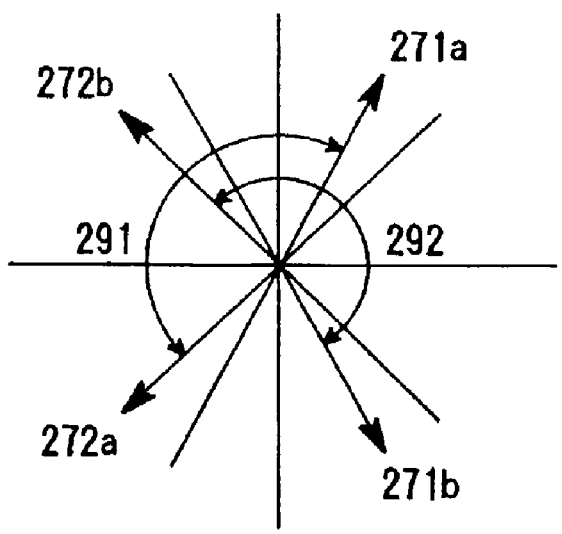
FIG. 20 is a drawing showing a representative construction of FIG. 18, viewing from the direction of the normal line of the film.

As shown in FIG. 20, the construction is such that an angle 291 of a rubbing direction 271a of the down side optical compensative film with a rubbing direction 272a of the down side substrate is 180°, while an angle 292 of a rubbing direction 271b of the up side optical compensative film with a rubbing direction 272b of the up side substrate is 180°. These elements are disposed as shown in FIG. 18.

(Evaluation of the Liquid-crystal-display-type Image Display Device)

As for the resultant liquid-crystal-display-type image display device, the following items were evaluated:

(1) On-Axis Contrast Ratio

A 55 Hz square wave with voltage of 0~5 V was applied to the resultant TN-LCD, and the contrast ratio in the normal to the front surface was measured by the aid of a spectrometer (LCD-5000 (trade name), manufactured by Otsuka Electronics Co., Ltd.).

(2) Viewing Angle

A 55 Hz square wave with voltage of 0~5 V was applied to the resultant TN-LCD, and the contrast in inclined directions of up/down and left/right was measured by the aid of a spectrometer (LCD-5000 (trade name) manufactured by Otsuka Electronics Co., Ltd.). The viewing angle was defined as angle range of the contrast ratio being at least 10.

(3) Visibility in Room

The blackness in black display of the resultant TN-LCD in room was visually evaluated in accordance with the following items:

TABLE 7

| | Anti-reflection film | | | | | | | Optical compensative film | | | |
|---|---|---|---|---|---|---|---|---|---|---|---|
| | Average reflectance | Haze [%] | Pencil hardness 3 H | Contact angle [°] | Fingerprint adhesion | Dynamic friction coefficient [-] | Anti-glare property | Haze [%] | Light axis | Variation of inclination angle [°] | Domain [μm] |
| Example 3-1 | 1.5 | 0.0 | Δ | 103 | ○ | 0.28 | X | 1.0 | not present | 20–50 | mono* |
| Example 3-2 | 2.5 | 0.0 | ○ | 103 | ○ | 0.08 | X | 1.0 | not present | 20–50 | mono |
| Example 3-3 | 1.8 | 0.0 | ○ | 103 | ○ | 0.08 | X | 1.0 | not present | 20–50 | mono |
| Example 3-4 | 0.3 | 0.0 | ○ | 103 | ○ | 0.08 | X | 1.0 | not present | 20–50 | mono |
| Example 3-5 | 0.25 | 0.0 | ○ | 103 | ○ | 0.08 | X | 1.0 | not present | 20–50 | mono |
| Example 3-6 | 0.2 | 1.0 | ○ | 103 | ○ | 0.08 | ○ | 1.0 | not present | 20–50 | mono |
| Example 3-7 | 1.5 | 0.0 | Δ | 103 | ○ | 0.28 | X | 0.3 | not present | 20–70 | mono |
| Example 3-8 | 0.25 | 0.0 | ○ | 103 | ○ | 0.08 | X | 1.0 | not present | 20–50 | mono |
| Example 3-9 | 0.2 | 6.0 | ○ | 101 | ○ | 0.34 | ⊚ | 1.0 | not present | 20–50 | mono |
| Comparative Example 3-1 | 4.1 | 0.0 | ○ | 67 | X | 0.40 | X | 1.0 | not present | 20–50 | mono |
| Comparative Example 3-2 | 0.25 | 0.0 | ○ | 103 | ○ | 0.08 | X | — | — | — | — |
| Comparative Example 3-3 | 0.25 | 0.0 | ○ | 103 | ○ | 0.08 | X | 7.9 | present | — | 10 |

*mono = monodomain

| ⊚: | Blackness is very good irrespective of illumination in room |
|---|---|
| ○: | Blackness is good though influenced by illumination in room |
| Δ: | Blackness becomes somewhat bad in oblique directions |
| X: | Blackness is bad |

Table 8 shows results of Examples and Comparative Examples.

TABLE 8

| | | Viewing angle [°] | | Visibility in |
|---|---|---|---|---|
| | On-axis contrast | up/down | left/right | room |
| Example 3-1 | at least 100 | 130 | 125 | ⊚ |
| Example 3-5 | at least 100 | 130 | 125 | ⊚ |
| Example 3-6 | at least 100 | 130 | 125 | ⊚ |
| Example 3-7 | at least 100 | 130 | 130 | ⊚ |
| Example 3-8 | at least 100 | 130 | 125 | ⊚ |
| Example 3-9 | at least 100 | 130 | 125 | ⊚ |
| Comparative example 3-1 | at least 100 | 130 | 125 | ○ |
| Comparative example 3-2 | at least 100 | 60 | 95 | Δ |
| Comparative example 3-3 | 60 | 40 | 65 | X |

Next, a color-liquid-crystal-display-type image display device was prepared by peeling off a polarizing plate of TFT-type liquid crystal color television 6E-C3 (trade name, manufactured by Sharp Corp.) and using instead the polarizing plates of Examples 3-1, 3-5, 3-6, 3-7, 3-8, and 3-9, and Comparative Examples 3-1 to 3-3.

(Evaluation of the Color-liquid-crystal-display-type Image Display Device)

As for the resultant liquid-crystal-display-type image display device, the following items were evaluated:

(1) Viewing Angle

The resultant color-liquid-crystal-display-type image display device was used for its white display and black display, and the contrast in inclined directions up/down and left/right was measured by the aid of a spectrometer (LCD-5000 (trade name), manufactured by Otsuka Electronics Co., Ltd.). The viewing angle was defined as an angle range of the contrast ratio being at least 10.

Table 9 shows results of Examples and Comparative Examples.

TABLE 9

| | Viewing angle [°] | |
|---|---|---|
| | up/down | left/right |
| Example 3-1 | 123 | 115 |
| Example 3-5 | 123 | 115 |
| Example 3-6 | 123 | 115 |
| Example 3-7 | 130 | 120 |
| Example 3-8 | 123 | 115 |
| Example 3-9 | 123 | 115 |
| Comparative example 3-1 | 123 | 115 |
| Comparative example 3-2 | 50 | 70 |
| Comparative example 3-3 | 30 | 55 |

Having described our invention as related to the present embodiments, it is our intention that the invention not be limited by any of the details of the description, unless otherwise specified, but rather be construed broadly within its spirit and scope as set out in the accompanying claims.

What we claim is:

1. A polarizing plate comprising a polarizing layer interposed between two transparent supports, wherein the polarizing plate has an optical compensative layer containing an optical anisotropic layer, on the surface of one of the transparent supports opposite to the polarizing layer, and has an anti-reflection film on the surface of the other transparent support opposite to the polarizing layer, and wherein the optical anisotropic layer comprises a compound with a discotic structure unit, disk surfaces of the discotic structure unit being inclined to the surface of the transparent support at angles changed to each other for the surface of the transparent support with respect to the direction of depth of the optical anisotropic layer, wherein the anti-reflection film comprises a low-refractive-index layer, which has a lower refractive index than that of the transparent support to which the layer is laminated and has a void percentage of 1–50% by volume.

2. A polarizing plate comprising a polarizing layer interposed between two transparent supports, wherein the polarizing plate has an optical compensative layer containing an optical anisotropic layer, on the surface of one of the transparent supports opposite to the polarizing layer, and has an anti-reflection film on the surface of the other transparent support opposite to the polarizing layer, and wherein the optical anisotropic layer comprises a compound with a discotic structure unit, disk surfaces of the discotic structure unit being inclined to the surface of the transparent support at angles changed to each other for the surface of the transparent support with respect to the direction of depth of the optical anisotropic layer, wherein a high-refractive-index layer, having a higher refractive index than that of the transparent support, is provided between the transparent support and the low-refractive-index layer.

3. A polarizing plate film comprising a polarizing layer interposed between two transparent supports, wherein the polarizing plate has an optical compensative layer containing an optical anisotropic layer, on the surface of one of the transparent supports opposite to the polarizing layer, and has an anti-reflection film on the surface of the other transparent support opposite to the polarizing layer, and wherein the optical anisotropic layer comprises a compound with a discotic structure unit, disk surfaces of the discotic structure unit being inclined to the surface of the transparent support at angles changed to each other for the surface of the transparent support with respect to the direction of depth of the optical anisotropic layer, wherein an over coat layer containing a fluorine-containing compound is laminated on a low-refractive-index layer.

4. The polarizing plate as claimed in claim 1, wherein the angle is increased with the increase of distance between the optical anisotropic layer and the surface of the transparent support.

5. The polarizing plate as claimed in claim 1, wherein the optical anisotropic layer further contains a cellulose ester.

6. The polarizing plate as claimed in claim 1, wherein the transparent support of the optical anisotropic layer side has an optically negative uniaxial property, and has an optic axis in the direction of normal line of the surface of the transparent support, and satisfies the following condition:

$$20 \leq \{(nx+ny)/2-nz\} \times d \leq 400$$

wherein d represents a thickness of the optical compensative layer (unit: nm); nx, ny, and nz represent main refractive indicates of three orthogonal axes of the optical compensative layer, nz represents a main refractive index in the direction of thickness of the transparent support, and the axes satisfy a relation of $nx \leq nz \leq ny$, when it is viewed from the front.

7. The polarizing plate as claimed in claim 1, wherein an alignment layer is formed between the optical anisotropic layer and the transparent support.

8. The polarizing plate as claimed in claim 7, wherein the alignment layer comprises a cured polymer.

9. The polarizing plate as claimed in claim 1, wherein the optical anisotropic layer is composed of monodomain or a number of domains having a size of 0.1 μm or less.

10. The polarizing plate as claimed in claim 1, wherein the low-refractive-index layer contains fine particles having a particle size of 0.1 μm or less, and wherein voids are formed among or inside the fine particles.

11. The polarizing plate as claimed in claim 3, wherein the occupied ratio of a material of the over coat layer in the voids of the low-refractive-index layer is less than 70% by volume.

12. The polarizing plate as claimed in claim 3, wherein the weight-average molecular weight of the fluorine-containing compound forming the over coat layer is 20,000–2,000,000, and low molecular weight components, having a molecular weight less than 20,000, other than the fluorine-containing compound, is 50% or less by weight of solid components of the over coat layer.

13. The polarizing plate as claimed in claim 2, wherein the anti-reflection film is an anti-reflection film which is formed by laminating a high-refractive-index layer, having a refractive index of 1.65 to 2.40, and a low-refractive-index layer, having a refractive index of 1.30 to 1.55, wherein the high-refractive-index layer comprises 5 to 65% by volume of inorganic fine particles having an average particle size of 1 to 200 nm and having a core/shell structure, and 35 to 95% by volume of a polymer composed of an organic compound.

14. A liquid-crystal-display-type image display device comprising the polarizing plate as claimed in claim 1 used as a polarizing plate on the side of display out of the two polarizing plates disposed on both sides of the liquid crystal cell, wherein the polarizing plate is arranged in such manner that the optical anisotropic layer being faced to the liquid crystal cell side.

15. A color liquid-crystal-display-type image display device, comprising a pair of substrates having transparent electrodes, pixel electrodes, and a color filter, a liquid crystal cell sealed between the substrates and comprising a twisted nematic liquid crystal, a pair of optical compensative sheets provided on both sides of the liquid crystal cell, and a pair of polarizing plates provided respectively on the outside of the optical compensative sheets; wherein use is made of, the polarizing plate according to claim 1, as the optical compensative sheet on the displaying side of the liquid crystal cell and the polarizing plate, in which an optical anisotropic layer is disposed facing to the liquid crystal cell side, and an optical compensative sheet, which comprises an optical anisotropic layer comprising a compound that has discotic structure units, at the side of the backlight of the liquid crystal cell; wherein disk surfaces of the discotic structure unit are inclined to the surface of a transparent support at angles changed to each other for the transparent support surface with respect to the direction of depth of the optical anisotropic layer.

16. The polarizing plate as claimed in claim 1, wherein the anti-reflection film is an anti-reflection film comprising a low-refractive-index layer, having a refractive index of 1.30 to 1.55, which comprises from 50 to 95% by weight of short fibrous inorganic fine particles, and from 5 to 50% by weight of a polymer, wherein there are micro voids formed among the short fibrous inorganic fine particles.

* * * * *